US012054958B2

(12) United States Patent
Itagaki

(10) Patent No.: US 12,054,958 B2
(45) **Date of Patent: *Aug. 6, 2024**

(54) BINDING MACHINE

(71) Applicant: MAX CO., LTD., Tokyo (JP)

(72) Inventor: Osamu Itagaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 673 days.

This patent is subject to a terminal disclaimer.

(21) Appl. No.: 17/193,041

(22) Filed: Mar. 5, 2021

(65) Prior Publication Data

US 2021/0189746 A1 Jun. 24, 2021

Related U.S. Application Data

(63) Continuation of application No. 15/746,088, filed as application No. PCT/JP2016/071419 on Jul. 21, 2016, now Pat. No. 10,961,729.

(30) Foreign Application Priority Data

Jul. 22, 2015 (JP) ................................ 2015-145284
Jul. 8, 2016 (JP) ................................ 2016-136068

(51) Int. Cl.
*B21F 15/04* (2006.01)
*B21F 7/00* (2006.01)
(Continued)

(52) U.S. Cl.
CPC .............. *E04G 21/123* (2013.01); *B21F 7/00* (2013.01); *B21F 15/06* (2013.01); *B25B 25/00* (2013.01);
(Continued)

(58) Field of Classification Search
CPC ..... B65B 13/28; B65B 13/285; B65B 13/025; B65B 13/04; B65B 13/06; B65B 13/184;
(Continued)

(56) References Cited

U.S. PATENT DOCUMENTS 4,362,192 A 12/1982 Furlong et al.
4,534,817 A 8/1985 O'Sullivan
(Continued)

FOREIGN PATENT DOCUMENTS

CN 2037665 U 5/1989
CN 2133413 Y 5/1993
(Continued)

OTHER PUBLICATIONS

Japanese Office Action for JP Application No. 2020-109279 dated Jul. 13, 2021. (5 pp.).

(Continued)

*Primary Examiner* — Debra M Sullivan
(74) *Attorney, Agent, or Firm* — Banner & Witcoff, Ltd.

(57) ABSTRACT

It provides a reinforcing bar binding machine which reduces restrictions on a moving direction of the reinforcing bar binding machine in an operation of pulling out a reinforcing bar bound with a wire. A reinforcing bar binding machine (1A) includes a curl guide unit (5A) that winds a wire (W) around a reinforcing bar (S), a wire feeding unit (3A) that feeds the wire (W), and a binding unit (7A) that twists crossing portions between one end and the other end of the wire (W) wound around the reinforcing bar (S). The curl guide unit (5A) includes a first guide unit (50) that curls the wire (W) fed by the feeding unit (3A) and a second guide unit (51) that guides the wire (W) fed from the first guide unit (50) to the binding unit (7A), and the second guide unit (51) includes a fixed guide unit (54) that restricts a position in a radial direction of the wire (W) wound around the reinforcing bar (S) and a movable guide unit (55) that restricts a position in an axial direction of the wire (W) wound around the reinforcing bar (S).

20 Claims, 34 Drawing Sheets

(51) Int. Cl.

| | |
|---|---|
| ***B21F 15/06*** | (2006.01) |
| ***B25B 25/00*** | (2006.01) |
| ***B65B 13/28*** | (2006.01) |
| ***B65B 27/10*** | (2006.01) |
| ***E04G 21/12*** | (2006.01) |
| *B65B 13/02* | (2006.01) |

(52) U.S. Cl.
CPC ............ *B65B 13/285* (2013.01); *B65B 27/10* (2013.01); *B65B 13/025* (2013.01)

(58) Field of Classification Search
CPC ... B65B 13/185; E04G 21/122; E04G 21/123; B21F 15/04
See application file for complete search history.

(56) References Cited

U.S. PATENT DOCUMENTS

| | | | | |
|---|---|---|---|---|
| 4,685,493 | A | 8/1987 | Yuguchi | |
| 5,136,118 | A | 8/1992 | Buchanan et al. | |
| 5,558,134 | A | 9/1996 | Miyazaki | |
| 5,778,946 | A * | 7/1998 | Pellenc | A01G 17/08 140/119 |
| 5,871,036 | A | 2/1999 | Murayama et al. | |
| 5,983,473 | A | 11/1999 | Yuguchi et al. | |
| 6,401,766 | B1 | 6/2002 | Ishikawa et al. | |
| 7,096,891 | B2 * | 8/2006 | Dombray | A01G 17/08 140/57 |
| 2004/0244607 | A1 | 12/2004 | Corbin et al. | |
| 2005/0005991 | A1 | 1/2005 | Ishikawa et al. | |
| 2006/0011254 | A1 | 1/2006 | Yokochi et al. | |
| 2010/0147411 | A1 | 6/2010 | Kusakari et al. | |
| 2014/0246114 | A1 | 9/2014 | Kusakari et al. | |
| 2015/0267423 | A1 | 9/2015 | Kusakari et al. | |
| 2016/0222683 | A1 | 8/2016 | Kusakari et al. | |
| 2017/0066038 | A1 | 3/2017 | Kim et al. | |

FOREIGN PATENT DOCUMENTS

| | | | |
|---|---|---|---|
| CN | 2136108 | Y | 6/1993 |
| CN | 102501202 | A | 6/2012 |
| EP | 0332532 | A1 | 9/1989 |
| EP | 0757143 | A1 | 2/1997 |
| EP | 2 196 600 | A2 | 6/2010 |
| JP | 60-23111 | A | 2/1985 |
| JP | 60-217920 | A | 10/1985 |
| JP | S63-022971 | A | 1/1988 |
| JP | H06-002433 | A | 1/1994 |
| JP | H07-275982 | A | 10/1995 |
| JP | H09-165006 | A | 6/1997 |
| JP | 2000-064617 | A | 2/2000 |
| JP | 2001-502646 | A | 2/2001 |
| JP | 2004-142782 | A | 5/2004 |
| JP | 2010-265581 | A | 11/2010 |
| JP | 4747454 | B2 | 8/2011 |
| JP | 5182212 | B2 | 4/2013 |
| KR | 200335567 | | 12/2003 |
| KR | 101518227 | B1 | 4/2015 |

OTHER PUBLICATIONS

International Search Report mailed Sep. 6, 2016 in PCT/JP2016/071419 (3 pages) and Written Opinion of the International Search Authority (3 pages).
The extended European search report mailed Dec. 7, 2018 in corresponding EP Patent Application No. 16827830.7 (12 pages).
CN Office Action for Application No. 201680042867.0 dated Feb. 2, 2021 (8 pages).

* cited by examiner

BINDING MACHINE

CROSS REFERENCE TO RELATED APPLICATIONS

This application is a Continuation of Ser. No. 15/746,088, filed Jan. 19, 2018, which is a 35 U.S.C. 371 National Phase Entry Application from PCT/JP2016/071419, filed Jul. 21, 2016, which claims priority to Japanese Patent Application Nos. 2015-145284, filed Jul. 22, 2015, and 2016-136068, filed Jul. 8, 2016, the disclosures of which are incorporated herein in their entirety by reference.

TECHNICAL FIELD

The present invention relates to a binding machine for binding a binding object such as reinforcing bars with a wire.

BACKGROUND ART

In the related art, there has been suggested a binding machine called a reinforcing bar binding machine which winds a wire around two or more reinforcing bars and twists the wound wire to bind the two or more reinforcing bars.

A reinforcing bar binding machine according to the related art has a configuration in which wires are fed and wound around a reinforcing bar, and then are twisted and bound (for example, see Patent Literature 1). In order to reduce the amount of wire used for such a reinforcing bar binding machine, a reinforcing bar binding machine has been proposed in which wires are fed in a forward direction and wound around the reinforcing bar, and then the wires are fed (pulled back) in a backward direction and wound around the reinforcing bar in close contact with the reinforcing bar (for example, see Patent Literature 2).

Even in any binding machine, since a feed path is required to wind the wires around the reinforcing bar, a pair of guides are provided along the feed path of the wires.

CITATION LIST

Patent Literature

[Patent Literature 1]: Japanese Patent No. 5182212
[Patent Literature 2]: Japanese Patent No. 4747454

SUMMARY

Technical Problem

In the related arts, the pair of guides constituting the feed path for winding the wires around a binding object are fixed to a main body of the binding machine, so as to restrict radial expansion of a loop of the wires wound around the binding object. However, when each of the guides is fixed, a binding operation is completed, and the binding object is caught by the guide in an operation of pulling out the guide of the binding machine from the binding object, resulting in deteriorating workability.

On the other hand, a technique has been proposed in which one of the pair of guides is rotatable so that the binding object is not caught by the guide during the operation of pulling out the guide of the binding machine from the binding object. However, since the entire of one guide moves in the radial direction of the loop of the wire formed in the loop, it is not possible to sufficiently suppress the radial expansion of the looped wires.

The present invention has been made to solve the problem, and an object thereof is to provide a binding machine including a guide capable of suppressing radial expansion of a loop of wires formed in a loop and having excellent workability.

Solution to Problem

In order to solve the problem described above, the present invention is to provide a binding machine includes: a feeding unit having a guide unit capable of winding wires around a binding object; and a binding unit that twists the wires wound by the feeding unit, wherein the guide unit includes: a first guide unit that curls the wires fed by the feeding unit and a second guide unit that guides the wires fed from the first guide unit, and the second guide unit includes a third guide unit which restricts a position in a radial direction of a loop formed by the wires wound by the feeding unit and a fourth guide unit which restricts a position in a radial direction of a loop formed by the wires wound by the feeding unit.

According to the present invention, in the operation of winding the wires around the binding object, the wires fed from the first guide unit can be bound by the binding unit in such a manner that the wires are guided to the third guide unit in a state where the position in the radial direction of the loop of the wires is restricted by the fourth guide unit of the second guide unit and the position in the radial direction of the loop of the wires is restricted by the third guide unit.

Advantageous Effects of the Invention

According to the present invention, the third guide unit for regulating the radial position of wire loop is fixed or movable, so that the radial expansion of the wire loop is suppressed. Further, the fourth guide unit for regulating the radial position of the wire loop is movable, so that workability is improved in the operation of pulling out the binding machine from the binding object bound with the wires.

DETAILED DESCRIPTION

Hereinafter, an example of a reinforcing bar binding machine as an embodiment of a binding machine of the present invention will be described with reference to the drawings.

Figure 1:
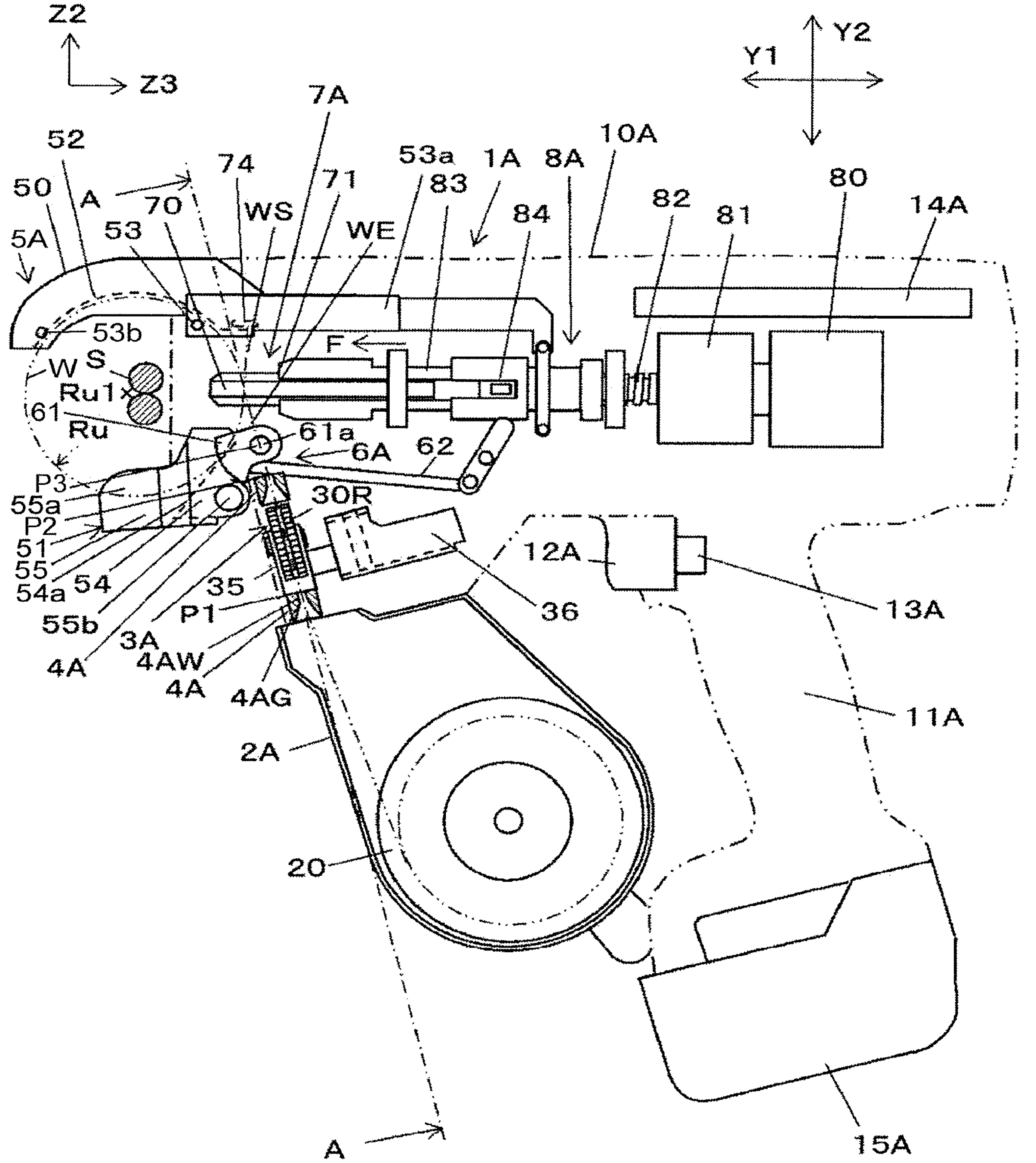
FIG. 1 is a view of an example of an overall configuration of a reinforcing bar binding machine of the present embodiment as viewed from the side.
Figure 2:
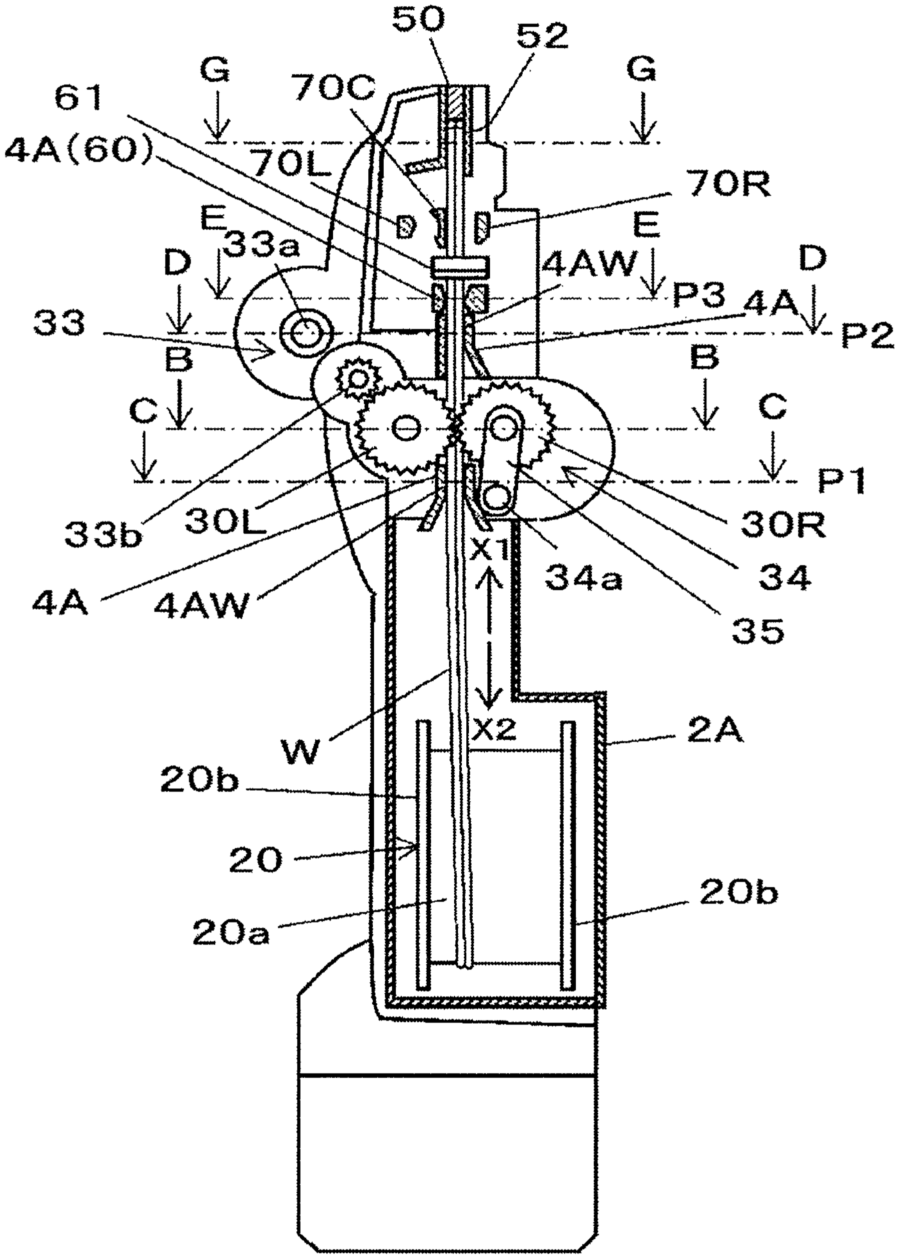
FIG. 2 is a front view illustrating an example of the overall configuration of the reinforcing bar binding machine of the present embodiment as viewed from the front.

Example of Configuration of Reinforcing Bar Binding Machine of the Embodiment FIG. 1 is a view of an example of the overall configuration of a reinforcing bar binding machine according to the present embodiment as seen from a side, and FIG. 2 is a view illustrating an example of the overall configuration of the reinforcing bar binding machine of the present embodiment as seen from a front. Here, FIG. 2 schematically illustrates the internal configuration of the line A-A in FIG. 1.

The reinforcing bar binding machine 1A of the present embodiment binds the reinforcing bar S, which is a binding object, by using two or more wires W having a diameter smaller compared to a conventional wire having a large diameter. In the reinforcing bar binding machine 1A, as will be described later, by the operation of winding the wire W around the reinforcing bar S, the operation of winding the wire W wound around the reinforcing bar S in close contact with the reinforcing bar S, and the operation of twisting the wire wound around the reinforcing bar S, the reinforcing bar S is bound with the wire W. In the reinforcing bar binding machine 1A, since the wire W is bent in any of the operations described above, by using the wire W having a smaller diameter than the conventional wire, the wire is wound on the reinforcing bar S with less force, and it is possible to twist the wire W with less force. Further, by using two or more wires, it is possible to secure the binding strength of the reinforcing bar S by the wire W. In addition, by arranging two or more wires W to be fed in parallel, the time required for winding the wire W can be shortened compared with the operation of winding the reinforcing bar twice or more with one wire. It should also be noted that winding the wire W around the reinforcing bar S and winding the wire W wound around the reinforcing bar S in close contact with the reinforcing bar S is collectively referred to as winding the wire W. The wire W may be wound on a binding object other than the reinforcing bar S. Here, as the wire W, a single wire or a twisted wire made of a metal that can be plastically deformed is used.

The reinforcing bar binding machine 1A includes a magazine 2A that is a housing unit that houses the wire W, a wire feeding unit 3A that feeds the wire W housed in the magazine 2A, a parallel guide 4A for arranging the wires W fed to the wire feeding unit 3A and the wires W fed out from the wire feeding unit 3A in parallel. The reinforcing bar binding machine 1A further includes a curl guide unit 5A that winds the wires W fed out in parallel around the reinforcing bar S, and a cutting unit 6A that cuts the wire W wound around the reinforcing bar S. Further, the reinforcing bar binding machine 1A includes a binding unit 7A that grips and twists the wire W wound around the reinforcing bar S.

The magazine 2A is an example of a housing unit. In the embodiment, a reel 20 having two long wires W wound thereon in a drawable manner is detachably housed in the magazine. The reel 20 is provided with a tubular hub portion **20*a* that can wind the wires W and a pair of flanges 20*b* that are provided at opposite end sides of the hub portion 20*a* in an axial direction. The flanges 20*b* have a larger diameter than the hub portion 20*a*, and protrudes beyond the opposite end sides of the hub portion 20*a* in the axial direction. Two or more wires W, in this example, two wires W are wound around the hub portion 20*a*. In the reinforcing bar binding machine 1A, while the reel 20 housed in the magazine 2A rotates, the two wires W are fed out from the reel 20 through the operation of feeding the two wires W by the wire feeding unit 3A and the operation of feeding the two wires W manually. At this time, the two wires W are wound around the hub portion 20*a*** so that the two wires W are fed out without being twisted.

The wire feeding unit 3A is an example of a wire feeding unit constituting the feeding unit and includes a first gear 30L in the form of a spur gear which feeds the wire W by a rotation operation as a pair of feeding members for feeding the parallel wires W, and a second feed gear 30R also having a spur gear shape for sandwiching the wire W with the first feed gear 30L. Although the details of the first feed gear 30L and the second feed gear 30R will be described later, the first feed gear 30L and the second feed gear 30R have a spur gear shape in which teeth are formed on the outer peripheral surface of a disk-like member. However, the first feed gear 30L and the second feed gear 30R are meshed with each other, and the driving force is transmitted from one feed gear to the other feed gear, so that the two wires W can be appropriately fed, it is not necessarily limited to a spur gear shape.

The first feed gear 30L and the second feed gear 30R are each formed of a disc-shaped member. In the wire feeding unit 3A, the first feed gear 30L and the second feed gear 30R are provided so as to sandwich the feed path of the wire W, so that the outer peripheral surfaces of the first feed gear 30L and the second feed gear 30R face each other. The first feed gear 30L and the second feed gear 30R sandwich the two parallel wires W between a portions opposing to the outer peripheral surface. The first feed gear 30L and the second feed gear 30R feed two wires W along the extending direction of the wire W in a state where the two wires W are arranged in parallel with each other.

Figure 3:
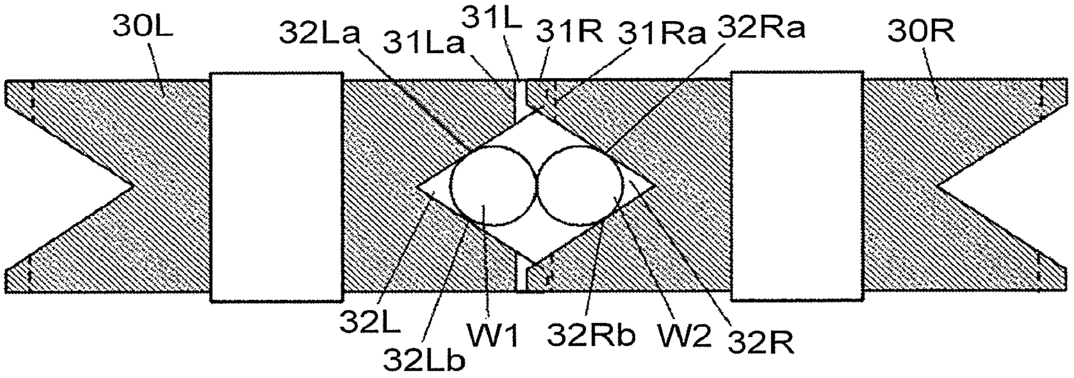
FIG. 3 is a view illustrating an example of a feed gear according to the present embodiment.

FIG. 3 is a view illustrating an example of the feed gear of this embodiment. Here, FIG. 3 is a sectional view taken along the line B-B of FIG. 2. The first feed gear 30L includes a tooth portion 31L on its outer peripheral surface. The second feed gear 30R includes a tooth portion 31R on its outer peripheral surface.

The first feed gear 30L and the second feed gear 30R are arranged in parallel with each other so that the teeth portions 31L and 31R face each other. In other words, the first feed gear 30L and the second feed gear 30R are arranged in parallel in a direction along the axial direction Ru1 of the loop Ru formed by the wire W wound by the curl guide unit 5A, that is, along the axial direction of the virtual circle in which the loop Ru formed by the wire W is regarded as a circle. In the following description, the axial direction Ru1 of the loop Ru formed by the wire W wound by the curl guide unit 5A is also referred to as the axial direction Ru1 of the loop of wire W.

The first feed gear 30L includes a first feed groove 32L on its outer peripheral surface. The second feed gear 30R includes a second feed groove 32R on its outer peripheral surface. The first feed gear 30L and the second feed gear 30R are arranged such that the first feed groove 32L and the second feed groove 32R face each other and the first feed groove 32L and the second feed groove 32R form a pinching portion.

The first feed groove 32L is formed in a V-groove shape on the outer peripheral surface of the first feed gear 30L along the rotation direction of the first feed gear 30L. The first feed groove 32L has a first inclined surface 32La and a second inclined surface 32Lb forming a V-shaped groove. The first feed groove 32L has a V-shaped cross section so that the first inclined surface 32La and the second inclined surface 32Lb face each other at a predetermined angle. When the wires W are held between the first feed gear 30L and the second feed gear 30R in parallel, the first feed groove 32L is configured such that one wire among the outermost wires of the wires W arranged in parallel, in this example, a part of the outer peripheral surface of one wire W1 of the two wires W arranged in parallel is in contact with the first inclined surface 32La and the second inclined surface 32Lb.

The second feed groove 32R is formed in a V-groove shape on the outer peripheral surface of the second feed gear 30R along the rotation direction of the second feed gear 30R. The second feed groove 32R has a first inclined surface 32Ra and a second inclined surface 32Rb that form a V-shaped groove. Similarly to the first feed groove 32L, the second feed groove 32R has a V-shaped cross-sectional shape, and the first inclined surface 32Ra and the second inclined surface 32Rb face each other at a predetermined angle. When the wire W is held between the first feed gear 30L and the second feed gear 30R in parallel, the second feed groove 32R is configured such that, the other wire among the outermost wires of the wires W arranged in parallel, in this example, a part of the outer peripheral surface of the other wire W2 of the two wires W arranged in parallel is in contact with the first inclined surface 32Ra and the second inclined surface 32Rb.

When the wire W is pinched between the first feed gear 30L and the second feed gear 30R, the first feed groove 32L is configured with a depth and an angle (between the first inclined surface 32La and the second inclined surface 32Lb) such that a part, on the side facing the second feed gear 30R, of one wire W1 in contact with the first inclined surface 32La and the second inclined surface 32Lb protrudes from the tooth bottom circle 31La of the first feed gear 30.

When the wire W is pinched between the first feed gear 30L and the second feed gear 30R, the second feed groove 32R is configured with a depth and an angle (between the first inclined surface 32Ra and the second inclined surface 32Rb) such that a part, on the side facing the first feed gear 30L, of the other wire W2 in contact with the first inclined surface 32Ra and the second inclined surface 32Rb protrudes from the tooth bottom circle 31Ra of the second feed gear 30R.

As a result, the two wires W pinched between the first feed gear 30L and the second feed gear 30R are arranged such that one wire W1 is pressed against the first inclined surface 32La and the second inclined surface 32Lb of the first feed groove 32L, and the other wire W2 is pressed against the first inclined surface 32Ra and the second inclined surface 32Rb of the second feeding groove 32R. Then, one wire W1 and the other wire W2 are pressed against each other. Therefore, by rotation of the first feed gear 30L and the second feed gear 30R, the two wires W (one wire W1 and the other wire W2) are simultaneously fed between the first feed gear 30L and the second feed gear 30R while being in contact with each other. In this example, the first feed groove 32L and the second feed groove 32R have a V-shaped cross-sectional shape, but it is not necessarily limited to the V-groove shape, and it may be, for example, a trapezoidal shape or an arcuate shape. Further, in order to transmit the rotation of the first feed gear 30L to the second feed gear 30R, between the first feed gear 30L and the second feed gear 30R, a transmission mechanism including an even number of gears or the like for rotating the first feed gear 30L and the second feed gear 30R in opposite directions to each other may be provided.

The wire feeding unit 3A includes a driving unit 33 for driving the first feed gear 30L and a displacement unit 34 for pressing and separating the second feed gear 30R against the first feed gear 30L.

The driving unit 33 includes a feed motor 33*a* for driving the first feed gear 30L and a transmission mechanism 33*b* including a combination of a gear and the like for transmitting the driving force of the feed motor 33*a* to the first feed gear 30L.

In the first feed gear 30L, the rotation operation of the feed motor 33*a* is transmitted via the transmission mechanism 33*b* and the first feed gear rotates. In the second feed gear 30R, the rotation operation of the first feed gear 30L is transmitted to the tooth portion 31R via the tooth portion 31L and the second feed gear rotates in accordance with the first feed gear 30L.

As a result, by the rotation of the first feed gear 30L and the second feed gear 30R, due to the frictional force generated between the first feed gear 30L and the one wire W1, the friction force generated between the second feed gear 30R and the other wire W2, and the frictional force generated between the one wire W1 and the other wire W2, the two wires W are fed in a state of being arranged in parallel with each other.

By switching the forward and backward directions of the rotation direction of the feed motor 33*a*, the wire feeding unit 3A switches the direction of rotation of the first feed gear 30L and the direction of rotation of the second feed gear 30R, and the forward and reverse of the feeding direction of the wire W are switched.

In the reinforcing bar binding machine 1A, by forward rotation of the first feed gear 30L and the second feed gear 30R in the wire feeding unit 3A, the wire W is fed in the forward direction indicated by the arrow X1, that is, in the direction of the curl guide unit 5A and is wound around the reinforcing bar S at the curl guide unit 5A. Further, after the wire W is wound around the reinforcing bar S, the first feed gear 30L and the second feed gear 30R are reversely rotated, whereby the wire W is fed in the backward direction indicated by the arrow X2, that is, in the direction of the magazine 2A (pulled back). The wire W is wound around the reinforcing bar S and then pulled back, whereby the wire W is brought into close contact with the reinforcing bar S.

The displacement unit 34 includes a first displacement member 35 that displaces the second feed gear 30R in a direction in which the second feed gear 30R is brought into close contact and separated with/from the first feed gear 30L and a second displacement member 36 that displaces the first displacement member 35 in the rotation operation with the shaft 34*a* as a fulcrum. The second feed gear 30R is pressed in the direction of the first feed gear 30L by a spring (not illustrated) that biases the second displacement member 36. Thus, in this example, the two wires W are held between the first feed groove 32L of the first feed gear 30L and the second feed groove 32R of the second feed gear 30R. Further, the tooth portion 31L of the first feed gear 30L and the tooth portion 31R of the second feed gear 30R mesh with each other. Here, the relationship between the first displacement member 35 and the second displacement member 36 is such that by displacing the second displacement member 36 to bring the first displacement member 35 into a free state, the second feed gear 30R can be separated from the first feed gear 30L. However, the first displacement member 35 and the second displacement member 36 may be interlocked with each other.

Figure 4A:
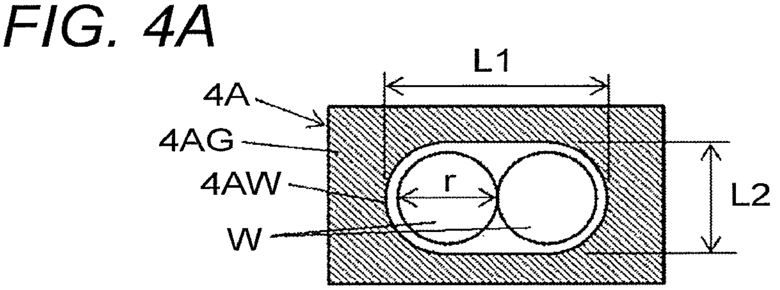
FIG. 4A is a view illustrating an example of a parallel guide of the present embodiment.
Figure 4B:
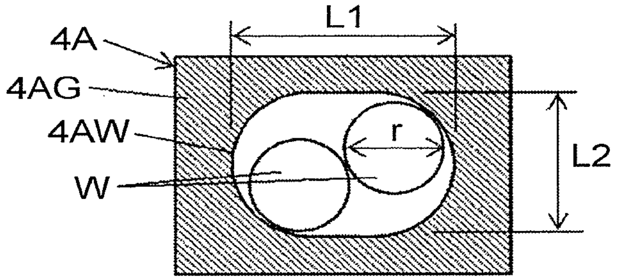
FIG. 4B is a view illustrating an example of a parallel guide of the present embodiment.
Figure 4C:
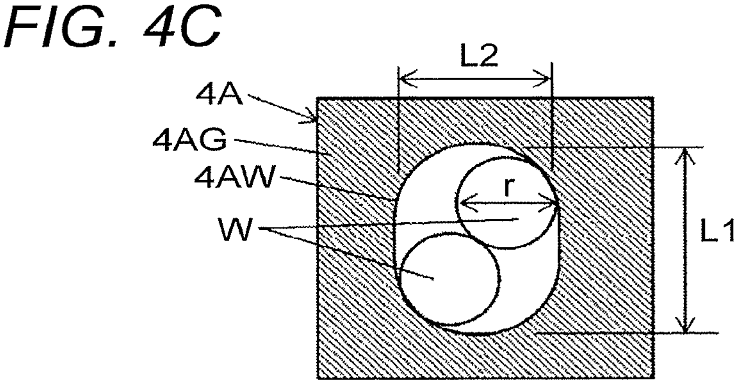
FIG. 4C is a view illustrating an example of a parallel guide of the present embodiment.
Figure 4D:
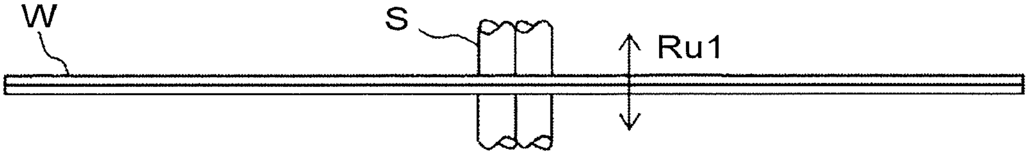
FIG. 4D is a view illustrating an example of parallel wires.
Figure 4E:
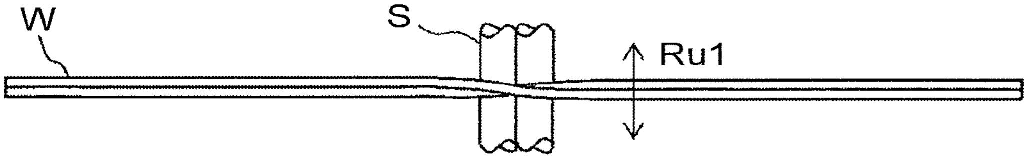
FIG. 4E is a view illustrating an example of intersecting twisted wires.

FIGS. 4A, 4B, and 4C are views illustrating an example of a parallel guide according to the present embodiment. Here, FIGS. 4A, 4B, and 4C are cross-sectional views taken along the line C-C of FIG. 2 and show the cross sectional shape of the parallel guide 4A provided at the introduction position P1. Further, the cross-sectional view taken along a line D-D of FIG. 2 illustrating the sectional shape of the parallel guide 4A provided at the intermediate position P2, and the cross-sectional view taken along a line E-E of FIG. 2 illustrating the sectional shape of the parallel guide 4A provided at the cutting discharge position P3 show the same shape. Further, FIG. 4D is a view illustrating an example of parallel wires, and FIG. 4E is a view illustrating an example of twisted wires intersecting each other.

The parallel guide 4A is an example of a restricting unit constituting the feeding unit and restricts the direction of a plurality of (two or more) wires W that have been sent. Two or more wires W enter and the parallel guide 4A feeds the two or more wires W in parallel. In the parallel guide 4A, two or more wires are arranged in parallel along a direction orthogonal to the feeding direction of the wire W. Specifically, two or more wires W are arranged in parallel along the axial direction of the loop-like wire W wound around the reinforcing bar S by the curl guide unit 5A. The parallel guide 4A has a wire restricting unit (for example, an opening 4AW described later) that restricts the directions and relative movement of the two or more wires W and makes them parallel. In this example, the parallel guide 4A has a guide main body 4AG, and the guide main body 4AG is formed with an opening 4AW which is the wire restricting unit for passing (inserting) a plurality of wires W. The opening 4AW penetrates the guide main body 4AG along the feeding direction of the wire W. When the plurality of sent wires W pass through the opening 4AW and after passing through the opening 4AW, the shape thereof is determined so that the plurality of wires W are arranged in parallel (that is, each of the plurality of wires W is aligned in a direction (radial direction) orthogonal to the feeding direction of the wire W (axial direction) and the axis of each of the plurality of wires W is substantially parallel to each other). Therefore, the plurality of wires W that have passed through the parallel guide 4A go out from the parallel guide 4A in a state of being arranged in parallel. In this way, the parallel guide 4A restricts the direction and orientation in which the two wires W are aligned in the radial direction so that the two wires W are arranged in parallel. Therefore, in the opening 4AW, one direction orthogonal to the feeding direction of the wire W is longer than the other direction which is orthogonal to the feeding direction of the wire W orthogonal to the one direction. The opening 4AW has a longitudinal direction (in which two or more wires W can be juxtaposed) is disposed along a direction orthogonal to the feeding direction of the wire W, more specifically, along the axial direction of the wire W loop-shaped by the curl guide unit 5A. As a result, two or more wires W inserted through the opening 4AW are fed in parallel to the feeding direction of the wire W, and an axis of one wire is offset from an axis of the other wire in a direction parallel to the axial direction Ru1 of the loop of wire W.

In the following description, when describing the shape of the opening 4AW, a cross-sectional shape in a direction orthogonal to the feeding direction of the wire W will be described. The cross-sectional shape in the direction along the feeding direction of the wire W will be described in each case.

For example, when the opening 4AW (the cross section thereof) is a circle having a diameter equal to or more than twice of the diameter of the wire W, or the length of one side is substantially a square which is twice or more the diameter of the wire W, the two wires W passing through the opening 4AW are in a state where they can freely move in the radial direction.

If the two wires W passing through the opening 4AW can freely move in the radial direction within the opening 4AW, the direction in which the two wires W are arranged in the radial direction cannot be restricted, whereby the two wires W coming out from the opening 4AW may not be in parallel, may be twisted or intersected.

In view of this, the opening 4AW is formed such that the length in the one direction, that is, the length L1 in the longitudinal direction is set to be slightly (n) times longer than the diameter r of the wire W in the form in which the plurality (n) of wires W are arranged along the radial direction, and the length in the other direction, that is, the length L2 in the lateral direction is set to be slightly (n) times longer than the diameter r of one wire W. In the present example, the opening 4AW has a length L1 in the longitudinal direction slightly twice longer than a diameter r of the wire W, and a length L2 in the lateral direction slightly longer than a diameter r of one wire W. In the present embodiment, the parallel guide 4A is configured such that the longitudinal direction of the opening 4AW is linear and the lateral direction is arcuate, but the configuration is not limited thereto.

In the example illustrated in FIG. 6A, the length L2 in the lateral direction of the parallel guide 4A is set to a length slightly longer than the diameter r of one wire W as a preferable length. However, since it is sufficient that the wire W comes off from the opening 4AW in a parallel state without intersecting or being twisted, in the configuration in which the longitudinal direction of the parallel guide 4A is oriented along the axial direction Ru1 of the loop of the wire W wound around the reinforcing bar S at the curl guide unit 5A, the length L2 of the parallel guide 4A in the lateral direction, as illustrated in FIG. 6B, may be within a range from a length slightly longer than the diameter r of one wire W to a length slightly shorter than the diameter r of two wires W.

Further, in the configuration in which the longitudinal direction of the parallel guide 4A is oriented in a direction orthogonal to the axial direction Ru1 of the loop of the wire W wound around the reinforcing bar S in the curl guide unit 5A, as illustrated in FIG. 6C, the length L2 in the lateral direction of the parallel guide 4A may be within a range from a length slightly longer than the diameter r of one wire W to a length shorter than the diameter r of two wires W.

In the parallel guide 4A, the longitudinal direction of the opening 4AW is oriented along a direction orthogonal to the feeding direction of the wire W, in this example, along the axial direction Ru1 of the loop of the wire W wound around the reinforcing bar S in the curl guide unit 5A.

As a result, the parallel guide 4A can pass two wires in parallel along the axial direction Ru1 of the loop of the wire W.

In the parallel guide 4A, when the length L2 in the lateral direction of the opening 4AW is shorter than twice the diameter r of the wire W and slightly longer than the diameter r of the wire W, even if the length L1 in the longitudinal direction of the opening 4AW is sufficiently twice or more times longer than the diameter r of the wire W, it is possible to pass the wires W in parallel.

However, the longer the length L2 in the lateral direction (for example, the length close to twice the diameter r of the wire W) and the longer the length L1 in the longitudinal direction, the wire W can further freely move in the opening 4AW. Then, the respective axes of the two wires W do not become parallel in the opening 4AW, and there is a high possibility that the wires W are twisted or intersect each other after passing through the opening 4AW.

Therefore, it is preferable that the longitudinal length L1 of the opening 4AW is slightly longer than twice the diameter r of the wire W, and the length L2 in the lateral direction is also slightly longer than the diameter r of the wire W so that the two wires W are arranged in parallel in the feed direction, and are adjacent each other in the lateral or radial direction.

The parallel guide 4A is provided at predetermined positions on the upstream side and the downstream side of the first feed gear 30L and the second feed gear 30R (the wire feeding unit 3A) with respect to the feeding direction for feeding the wire W in the forward direction. By providing the parallel guide 4A on the upstream side of the first feed gear 30L and the second feed gear 30R, the two wires W in a parallel state enter the wire feeding unit 3A. Therefore, the wire feeding unit 3A can feed the wire W appropriately (in parallel). Furthermore, by providing the parallel guide 4A also on the downstream side of the first feed gear 30L and the second feed gear 30R, while maintaining the parallel state of the two wires W sent from the wire feeding unit 3A, the wire W can be further sent to the downstream side.

The parallel guides 4A provided on the upstream side of the first feed gear 30L and the second feed gear 30R are provided at the introduction position P1 between the first feed gear 30L and the second feed gear 30R and the magazine 2A such that the wires W fed to the wire feeding unit 3A are arranged in parallel in a predetermined direction.

One of the parallel guides 4A provided on the downstream side of the first feed gear 30L and the second feed gear 30R is provided at the intermediate position P2 between the first feed gear 30L and the second feed gear 30R and the cutting unit 6A such that the wires W fed to the cutting unit 6A are arranged in parallel in the predetermined direction.

Further, the other one of the parallel guides 4A provided on the downstream side of the first feed gear 30L and the second feed gear 30R is provided at the cutting discharge position P3 where the cutting unit 6A is disposed such that the wires W fed to the curl guide unit 5A are arranged in parallel in the predetermined direction.

The parallel guide 4A provided at the introduction position P1 has the above-described shape in which at least the downstream side of the opening 4AW restricts the radial direction of the wire W with respect to the feeding direction of the wire W sent in the forward direction. On the other hand, the opening area of the side facing the magazine 2A (the wire introducing unit), which is the upstream side of the opening 4AW with respect to the feeding direction of the wire W sent in the forward direction, has a larger opening area than the downstream side. Specifically, the opening 4AW has a tube-shaped hole portion that restricts the direction of the wire W and a conical (funnel-shaped, tapered) hole portion in which an opening area gradually increases from the upstream side end of the tube-shaped hole portion to the inlet portion of the opening 4AW as the wire introducing portion. By making the opening area of the wire introducing portion the largest and gradually reducing the opening area therefrom, it is easy to allow the wire W to enter the parallel guide 4. Therefore, the work of introducing the wire W into the opening 4AW can be performed easily.

The other parallel guide 4A also has the same configuration, and the downstream opening 4AW with respect to the feeding direction of the wire W sent in the forward direction has the above-described shape that restricts the direction of the wire W in the radial direction. Further, with regard to the other parallel guide 4, the opening area of the opening on the upstream side with respect to the feeding direction of the wire W sent in the forward direction may be made larger than the opening area of the opening on the downstream side.

The parallel guide 4A provided at the introduction position P1, the parallel guide 4A provided at the intermediate position P2, and the parallel guide 4A provided at the cutting discharge position P3 are arranged such that the longitudinal direction of the opening 4AW orthogonal to the feeding direction of the wire W is in the direction along the axial direction Rut of the loop of wire W wound around the reinforcing bar S.

As a result, as illustrated in FIG. 4D, the two wires W sent by the first feed gear 30L and the second feed gear 30R are sent while maintaining a state of being arranged in parallel in the axial direction Ru1 of the loop of wire W wound around the reinforcing bar S, and, as illustrated in FIG. 4E, the two wires W are prevented from intersecting and being twisted during feeding.

In the present example, the opening 4AW is a tube-shaped hole having a predetermined depth (a predetermined distance or depth from the inlet to the outlet of the opening 4AW) from the inlet to the outlet of the opening 4AW (in the feeding direction of the wire W), but the shape of the opening 4AW is not limited to this. For example, the opening 4AW may be a planar hole having almost no depth with which the plate-like guide main body 4AG is opened. Further, the opening 4AW may be a groove-shaped guide (for example, a U-shaped guide groove with an opened upper portion) instead of the hole portion penetrating through the guide main body 4AG. Furthermore, in the present example, the opening area of the inlet portion of the opening 4AW as the wire introducing portion is made larger than the other portion, but it may not necessarily be larger than the other portion. The shape of the opening 4AW is not limited to a specific shape as long as the plurality of wires that have passed through the opening 4AW and come out of the parallel guide 4A are in a parallel state.

Hitherto, an example in which the parallel guide 4A is provided at the upstream side (introduction position P1) and a predetermined position (intermediate position P2 and cutting discharge position P3) on the downstream side of the first feed gear 30L and the second feed gear 30R is described. However, the position where the parallel guide 4A is installed is not necessarily limited to these three positions. That is, the parallel guide 4A may be installed only in the introduction position P1, only in the intermediate position P2, or only in the cutting discharge position P3, and only in the introduction position P1 and the intermediate position P2, only in the introduction position P1 and the cutting discharge position P3, or only in the intermediate position P2 and the cutting discharge position P3. Further, four or more parallel guides 4A may be provided at any position between the introduction position P1 and the curl guide unit 5A on the downstream side of the cutting position P3. The introduction position P1 also includes the inside of the magazine 2A. That is, the parallel guide 4A may be arranged in the vicinity of the outlet from which the wire W is drawn inside the magazine 2A.

The curl guide unit 5A is an example of guide unit constituting the feeding unit and constitutes a conveying path for winding the two wires W around the reinforcing bars S in a loop shape. The curl guide unit 5A includes a first guide unit 50 for curling the wire W sent by the first feed gear 30L and the second feed gear 30R and a second guide unit 51 for guiding the wire W fed from the first guide unit 50 to the binding unit 7A.

Figure 5:
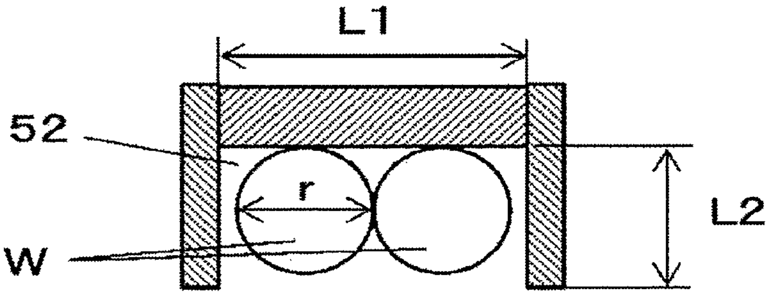
FIG. 5 is a view illustrating an example of a guide groove of the present embodiment.

The first guide unit 50 includes guide grooves 52 constituting a feed path of the wire W and guide pins 53 and 53*b* as a guide member for curling the wire W in cooperation with the guide groove 52. FIG. 5 is a view illustrating an example of the guide groove of the present embodiment. FIG. 5 is a sectional view taken along the line G-G of FIG. 2.

The guide groove 52 forms a guide unit and restricts a direction in the radial direction of movement the wire W orthogonal to the feeding direction of the wire W together with the parallel guide 4A. Therefore, in this example, the guide groove 52 is configured by an opening with an elongated shape in which one direction orthogonal to the feeding direction of the wire W is longer than the other direction orthogonal to the feeding direction of the wire W and orthogonal to the one direction.

The guide groove 52 has a longitudinal length L1, that is, a length in a width direction of the groove slightly longer than a plurality of diameters r of a plurality of the wires W in a form in which the wires W are arranged along the radial direction and a lateral length L2 in the lateral direction has a length slightly longer than the diameter r of one wire W. In the present embodiment, the length L1 of the guide groove 52 in the longitudinal direction is slightly longer than the diameter r of two wires W. In the guide groove 52, the longitudinal direction of the opening is arranged in the direction along the axial direction Ru1 of the loop of wire W. It should be noted that the guide groove 52 may not necessarily have the function of restricting the direction of the wire W in the radial direction. In that case, the length (length) in the longitudinal direction and in the lateral direction of the guide groove 52 is not limited to the above-described size.

The guide pin 53 is provided on the side of the introducing portion of the wire W that is fed by the first feed gear 30L and the second feed gear 30R in the first guide unit 50 and is arranged inside the loop Ru formed by the wire W in the radial direction with respect to the feed path of the wire W by the guide groove 52. The guide pin 53 restricts the feed path of the wire W so that the wire W fed along the guide groove 52 does not enter the inside of the loop Ru formed by the wire W in the radial direction.

The guide pin 53*b* is provided on the side of the discharge portion of the wire W which is fed by the first feed gear 30L and the second feed gear 30R in the first guide unit 50 and is arranged on the outer side in the radial direction of the loop Ru formed by the wire W with respect to the feed path of the wire W by the guide groove 52.

In the wire W sent by the first feed gear 30L and the second feed gear 30R, the radial position of the loop Ru formed by the wire W is restricted at least at three points including two points on the outer side in the radial direction of the loop Ru formed by the wire W and at least one point on the inner side between the two points, so that the wire W is curled.

In this example, the radially outer position of the loop Ru formed by the wire W is restricted at two points of the parallel guide 4A at the cutting discharge position P3 provided on the upstream side of the guide pin 53 with respect to the feeding direction of the wire W sent in the forward direction and the guide pin 53*b* provided on the downstream side of the guide pin 53. Further, the radially inner position of the loop Ru formed by the wire W is restricted by the guide pin 53.

The curl guide unit 5A includes a retreat mechanism 53*a* for allowing the guide pin 53 to retreat from a path through which the wire W moves by an operation of winding the wire W around the reinforcing bar S. After the wire W is wound around the reinforcing bar S, the retreat mechanism 53*a* is displaced in conjunction with the operation of the binding unit 7A, and retreats the guide pin 53 from the path where the wire W moves before the timing of winding the wire W around the reinforcing bar S.

The second guide unit 51 includes a fixed guide unit 54 as a third guide unit for restricting the radial position of the loop Ru (movement of the wire W in the radial direction of the loop Ru) formed by the wire W wound around the reinforcing bar S and a movable guide unit 55 serving as a fourth guide unit for restricting the position along the axial direction Ru1 of the loop Ru formed by the wire W wound around the reinforcing bar S (movement of the wire W in the axial direction Ru1 of the loop Ru).

Figure 6:
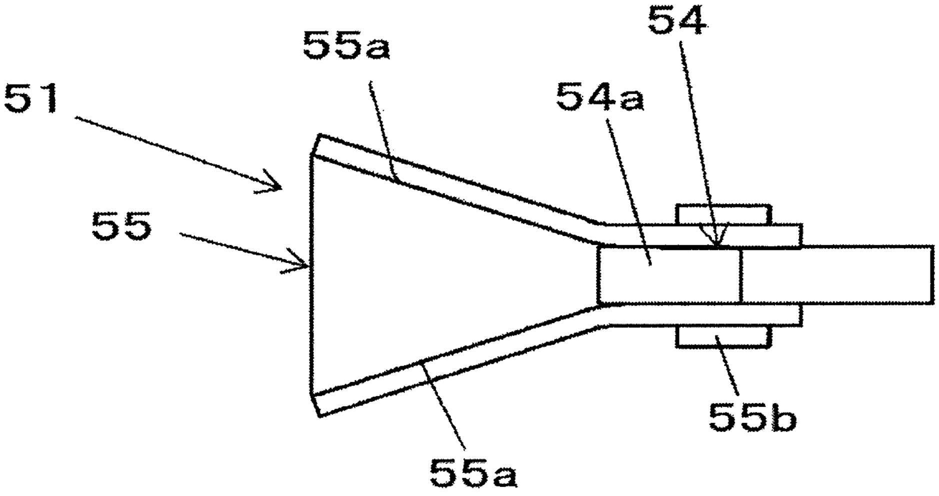
FIG. 6 is a view illustrating an example of a second guide unit of the present embodiment.
Figure 7A:
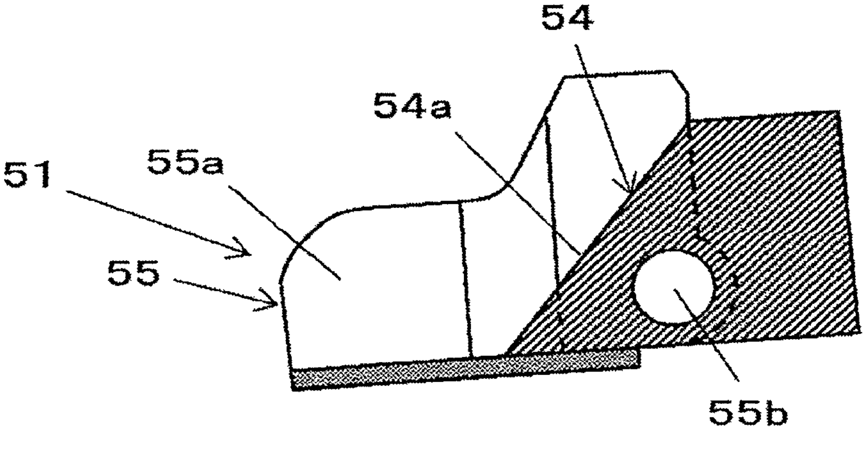
FIG. 7A is a view illustrating an example of a second guide unit of the present embodiment.
Figure 7B:
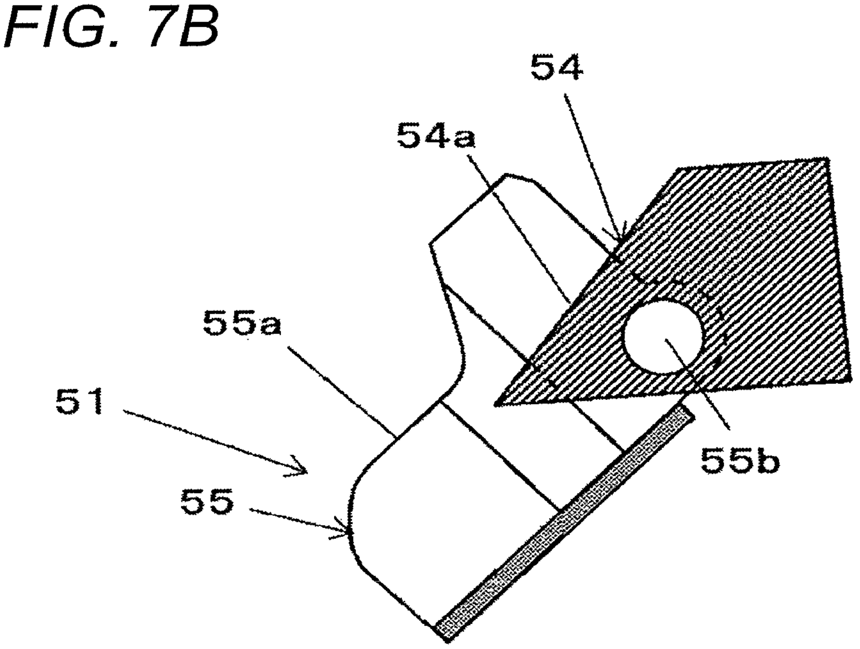
FIG. 7B is a view illustrating an example of a second guide unit of the present embodiment.
Figure 8A:
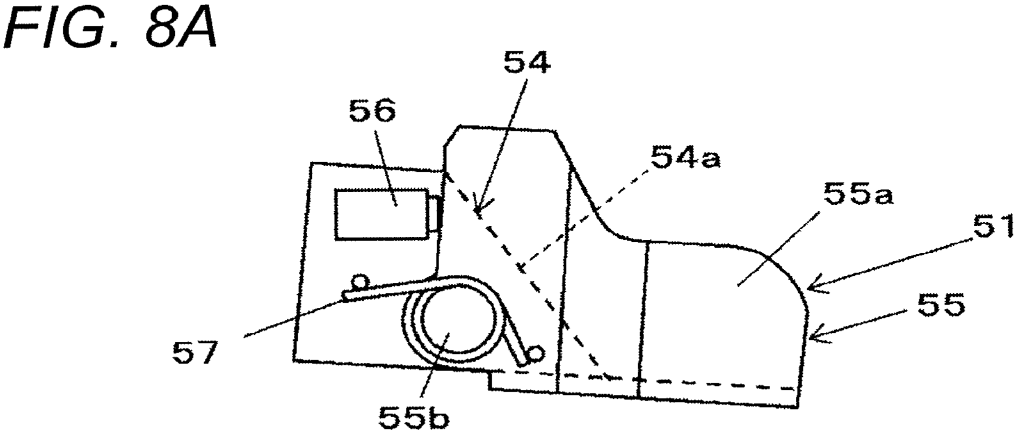
FIG. 8A is a view illustrating an example of a second guide unit of the present embodiment.
Figure 8B:
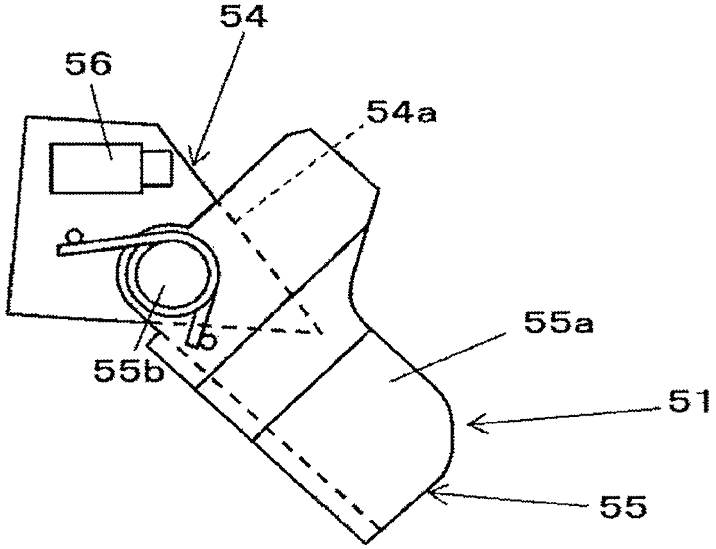
FIG. 8B is a view illustrating an example of a second guide unit of the present embodiment.

FIGS. 6, 7A, 7B, 8A, and 8B are views illustrating an example of a second guide unit, FIG. 6 is a plan view of the second guide unit 51 as viewed from above, FIGS. 7A and 7B are side views of the second guide unit 51 as viewed from one side, and FIGS. 8A and 8B are side views of the second guide unit 51 as viewed from the other side.

The fixed guide unit 54 is provided with a wall surface 54*a* as a surface extending along the feeding direction of the wire W on the outer side in the radial direction of the loop Ru formed by the wire W wound around the reinforcing bar S. When the wire W is wound around the reinforcing bar S, the wall surface 54*a* of the fixed guide unit 54 restricts the radial position of the loop Ru formed by the wire W wound around the reinforcing bar S. The fixed guide unit 54 is fixed to the main body 10A of the reinforcing bar binding machine 1A, and the position thereof is fixed with respect to the first guide unit 50. The fixed guide unit 54 may be integrally formed with the main body 10A. In addition, in the configuration in which the fixed guide unit 54, which is a separate component, is attached to the main body 10A, the fixed guide unit 54 is not perfectly fixed to the main body 10A, but in the operation of forming the loop Ru may be movable to such an extent that movement of the wire W can be restricted.

The movable guide unit 55 is provided on the distal end side of the second guide unit 51 and includes a wall surface 55*a* that is provided on both sides along the axial direction Ru1 of the loop Ru formed by the wire W wound around the reinforcing bar S and is erected inward in the radial direction of the loop Ru from the wall surface 54*a*. When the wire W is wound around the reinforcing bar S, the movable guide unit 55 restricts the position along the axial direction Ru1 of the loop Ru formed by the wire W wound around the reinforcing bar S using the wall surface 55*a*. The wall surface 55*a* of the movable guide unit 55 has a tapered shape in which the gap of the wall surfaces 55*a* is spread at the distal end side where the wire W sent from the first guide unit 50 enters and narrows toward the fixed guide unit 54*b*. As a result, the position of the wire W sent from the first guide unit 50 in the axial direction Ru1 of the loop Ru formed by the wire W wound around the reinforcing bar S is restricted by the wall surface 55*a* of the movable guide unit 55, and guided to the fixed guide unit 54 by the movable guide unit 55.

The movable guide unit 55 is supported on the fixed guide unit 54 by a shaft 55*b* on the side opposite to the distal end side into which the wire W sent from the first guide unit 50 enters. In the movable guide unit 55, the distal end side thereof into which the wire W fed from the first guide unit 50 enters is opened and closed in the direction to come into contact with and separate from the first guide unit 50 by the rotation operation of the loop Ru formed by the wire W wound around the reinforcing bar S along the axial direction Ru1 with the shaft 55*b* as a fulcrum.

In the reinforcing bar binding machine, when binding the reinforcing bar S, between a pair of guide members provided for winding the wire W around the reinforcing bar S, in this example, between the first guide unit 50 and the second guide unit 51, a reinforcing bar is inserted (set) and then the binding work is performed. When the binding work is completed, in order to perform the next binding work, the first guide unit 50 and the second guide unit 51 are pulled out from the reinforcing bar S after the completion of the binding. In the case of pulling out the first guide unit 50 and the second guide unit 51 from about the reinforcing bar S, if the reinforcing bar binding machine 1A is moved in the direction of the arrow Z3 (see FIG. 1) which is one direction of separation from the reinforcing bar S, the reinforcing bar S can be pulled out from the first guide unit 50 and the second guide unit 51 without any problem. However, for example, when the reinforcing bar S is arranged at a predetermined interval along the arrow Y2 and these reinforcing bars S are sequentially bound, moving the reinforcing bar binding machine 1A in the direction of the arrow Z3 after each binding is troublesome, and if it can be moved in the direction of arrow Z2, the binding work can be performed quickly. However, in the conventional reinforcing bar binding machine disclosed in, for example, Japanese Patent No. 4747456, since the guide member corresponding to the second guide unit 51 in the present example is fixed to the binding machine body, when trying to move the reinforcing bar binding machine in the direction of the arrow Z2, the guide member is caught on the reinforcing bar S. Therefore, in the reinforcing bar binding machine 1A, the second guide unit 51 (the movable guide unit 55) is made movable as described above and the reinforcing bar binding machine 1A is moved in the direction of the arrow Z2 so that the reinforcing bar S is more easily pulled out from between the first guide unit 50 and the second guide unit 51.

Therefore, the movable guide unit 55 rotates about the shaft 55*b* as a fulcrum, and thus opened and closed between a guide position at which the wire W sent out from the first guide unit 50 can be guided to the second guide unit 51 and a retreat position at which the reinforcing bar binding machine 1A is moved in the direction of the arrow Z2 and then is retreated in the operation of pulling out the reinforcing bar binding machine 1A from the reinforcing bar S.

The movable guide unit 55 is urged in a direction in which the distance between the distal end side of the first guide unit 50 and the distal end side of the second guide unit 51 is reduced by the urging unit (biasing unit) such as a torsion coil spring 57, and is held in the guide position illustrated in FIGS. 7A and 8A by the force of the torsion coil spring 57. In addition, when the movable guide unit 55 is pushed to the reinforcing bar S by the operation of pulling out the reinforcing bar binding machine 1A from the reinforcing bar S, the movable guide unit 55 is opened from the guide position to the retreat position illustrated in FIGS. 7B and 8B. The guide position is a position where the wall surface 55*a* of the movable guide unit 55 exists at a position where the wire W forming the loop Ru passes. The retreat position is a position at which at which the reinforcing bar S presses the movable guide unit 55 by the movement of the reinforcing bar binding machine 1A, and the reinforcing bar S can be pulled out from between the first guide unit 50 and the second guide unit 51. Here, the direction in which the reinforcing bar binding machine 1A is moved is not uniform, and even if the movable guide unit 55 slightly moves from the guide position, the reinforcing bar S can be pulled out from between the first guide unit 50 and the second guide unit 51, and thus a position slightly moved from the guide position is also included in the retreat position.

The reinforcing bar binding machine 1A includes a guide opening/closing sensor 56 that detects opening and closing of the movable guide unit 55. The guide opening/closing sensor 56 detects the closed state and the open state of the movable guide unit 55, and outputs a predetermined detection signal.

The cutting unit 6A includes a fixed blade unit 60, a rotary blade unit 61 for cutting the wire W in cooperation with the fixed blade unit 60, and a transmission mechanism 62 which transmits the operation of the binding unit 7A, in this example, the operation of a movable member 83 (to be described later) moving in a liner direction to the rotary blade unit 61 and rotates the rotary blade unit 61. The fixed blade unit 60 is configured by providing an edge portion capable of cutting the wire W in the opening through which the wire W passes. In the present example, the fixed blade unit 60 includes a parallel guide 4A arranged at the cutting discharge position P3.

The rotary blade unit 61 cuts the wire W passing through the parallel guide 4A of the fixed blade unit 60 by the rotation operation with the shaft 61*a* as a fulcrum. The transmission mechanism 62 is displaced in conjunction with the operation of the binding unit 7A, and after the wire W is wound around the reinforcing bar S, the rotary blade unit 61 is rotated according to the timing of twisting the wire W to cut the wire W.

The binding unit 7A is an example of a binding unit, and includes a gripping unit 70 that grips the wire W and a bending unit 71 configured to bend one end WS side and the other end WE side of the wire W gripped by the gripping unit 70 toward the reinforcing bar S.

The gripping unit 70 is an example of a gripping unit, and includes a fixed gripping member 70C, a first movable gripping member 70L, and a second movable gripping member 70R as illustrated in FIG. 2. The first movable gripping member 70L and the second movable gripping member 70R are arranged in the lateral direction via the fixed gripping member 70C. Specifically, the first movable gripping member 70L is disposed on one side along the axial direction of the wire W to be wound around, with respect to the fixed gripping member 70C, and the second movable gripping member 70R is disposed on the other side.

The first movable gripping member 70L is displaced in a direction to come into contact with and separate from the fixed gripping member 70C. In addition, the second movable gripping member 70R is displaced in a direction to come into contact with and separate from the fixed gripping member 70C.

As the first movable gripping member 70L moves in a direction away from the fixed gripping member 70C, in the gripping unit 70, a feed path through which the wire W passes between the first movable gripping member 70L and the fixed gripping member 70C is formed. On the other hand, as the first movable gripping member 70L moves toward the fixed gripping member 70C, the wire W is gripped between the first movable gripping member 70L and the fixed gripping member 70C.

When the second movable gripping member 70R moves in a direction away from the fixed gripping member 70C, in the gripping unit 70 forms a feed path through which the wire W passes between the second movable gripping member 70R and the fixed gripping member 70C is formed. On the other hand, as the second movable gripping member 70R moves toward the fixed gripping member 70C, the wire W is gripped between the second movable gripping member 70R and the fixed gripping member 70C.

The wire W sent by the first feed gear 30L and the second feed gear 30R and passed through the parallel guide 4A at the cutting discharge position P3 passes between the fixed gripping member 70C and the second movable gripping member 70R and is guided to the curl guide unit 5A. The wire W which has been wound by the curl guide unit 5A passes between the fixed gripping member 70C and the first movable gripping member 70L.

Therefore, the first gripping unit for gripping one end WS side of the wire W is constituted by a pair of gripping members, for example, the fixed gripping member 70C and the first movable gripping member 70L. Further, the fixed gripping member 70C and the second movable gripping member 70R constitute a second gripping unit for gripping the other end WE side of the wire W cut by the cutting unit 6A.

Figure 9A:
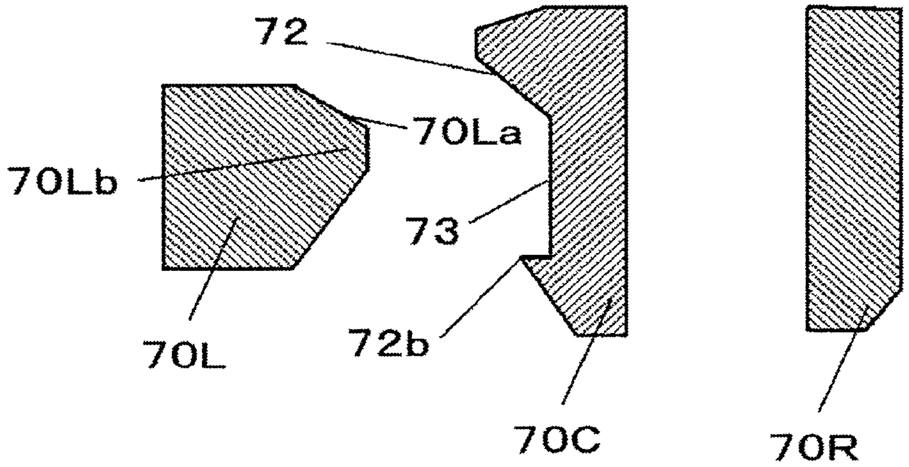
FIG. 9A is a view illustrating main parts of a gripping unit according to the present embodiment.
Figure 9B:
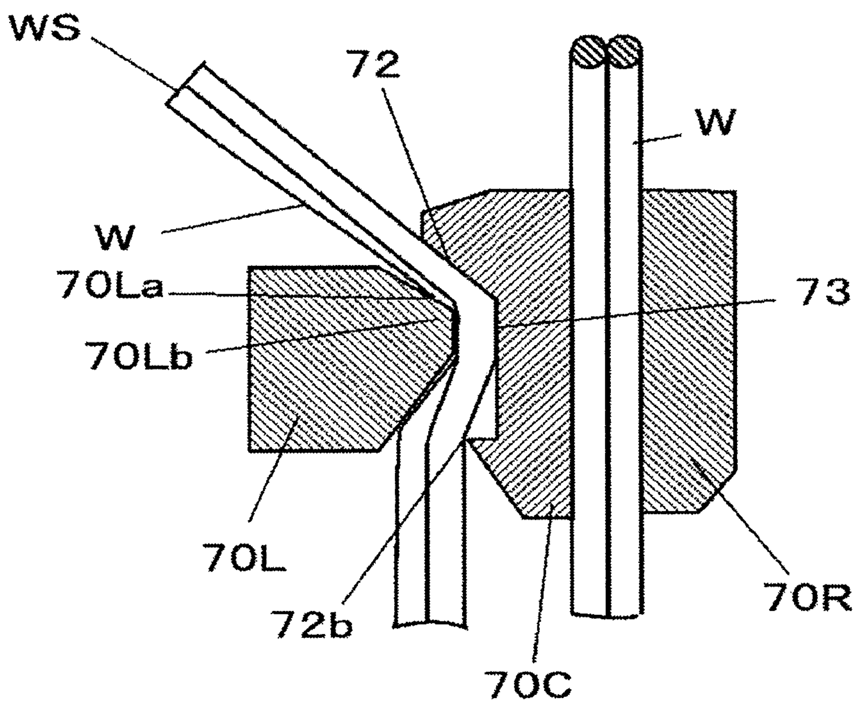
FIG. 9B is a view illustrating main parts of a gripping unit according to the present embodiment.

FIGS. 9A and 9B are views illustrating main parts of the gripping unit of this embodiment. The first movable gripping member 70L includes a protrusion 70Lb protruding toward the fixed gripping member 70C on a surface facing the fixed gripping member 70C. On the other hand, the fixed gripping member 70C includes a recess 73, into which the protrusion 70Lb of the first movable gripping member 70L is inserted, on a surface facing the first movable gripping member 70L. Accordingly, when the wire W is gripped with the first movable gripping member 70L and the fixed gripping member 70C, the wire W is bent toward the first movable gripping member 70L.

Specifically, the fixed gripping member 70C includes a preliminary bending portion 72. The preliminary folding portion 72 is configured such that a protrusion protruding toward the first movable gripping member 70L is provided at a downstream end along the feeding direction of the wire W fed in the forward direction on the surface facing the first movable gripping member 70L of the fixed gripping member 70C.

In order to grip the wire W between the fixed gripping member 70C and the first movable gripping member 70L and prevent the gripped wire W from being pulled out, the gripping unit 70 has the protrusion portion 72*b* and the recess portion 73 on the fixed gripping member 70C. The protrusion portion 72*b* is provided on the upstream end along the feeding direction of the wire W fed in the forward direction on the surface facing the first movable gripping member 70L of the fixed gripping member 70C and protrudes to the first movable gripping member 70L. The recess portion 73 is provided between the preliminary bending portion 72 and the protrusion portion 72*b* and has a recess shape in a direction opposite to the first movable gripping member 70L.

The first movable gripping member 70L has a recess portion 70La into which the preliminary bending portion 72 of the fixed gripping member 70C enters and a protrusion portion 70Lb which enters the recess portion 73 of the fixed gripping member 70C.

As a result, as illustrated in FIG. 9B, by the operation of gripping one end WS side of the wire W between the fixed gripping member 70C and the first movable gripping member 70L, the wire W is pressed by the preliminary bending portion 72 on the first movable gripping member 70L side, and one end WS of the wire W is bent in a direction away from the wire W gripped by the fixed gripping member 70C and the second movable gripping member 70R.

Gripping the wire W with the fixed gripping member 70C and the second movable gripping member 70R includes a state in which the wire W can move freely to some extent between the fixed gripping member 70C and the second movable gripping member 70R. This is because, in the operation of winding the wire W around the reinforcing bar S, it is necessary to move the wire W between the fixed gripping member 70C and the second movable gripping member 70R.

The bending portion 71 is an example of a bending unit which bends the wires W such that the end portions of the wires W are located closer to the binding objects than a top portions of the wires W that fully protrude in the direction away from the binding objects after the wires W bind the binding objects. The bending portion 71 bends the wires W gripped by the gripping unit 70 before the wires W are twisted by the gripping unit 70.

The bending portion 71 is, an example of a binding unit, provided around the gripping unit 70 so as to cover a part of the gripping unit 70, and is provided so as to be movable along the axial direction of the gripping unit 70. Specifically, the bending portion 71 is configured to approach the one end WS side of the wire W gripped by the fixed gripping member 70C and the first movable gripping member 70L and the other end WE side of the wire W gripped by the fixed gripping member 70C and the second movable gripping member 70R, to be movable in the direction in which the one end WS side and the other end WE side of the wire W are bent in the forward/backward direction that is the direction away from the bent wires W.

The bending portion 71 moves in the forward direction (see FIG. 1) indicated by an arrow F, so that one end WS side of the wire W gripped by the fixed gripping member 70C and the first movable gripping member 70L is bent to the reinforcing bar S side with the gripping position as the fulcrum. Further, the bending portion 71 moves in the forward direction indicated by the arrow F, whereby the other end WE side of the wire W between the fixed gripping member 70C and the second movable gripping member 70R is bent to the reinforcing bar S side with the gripping position as the fulcrum.

The wire W is bent by the movement of the bending portion 71, so that the wire W passing between the second movable gripping member 70R and the fixed gripping member 70C is pressed by the bending portion 71, and the wire W is prevented from coming off between the fixed gripping member 70C and the second movable gripping member 70R.

The binding unit 7A includes a length restricting unit 74 that restricts the position of one end WS of the wire W. The length restricting unit 74 is constituted by providing a member against which the one end WS of the wire W abuts in the feed path of the wire W that has passed between the fixed gripping member 70C and the first movable gripping member 70L. In order to secure a predetermined distance from the gripping position of the wire W by the fixed gripping member 70C and the first movable gripping member 70L, the length restricting unit 74 is provided in the first guide unit 50 of the curl guide unit 5A in this example.

The reinforcing bar binding machine 1A includes a binding unit driving mechanism 8A that drives the binding unit 7A. The binding unit driving mechanism 8A includes a motor 80, a rotary shaft 82 driven by the motor 80 via a speed reducer 81 that performs deceleration and torque amplification, a movable member 83 that is displaced by a rotation operation of the rotary shaft 82, and a rotation restricting member 84 that restricts the rotation of the movable member 83 interlocking with the rotation operation of the rotary shaft 82.

In the rotary shaft 82 and the movable member 83, by the screw portion provided on the rotary shaft 82 and the nut portion provided in the movable member 83, the rotation operation of the rotary shaft 82 is converted to the movement of the movable member 83 along the rotary shaft 82 in the forward and backward direction.

The movable member 83 is locked to the rotation restricting member 84 in the operation region where the wire W is gripped by the gripping unit 70, and then the wire W is bent by the bending portion 71, so that the movable member 83 moves in the forward and backward direction in a state where the rotation operation is restricted by the rotation restricting member 84. Further, the movable member 83 is rotated by the rotation operation of the rotary shaft 82 by coming off from the locking of the rotation restricting member 84.

In this example, the movable member 83 is connected to the first movable gripping member 70L and the second movable gripping member 70R via a cam (not illustrated). The binding unit driving mechanism 8A is configured that the movement of the movable member 83 in the forward and backward direction is converted into the operation of displacing the first movable gripping member 70L in the direction to come into contact with and separate from the fixed gripping member 70C, and the operation of displacing the second movable gripping member 70R in the direction to come into contact with and separate from the fixed gripping member 70C.

Further, in the binding unit driving mechanism 8A, the rotation operation of the movable member 83 is converted into the rotation operation of the fixed gripping member 70C, the first movable gripping member 70L and the second movable gripping member 70R.

Furthermore, in the binding unit driving mechanism 8A, the bending portion 71 is provided integrally with the movable member 83, so that the bending portion 71 moves in the forward and backward direction by the movement of the movable member 83 in the forward and backward direction.

The retreat mechanism 53*a* of the guide pin 53 is configured by a link mechanism that converts the movement of the movable member 83 in the forward and backward direction into displacement of the guide pin 53. The transmission mechanism 62 of the rotary blade portion 61 is configured by a link mechanism that converts the movement of the movable member 83 in the forward and backward direction into the rotation operation of the rotary blade portion 61.

The reinforcing bar binding machine 1A according to the present embodiment is a form used by a worker in hand and includes a main body 10A and a handle portion 11A. As illustrated in FIG. 1 and the like, the reinforcing bar binding machine 1A incorporates a binding unit 7A and a binding unit driving mechanism 8A in the main body 10A and has a curl guide unit 5A (not illustrated) at one end side in the longitudinal direction (first direction Y1). Further, the handle portion 11A is provided so as to protrude from the other end side in the longitudinal direction of the main body 10A in one direction (second direction Y2) substantially orthogonal (intersecting) with the longitudinal direction. Further, the wire feeding unit 3A is provided on the side along the second direction Y2 with respect to the binding unit 7A, the displacement unit 34 is provided on the other side along the first direction Y1 with respect to the wire feeding unit 3A, that is, on the handle portion 11A with respect to the wire feeding unit 3A in the main body 10A, and the magazine 2A is provided on the side along the second direction Y2 with respect to the wire feeding unit 3A.

Thus, the magazine 2A is provided on one side along the first direction Y1 with respect to the handle portion 11A. A trigger 12A is provided at one side along the first direction Y1 of the handle portion 11A, and the control unit 14A controls the feed motor 33*a* and the motor 80 according to the state of the switch 13A pressed by the operation of the trigger 12A. Further, a battery 15A is detachably attached to an end portion along a second direction Y2 of the handle portion 11A.

Example of Operation of Reinforcing Bar Binding Machine in this Embodiment

Figure 16:
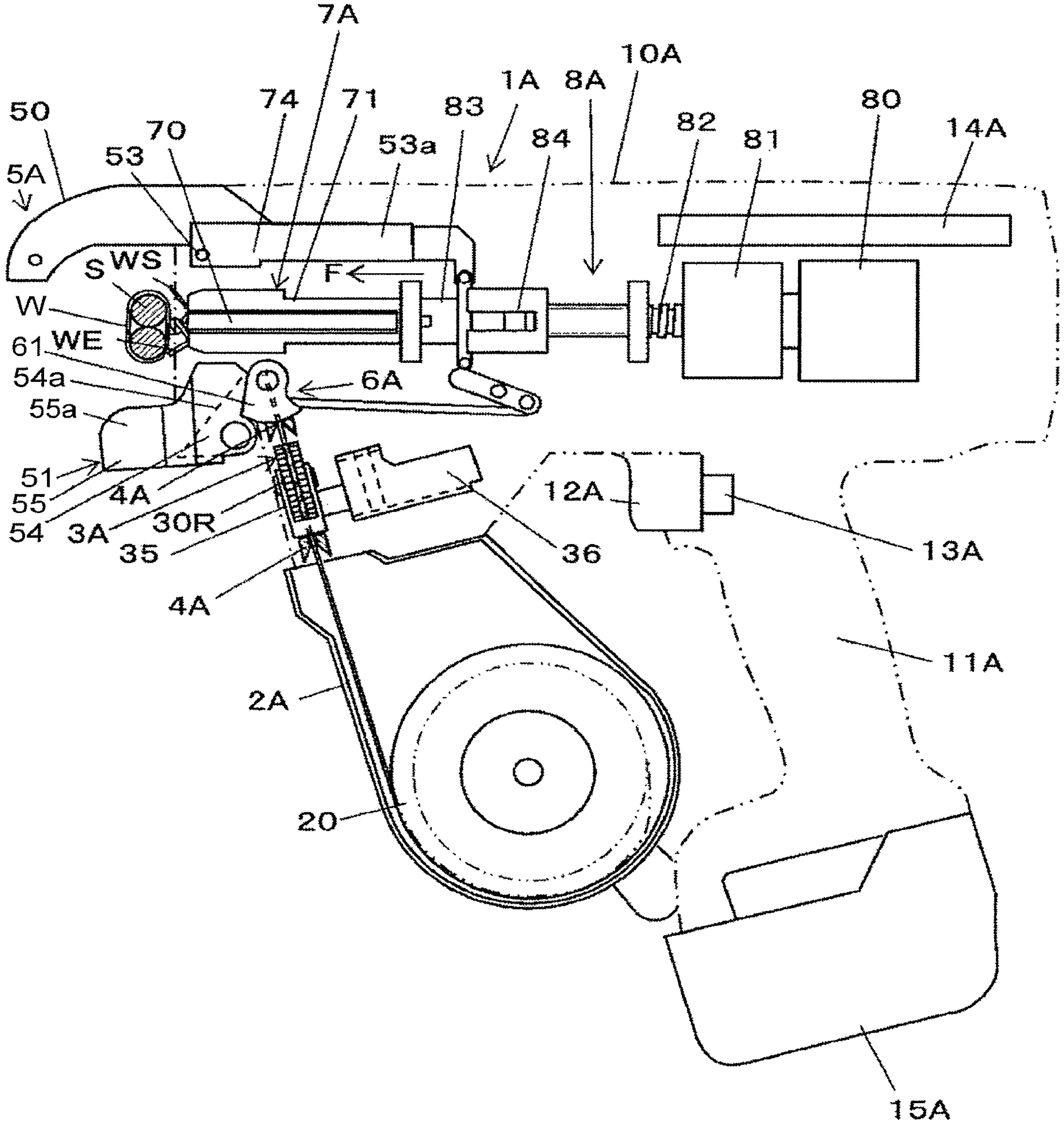
FIG. 16 is an explanatory view of an operation of the reinforcing bar binding machine of the present embodiment.
Figure 17:
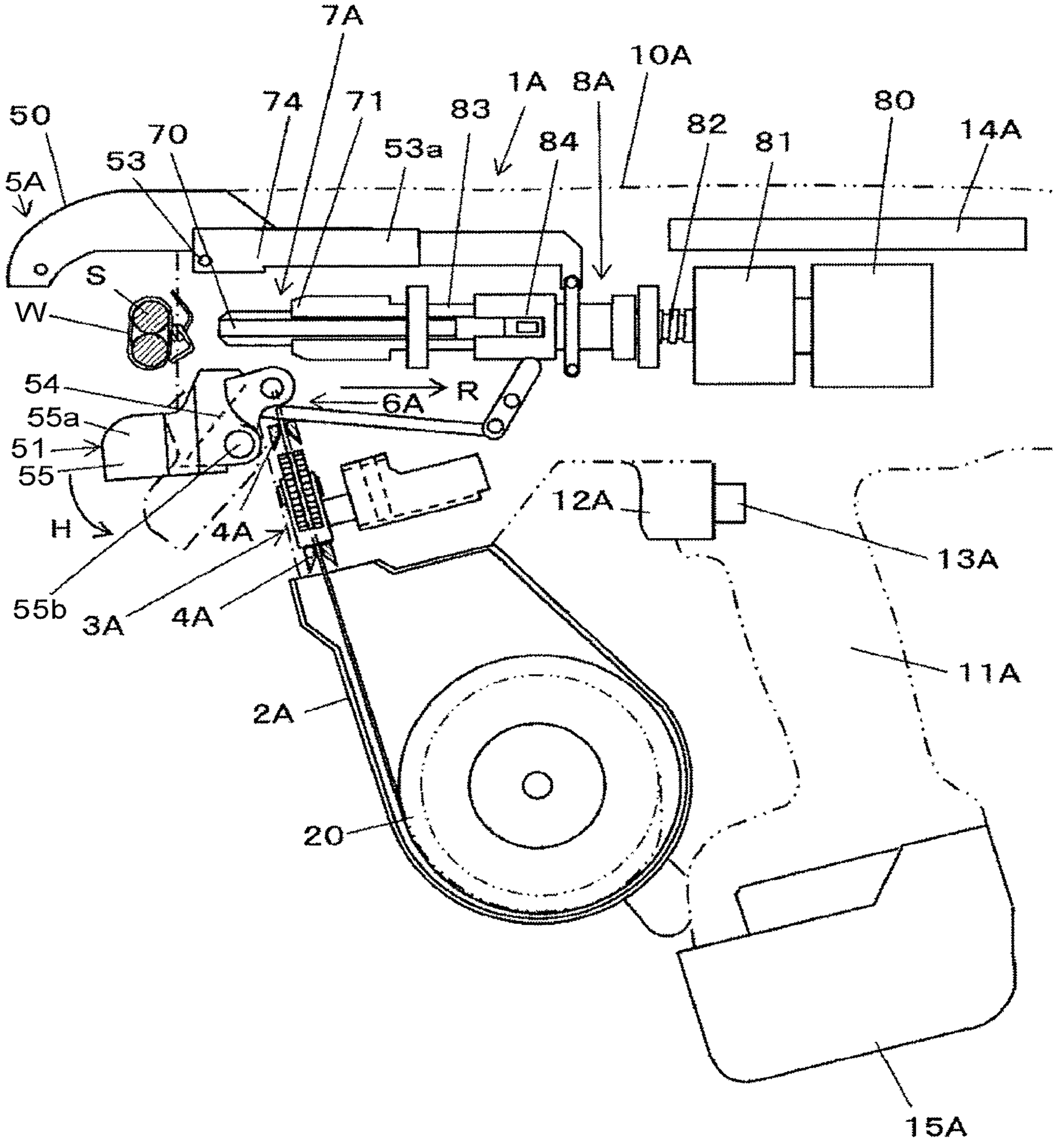
FIG. 17 is an explanatory view of an operation of the reinforcing bar binding machine of the present embodiment.
Figure 18A:
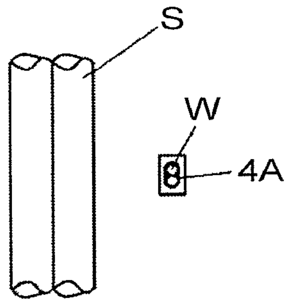
FIG. 18A is an explanatory view of an operation of winding a wire around a reinforcing bar.
Figure 18B:
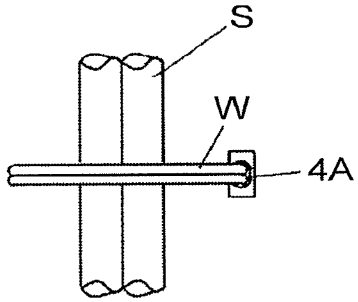
FIG. 18B is an explanatory view of an operation of winding a wire around a reinforcing bar.
Figure 18C:
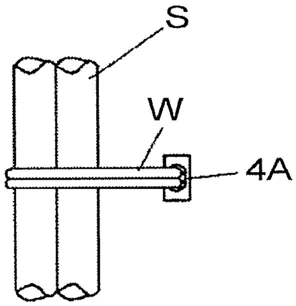
FIG. 18C is an explanatory view of an operation of winding a wire around a reinforcing bar.
Figure 19A:
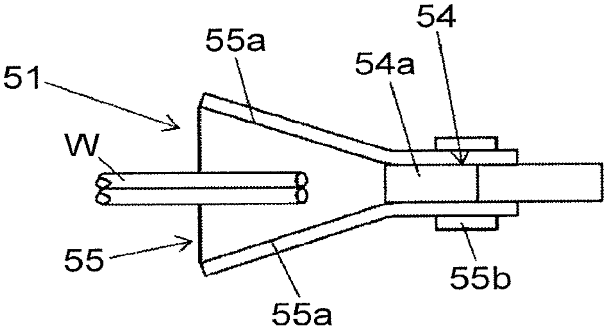
FIG. 19A is an explanatory view of an operation of forming a loop with a wire by a curl guide unit.
Figure 19B:
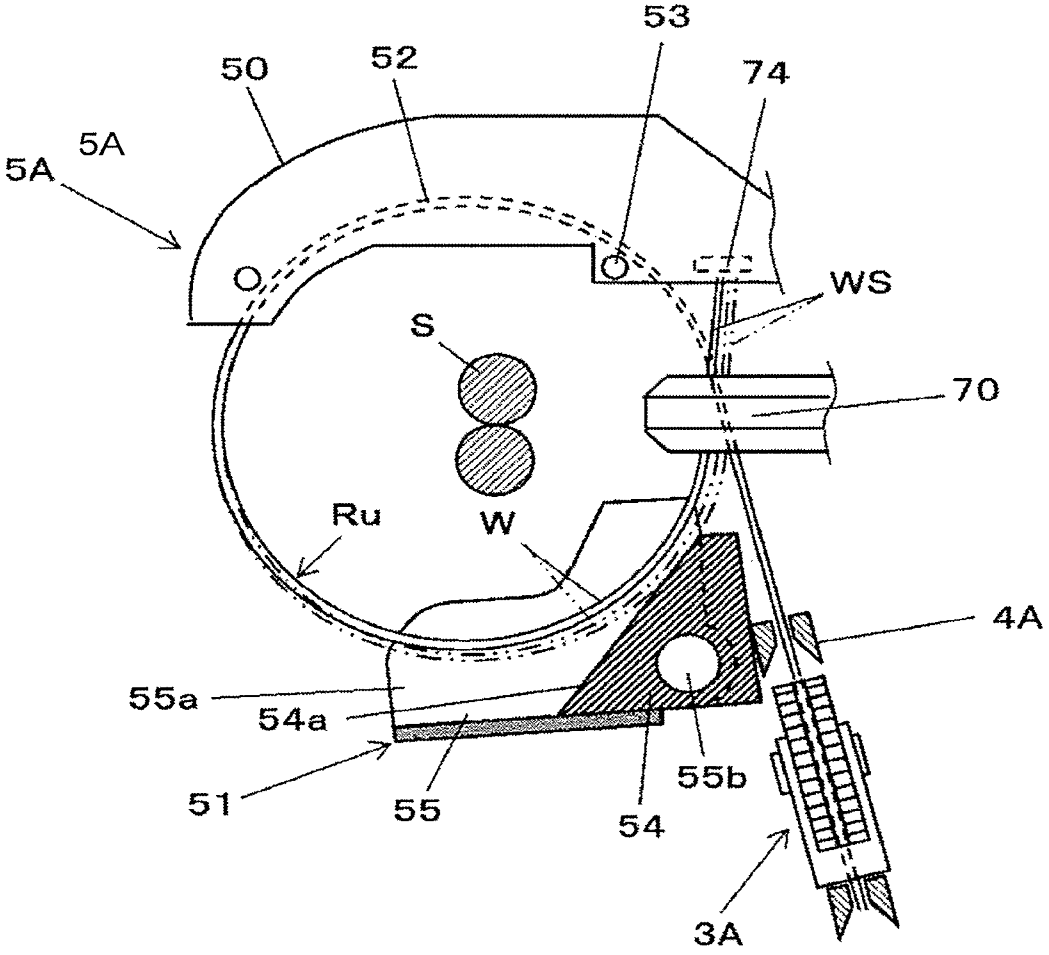
FIG. 19B is an explanatory view of an operation for forming a loop with a wire by a curl guide unit.
Figure 20A:
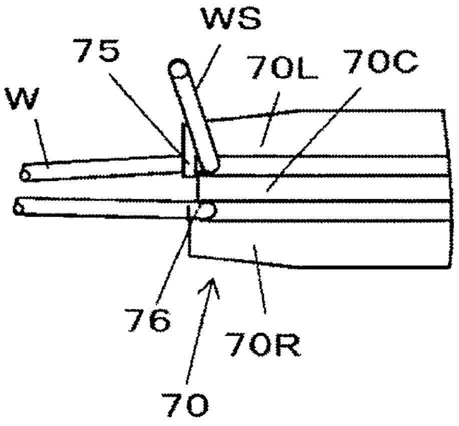
FIG. 20A is an explanatory view of an operation of bending a wire.
Figure 20B:
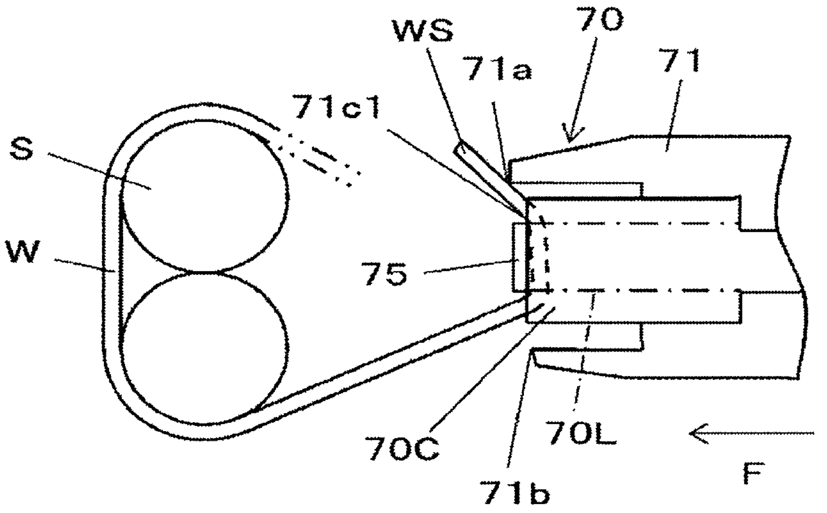
FIG. 20B is an explanatory view of an operation of bending a wire.
Figure 20C:
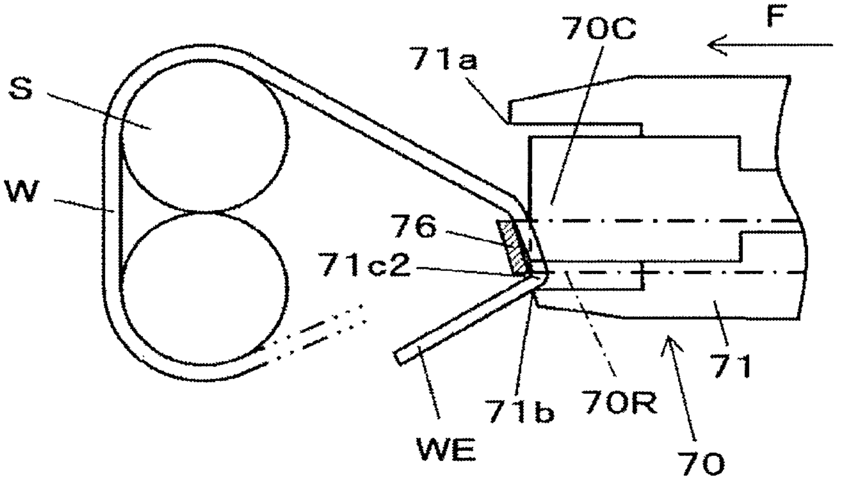
FIG. 20C is an explanatory view of an operation of bending a wire.

FIGS. 10 to 17 are diagrams for explaining the operation of the reinforcing bar binding machine 1A according to the present embodiment, and FIGS. 18A, 18B, and 18C are diagrams for explaining the operation of winding the wire on the reinforcing bar. FIGS. 19A and 19B are explanatory views for explaining the operation of forming a loop with a wire by the curl guide unit, and FIGS. 20A, 20B, and 20C are explanatory views of the operation of bending the wire. Next, with reference to the drawings, the operation of binding the reinforcing bar S with the wire W by the reinforcing bar binding machine 1A of this embodiment will be described.

Figure 10:
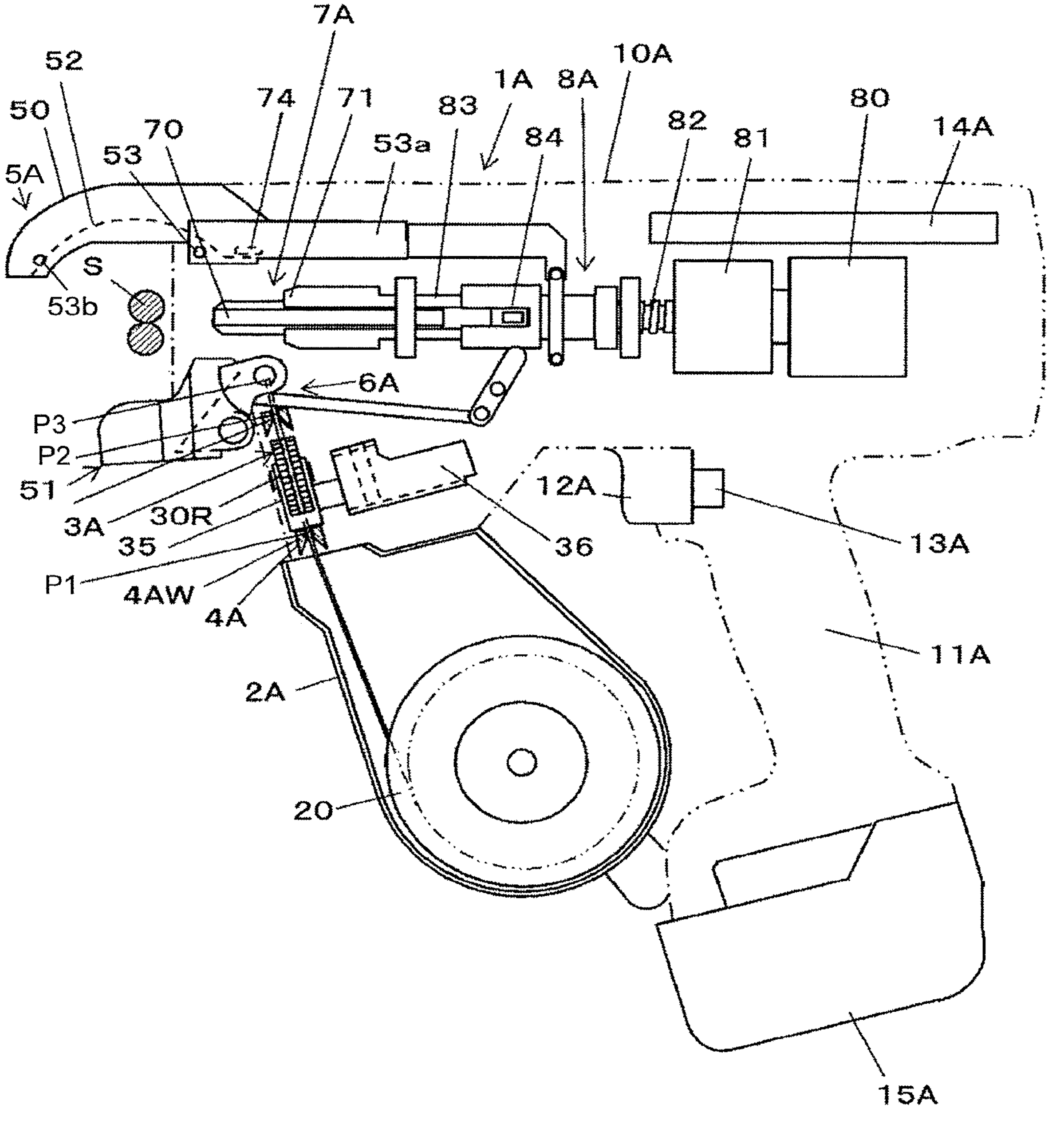
FIG. 10 is an explanatory view of an operation of the reinforcing bar binding machine of the present embodiment.

FIG. 10 illustrates the origin state, that is, the initial state in which the wire W has not yet been sent by the wire feeding unit 3A. In the origin state, the tip of the wire W stands by at the cutting discharge position P3. As illustrated in FIG. 18A, in this example, the wire W waiting at the cutting discharge position P3 is passed through the parallel guide 4A (fixed blade portion 60) in which the two wires W are provided at the cutting discharge position P3, and are arranged in a predetermined direction.

In the wire W between the cutting discharge position P3 and the magazine 2A, the parallel guide 4A at the intermediate position P2 and the parallel guide 4A at the introduction position P1 are arranged in parallel in a predetermined direction by the first feed gear 30L and the second feed gear 30R.

Figure 11:
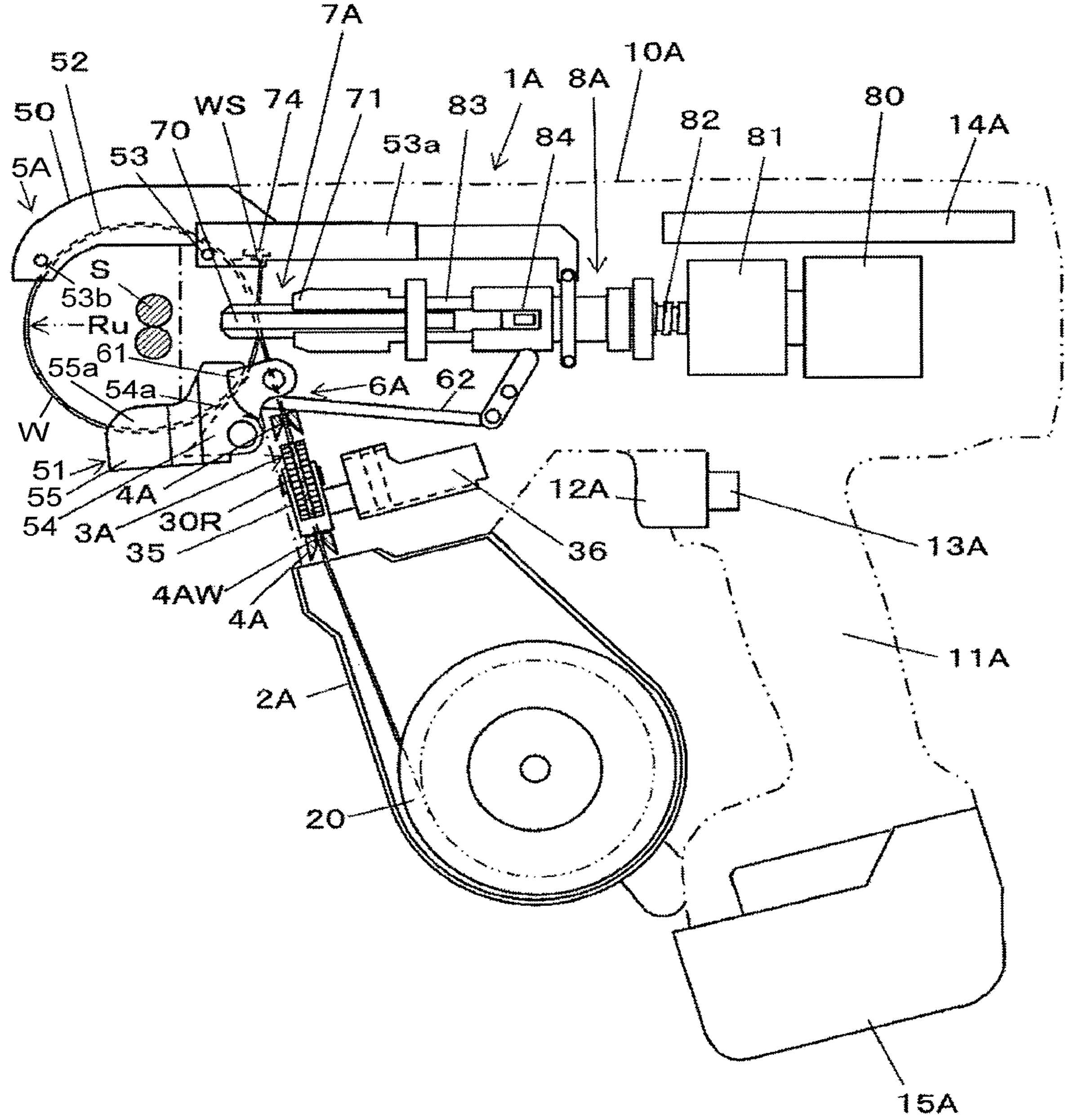
FIG. 11 is an explanatory view of an operation of the reinforcing bar binding machine of the present embodiment.

FIG. 11 illustrates a state in which the wire W is wound around the reinforcing bar S. When the reinforcing bar S is inserted between the first guide unit 50 and the second guide unit 51 of the curl guide unit 5A and the trigger 12A is operated, the feed motor 33*a* is driven in the normal rotation direction, and thus the first feed gear 30L rotates in forward direction and the second feed gear 30R rotates in the forward direction while following the first feed gear 30L.

Therefore, the two wires W are fed in the forward direction by the frictional force generated between the first feed gear 30L and the one wire W1, the frictional force generated between the second feed gear 30R and the other wire W2, and the frictional force generated between the one wire W1 and the other wire W2.

Two wires W entering between the first feed groove 32L of the first feed gear 30L and the second feed groove 32R of the second feed gear 30R, and two wires W discharged from the first feed gear 30L and the second feed gear 30R are fed in parallel with each other in a predetermined direction by providing the parallel guides 4A on the upstream side and the downstream side of the wire feeding unit 3A with respect to the feeding direction of the wire W fed in the forward direction.

When the wire W is fed in the forward direction, the wire W passes between the fixed gripping member 70C and the second movable gripping member 70R and passes through the guide groove 52 of the first guide unit 50 of the curl guide unit 5A. As a result, the wire W is curled so as to be wound around the reinforcing bar S. The two wires W introduced into the first guide unit 50 are held in a state of being arranged in parallel by the parallel guide 4A at the cutting discharge position P3. Further, since the two wires W are fed in a state of being pressed against the outer wall surface of the guide groove 52, the wires W passing through the guide groove 52 are also held in a state of being arranged in parallel in a predetermined direction.

As illustrated in FIG. 19A, the wire W fed from the first guide unit 50 is restricted to move along the axial direction Ru1 of the loop Ru formed by the wire to be wound therearound by the movable guide unit 55 of the second guide unit 51, to be guided to the fixed guide unit 54 by the wall surface 55*a*. In FIG. 19B, the movement of the wire W along the radial direction of the loop Ru, which is guided to the fixed guide unit 54, is restricted by the wall surface 54*a* of the fixed guide unit 54, and the wire W is guided between the fixed gripping member 70C and the first movable gripping member 70L. Then, when the distal end of the wire W is fed to a position where it abuts against the length restricting unit 74, driving of the feed motor 33*a* is stopped.

A slight amount of wire W is fed in the forward direction until the distal end of the wire W abuts against the length restricting unit 74 and then the feeding is stopped, whereby the wire W wound around the reinforcing bar S is displaced from the state illustrated by the solid line in FIG. 19B in the direction expanding in the radial direction of the loop Ru as indicated by the two-dot chain line. When the wire W wound around the reinforcing bar S is displaced in the direction expanding in the radial direction of the loop Ru, one end WS side of the wire W guided between the fixed gripping member 70C and the first movable gripping member 70L by the gripping unit 70 is displaced backward. Therefore, as illustrated in FIG. 19B, the position of the wire W in the radial direction of the loop Ru is restricted by the wall surface 54*a* of the fixed guide unit 54, whereby the displacement of the wire W guided to the gripping unit 70 in the radial direction of the loop Ru is suppressed, and occurrence of gripping failure is suppressed. In the present embodiment, even when the one end WS side of the wire W guided between the fixed gripping member 70C and the first movable gripping member 70L is not displaced, and the wire W is displaced in a direction of spreading in the radial direction of the loop Ru, the displacement of the wire W in the radial direction of the loop Ru is suppressed by the fixed guide unit 54, thereby suppressing the occurrence of gripping failure.

As a result, the wire W is wound in a loop shape around the reinforcing bar S. At this time, as illustrated in FIG. 18B, the two wires W wound around the reinforcing bar S are held in a state in which they are arranged in parallel with each other without being twisted. When detecting that the movable guide unit 55 of the second guide unit 51 is opened by the output of the guide opening/closing sensor 56, the control unit 14A does not drive the feed motor 33*a* even when the trigger 12A is operated. Instead, notification is performed by a notifying unit (not illustrated) such as a lamp or a buzzer. This prevents occurrence of guidance failure of the wire W.

Figure 12:
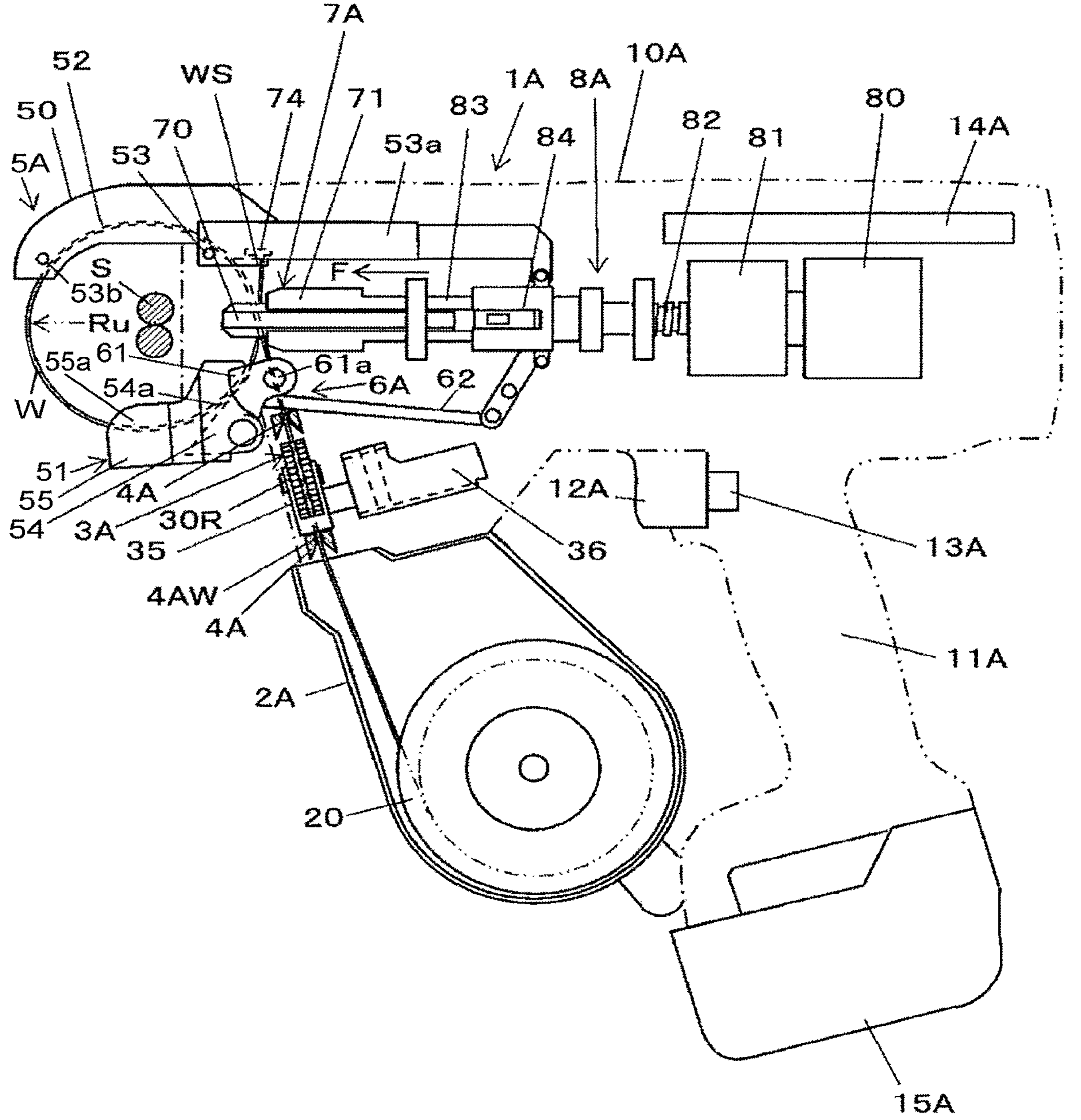
FIG. 12 is an explanatory view of an operation of the reinforcing bar binding machine of the present embodiment.

FIG. 12 illustrates a state where the wire W is gripped by the gripping unit 70. After stopping the feeding of the wire W, the motor 80 is driven in the normal rotation direction, whereby the motor 80 moves the movable member 83 in the direction of the arrow F which is the forward direction. That is, in the movable member 83, the rotation operation interlocked with the rotation of the motor 80 is restricted by the rotation restricting member 84, and the rotation of the motor 80 is converted into a linear movement. As a result, the movable member 83 moves in the forward direction. In conjunction with the operation of the movable member 83 moving in the forward direction, the first movable gripping member 70L is displaced in a direction approaching the fixed gripping member 70C, and one end WS side of the wire W is gripped.

Further, the operation of the movable member 83 moving in the forward direction is transmitted to the retreat mechanism 53*a*, and the guide pin 53 is retreated from the path through which the wire W moves.

Figure 13:
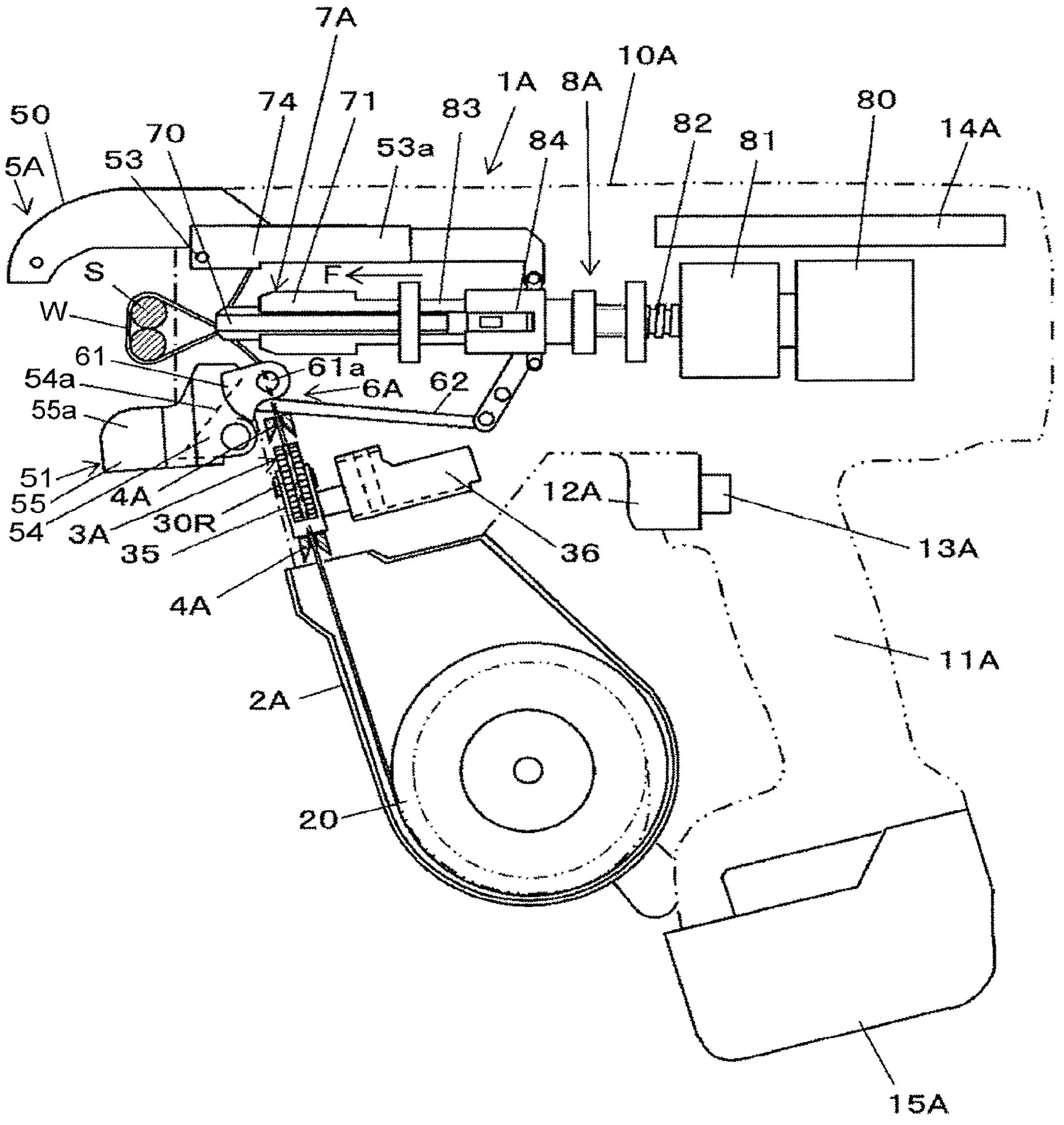
FIG. 13 is an explanatory view of an operation of the reinforcing bar binding machine of the present embodiment.

FIG. 13 illustrates a state where the wire W is wound around the reinforcing bar S. After the one end WS side of the wire W is gripped between the first movable gripping member 70L and the fixed gripping member 70C, and the feed motor 33*a* is driven in the reverse rotation direction, the first feed gear 30L rotates reversely and the second feed gear 30R rotates reversely following the first feed gear 30L.

Therefore, the two wires W are pulled back toward the magazine 2A and are fed in the opposite (backward) direction. In the operation of feeding the wire W in the backward direction, the wire W is wound so as to be in close contact with the reinforcing bar S. In this example, as illustrated in FIG. 18C, since two wires are arranged in parallel with each other, an increase in feed resistance due to twisting of the wires W in the operation of feeding the wire W in the opposite direction is suppressed. Further, in the case where the same binding strength is to be obtained between the case where the reinforcing bar S is bound with a single wire as in the conventional case and the case where the reinforcing bar S is bound with the two wires W as in this example, the diameter of each wire W can be made thinner by using two wires W. Therefore, it is easy to bend the wire W, and the wire W can be brought into close contact with the reinforcing bar S with a small force. Therefore, the wire W can be reliably wound around the reinforcing bar S in close contact with a small force. In addition, by using two thin wires W, it is easy to make the wire W in a loop shape, and it is also possible to reduce the load at the time of cutting the wire W. Along with this, it is possible to downsize each motor of the reinforcing bar binding machine 1A, and downsize the entire main body by downsizing the mechanical section. In addition, it is possible to reduce power consumption by reducing the size of the motor and reducing the load.

Figure 14:
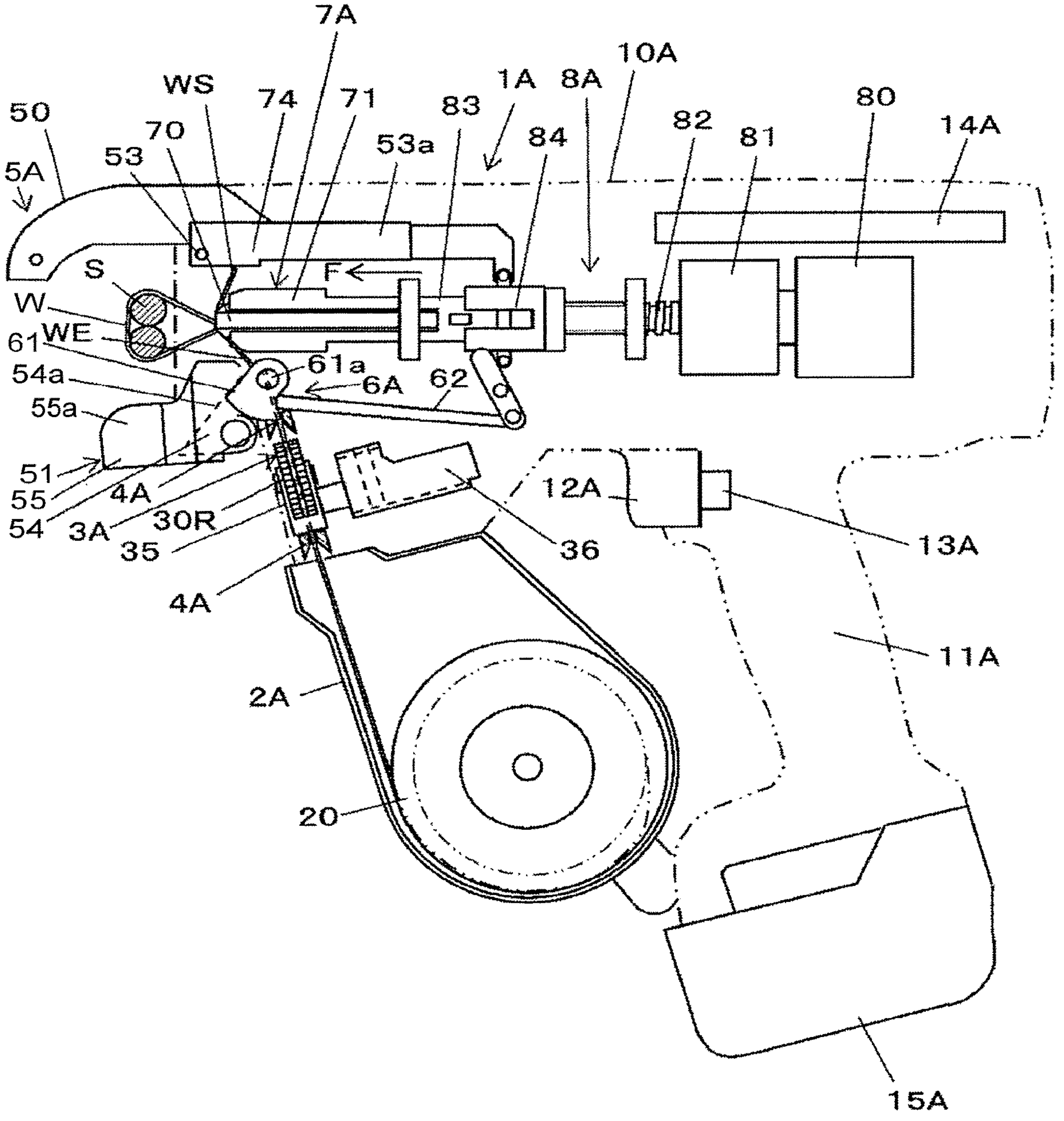
FIG. 14 is an explanatory view of an operation of the reinforcing bar binding machine of the present embodiment.

FIG. 14 illustrates a state in which the wire W is cut. After winding the wire W around the reinforcing bar S, and stopping the feeding of the wire W, the motor 80 is driven in the normal rotation direction, thereby moving the movable member 83 in the forward direction. In conjunction with the operation of the movable member 83 moving in the forward direction, the second movable gripping member 70R is displaced in a direction approaching the fixed gripping member 70C, and the wire W is gripped. In addition, the operation of the movable member 83 moving in the forward direction is transmitted to the cutting unit 6A by the transmission mechanism 62, and the other end WE side of the wire W gripped by the second movable gripping member 70R and the fixed gripping member 70C is cut by the operation of the rotary blade portion 61.

Figure 15:
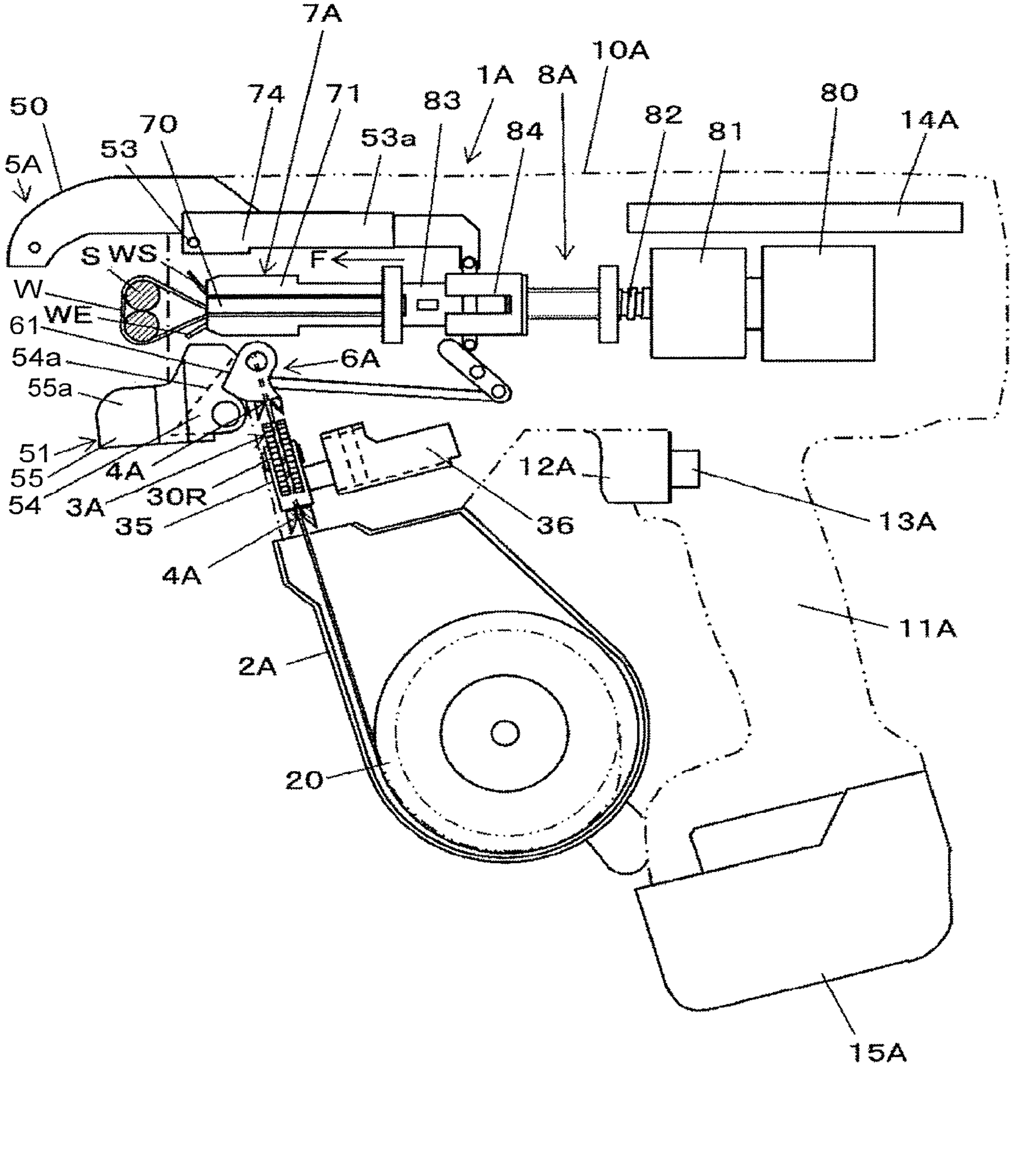
FIG. 15 is an explanatory view of an operation of the reinforcing bar binding machine of the present embodiment.

FIG. 15 illustrates a state in which the end of the wire W is bent toward the reinforcing bar S side. By moving the movable member 83 further in the forward direction after cutting the wire W, the bending portion 71 moves in the forward direction integrally with the movable member 83.

Specifically, as illustrated in FIGS. 20B and 20C, the bending portion 71 moves in a direction approaching the reinforcing bar S which is a forward direction indicated by an arrow F, so that the bending portion includes a bending portion 71*a* which is brought into contact with one end WS side of the wire W gripped by the fixed gripping member 70C and the first movable gripping member 70L. Further, the bending portion 71 moves in the direction approaching the reinforcing bar S which is the forward direction indicated by the arrow F, so that the bending portion includes a bending portion 71*b* which is brought in contact with the other end WE side of the wire W gripped by the fixed gripping member 70C and the second movable gripping member 70R.

By moving the bending portion 71 by a predetermined distance in the forward direction indicated by the arrow F, one end WS side of the wire W gripped by the fixed gripping member 70C and the first movable gripping member 70L is pressed by the bending portion 71*a* to the reinforcing bar S side and is bent toward the reinforcing bar S side with the gripping position as a fulcrum.

As illustrated in FIGS. 20A and 20B, the gripping unit 70 includes a slip preventing portion 75 (the protrusion portion 70Lb may also serve as the slip preventing portion 75) protruding toward the fixed gripping member 70C on the distal end side of the first movable gripping member 70L. One end WS side of the wire W gripped by the fixed gripping member 70C and the first movable gripping member 70L is bent toward the reinforcing bar S side with the slip preventing portion 75 as a fulcrum at the gripping position by the fixed gripping member 70C and the first movable gripping member 70L by moving the bending portion 71 in the forward direction indicated by the arrow F. In FIG. 20B, the second movable gripping member 70R is not illustrated.

Further, by moving the bending portion 71 by a predetermined distance in the forward direction indicated by the arrow F, the other end WE side of the wire W gripped by the fixed gripping member 70C and the second movable gripping member 70R is pressed to the reinforcing bar S side by the bending portion 71*b* and is bent toward the reinforcing bar S side with the gripping position as a fulcrum.

As illustrated in FIGS. 20A and 20C, the gripping unit 70 is provided with a slip preventing portion 76 protruding toward the fixed gripping member 70C at the distal end side of the second movable gripping member 70R. The bending portion 71 is moved in the forward direction indicated by the arrow F, so that the other end WE side of the wire W gripped by the fixed gripping member 70C and the second movable gripping member 70R is bent toward the reinforcing bar S side at the gripping position by the fixed gripping member 70C and the second movable gripping member 70R with the slip preventing portion 76 as a fulcrum. In FIG. 20C, the first movable gripping member 70L is not illustrated.

FIG. 16 illustrates a state in which the wire W is twisted. After the end of the wire W is bent toward the reinforcing bar S side, the motor 80 is further driven in the normal rotation direction, whereby the motor 80 further moves the movable member 83 in the direction of the arrow F which is the forward direction. When the movable member 83 moves to a predetermined position in the direction of the arrow F, the movable member 83 comes off from the locking of the rotation restricting member 84, and the regulation of rotation by the rotation restricting member 84 of the movable member 83 is released. As a result, the motor 80 is further driven in the normal rotation direction, whereby the gripping unit 70 gripping the wire W rotates and twists the wire W. The gripping unit 70 is biased backward by a spring (not illustrated), and twists the wire W while applying tension thereon. Therefore, the wire W is not loosened, and the reinforcing bar S is bound with the wire W.

FIG. 17 illustrates a state where the twisted wire W is released. After the wire W is twisted, the motor 80 is driven in the reverse rotation direction, so that the motor 80 moves the movable member 83 in the backward direction indicated by the arrow R. That is, in the movable member 83, the rotation operation interlocked with the rotation of the motor 80 is restricted by the rotation restricting member 84, and the rotation of the motor 80 is converted into a linear movement. As a result, the movable member 83 moves in the backward direction. In conjunction with the operation of the movable member 83 moving in the backward direction, the first movable gripping member 70L and the second movable gripping member 70R are displaced in a direction away from the fixed gripping member 70C, and the gripping unit 70 releases the wire W. When the binding of the reinforcing bar S is completed and the reinforcing bar S is pulled out from the reinforcing bar binding machine 1A, conventionally, the reinforcing bar S may be caught by the guide unit and it may be difficult to remove, which deteriorates workability in some cases. On the other hand, by configuring the movable guide unit 55 of the second guide unit 51 to be rotatable in the arrow H direction, when the reinforcing bar S is pulled out from the reinforcing bar binding machine 1A, the movable guide unit 55 of the second guide unit 51 does not catch the reinforcing bar S, and thus workability is improved.

Example of Action and Effect of Reinforcing Bar Binding Machine of this Embodiment In the reinforcing bar binding machine in which the wires are fed and wound around the reinforcing bar, and then twisted to bind the reinforcing bar, the looped wire is difficult to spread in the radial direction of the loop, so that the guide constituting the feed path used to wind the wire around the reinforcing bar is movable.

Meanwhile, in the reinforcing bar binding machine having the configuration in which after the wires are fed in the forward direction and wound around the reinforcing bar, the wires are fed in the backward direction and cut by being wound around the reinforcing bar, and a position at which one end side and the other end side of the wire intersect with each other is twisted to bind the reinforcing bar, the feeding of the wire is temporarily stopped in order to switch the wire feeding direction.

When the feeding of the wire is temporarily stopped, a small amount of wire is fed in the forward direction until the feeding of the wire is stopped, and thus the wire wound around the binding objects is displaced in a radial spreading direction. For this reason, the guide constituting the feed path for winding the wire around the reinforcing bar is fixed in the reinforcing bar binding machine according to the related art. Therefore, the reinforcing bar is caught by the guide unit and is hardly pulled out, so workability was bad.

Figure 21A:
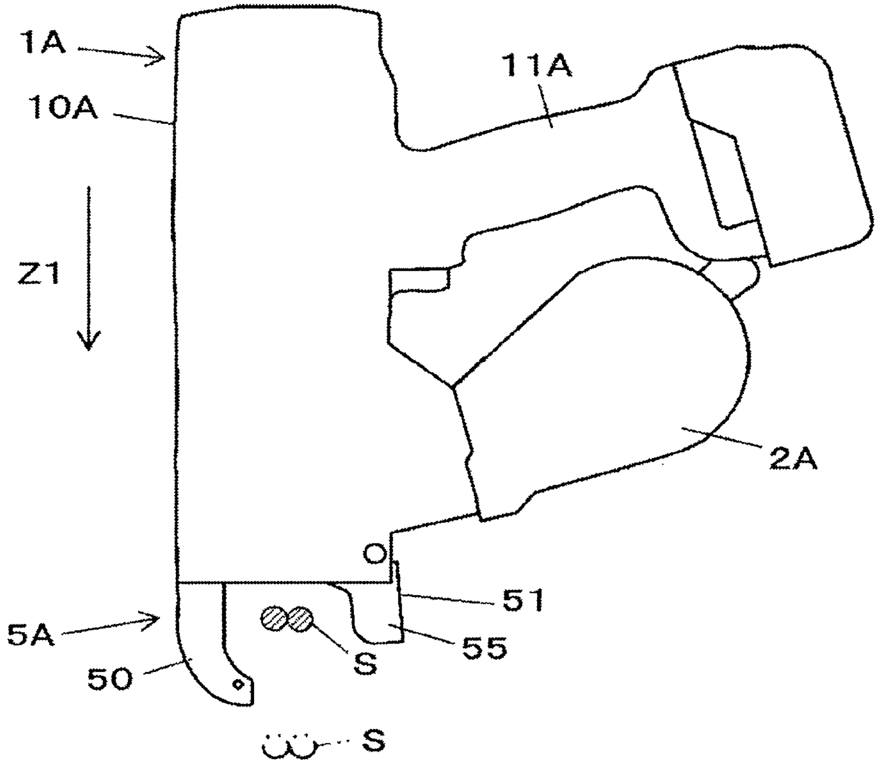
FIG. 21A is an operational effect example of the reinforcing bar binding machine of the present embodiment.
Figure 21B:
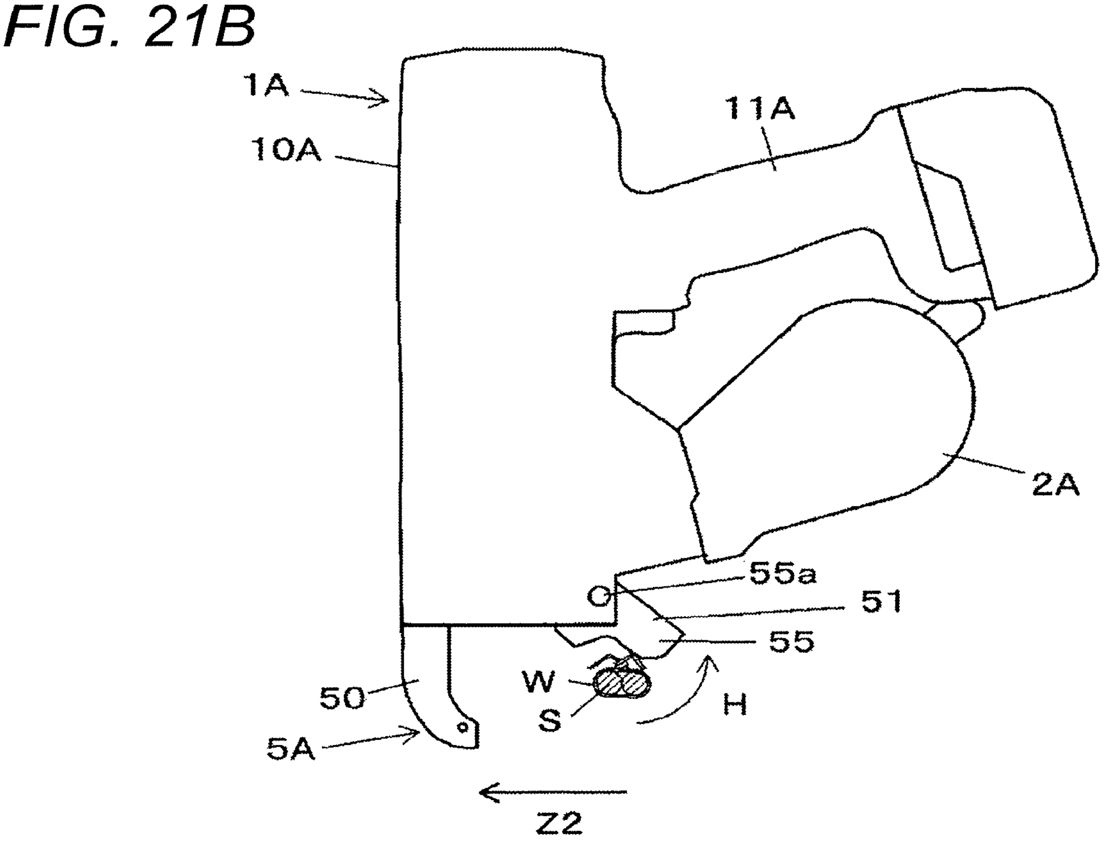
FIG. 21B is an operational effect example of the reinforcing bar binding machine of the present embodiment.

FIGS. 21A and 21B are examples of and the operational effects of the reinforcing bar binding machine of the present embodiment. Hereinbelow, examples of the operational effects of the reinforcing bar binding machine of this embodiment with respect to the operation of inserting the reinforcing bars into the curl guide unit and the operation of pulling the reinforcing bar from the curl guide unit will be described. For example, in the case of binding the reinforcing bars S constituting the base with the wire W, in the work using the reinforcing bar binding machine 1A, the opening between the first guide unit 50 and the second guide unit 51 of the curl guide unit 5A faces downward.

When performing a binding operation, the opening between the first guide unit 50 and the second guide unit 51 is directed downward, and the reinforcing bar binding machine 1A is moved downward as indicated by an arrow Z1 as illustrated in FIG. 21A, the reinforcing bar S enters the opening between the first guide unit 50 and the second guide unit 51.

When the binding operation is completed and the reinforcing bar binding machine 1A is moved in the lateral direction indicated by the arrow Z2 as illustrated in FIG. 21B, the second guide unit 51 is pressed against the reinforcing bar S bound by the wire W, and the movable guide unit 55 on the distal end side of the second guide unit 51 rotates in the direction of the arrow H around the shaft 55*b* as a fulcrum.

Therefore, every time the wire W is bound to the reinforcing bar S, the binding work can be performed successively only by moving the reinforcing bar binding machine 1A in the lateral direction without lifting the reinforcing bar binding machine 1A every time. Therefore, (since it is sufficient to simply move the reinforcing bar binding machine 1A in the lateral direction as compared with moving the reinforcing bar binding machine 1A once upward and moving it downward) it is possible to reduce restrictions on the moving direction and the movement amount of the reinforcing bar binding machine 1A in the operation of pulling out the reinforcing bar S bound to the wire W, thereby improving working efficiency.

In addition, as illustrated in FIG. 19B, the fixed guide unit 54 of the second guide unit 51 is fixed without being displaced and capable of restricting the position in the radial direction of the wire W by the binding operation described above. Accordingly, in the operation of winding the wire W around the reinforcing bar S, the position in the radial direction of the wire W can be restricted by the wall surface 54*a* of the fixed guide unit 54, and the displacement in the radial direction of the wire W guided by the gripping unit 70, thereby suppressing occurrence of grasping failure. As described above, the reinforcing bar binding machine according to the related art in which the wires are wound around the reinforcing bar, and then twisted to bind the reinforcing bar has a configuration in which the looped wire is difficult to spread in the radial direction of the loop because there is no feeding for pulling back the wire and there is no operation of temporarily stopping the feeding of the wire and inverting the feeding direction. For this reason, a guide corresponding to the fixed guide unit of the present embodiment is unnecessary. However, even in such a reinforcing bar binding machine, when the fixed guide unit and the movable guide unit of the invention are applied, it is possible to suppress the radial expansion of the loop of the wire wound around the reinforcing bar.

Figure 22A:
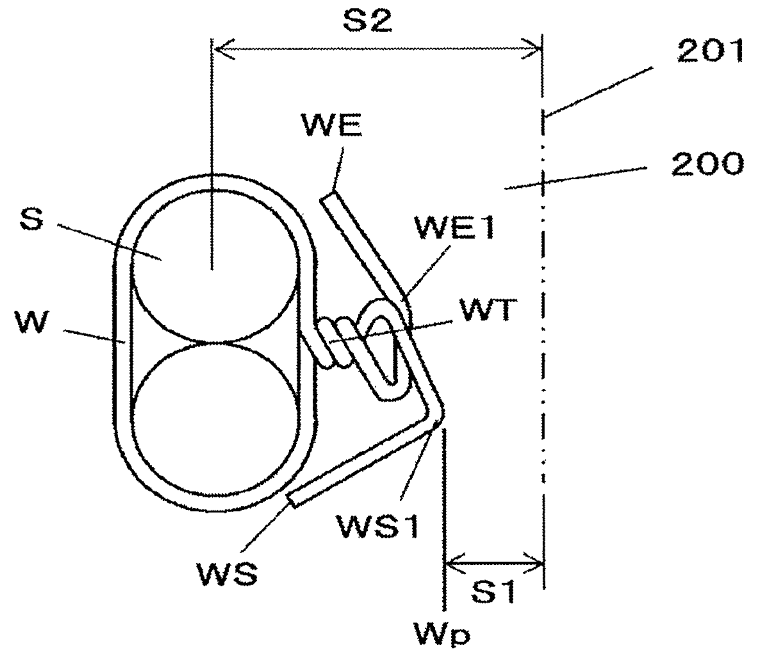
FIG. 22A is an operational effect example of the reinforcing bar binding machine of the present embodiment.
Figure 22B:
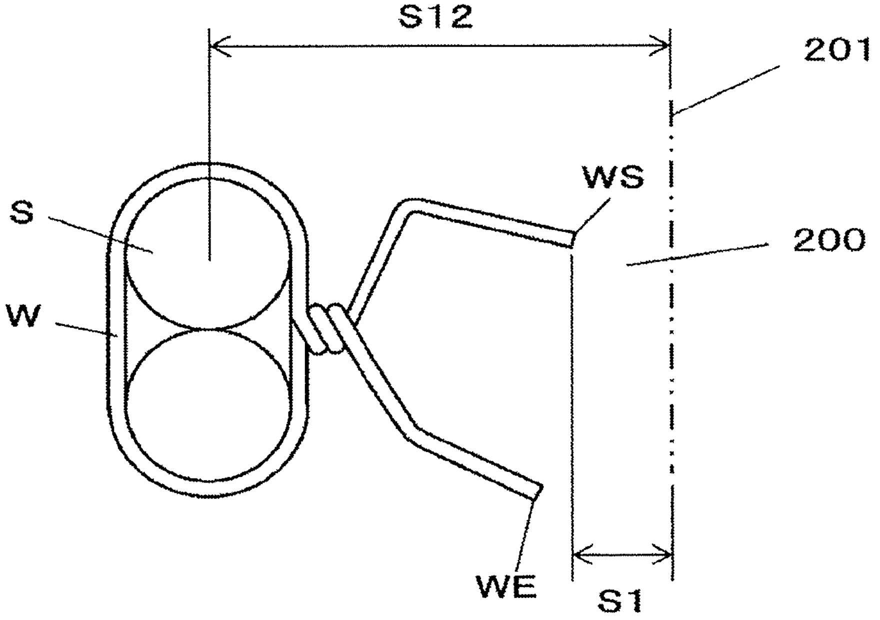
FIG. 22B is an example of operation and problem of the reinforcing bar binding machine according to the related art.

FIG. 22A illustrates an example of the operational effect of the reinforcing bar binding machine of this embodiment, and FIG. 22B illustrates an example of an operation and a problem of the conventional reinforcing bar binding machine. Hereinbelow, an example of the operational effect of the reinforcing bar binding machine of the present embodiment as compared with the conventional one on the form of the wire W binding the reinforcing bar S will be described.

As illustrated in FIG. 22B, one end WS and the other end WE of the wire W are oriented in the opposite direction to the reinforcing bar S in the wire W bound to the reinforcing bar S in the conventional reinforcing bar binding machine. Therefore, one end WS and the other end WE of the wire W, which are the distal end side of the twisted portion of the wire W binding the reinforcing bar S largely protrude from the reinforcing bar S. If the distal end side of the wire W protrudes largely, there is a possibility that the protruding portion interferes with the operation and hinders work.

Also, after the reinforcing bars S are bound, the concrete 200 is poured into the place where the reinforcing bars S are laid. At this time, in order to prevent the one end WS and the other end WE of the wire W from protruding from the concrete 200, the thickness from the tip of the wire W bound to the reinforcing bar S, in the example of FIG. 22B, the thickness from the one end WS of the wire W to the surface 201 of the concrete 200 that has been poured is necessarily kept at a predetermined dimension S1. Therefore, in a configuration in which the one end WS and the other end WE of the wire W face the direction opposite to the reinforcing bar S, the thickness S12 from the laying position of the reinforcing bar S to the surface 201 of the concrete 200 becomes thick.

On the other hand, in the reinforcing bar binding machine 1A of the present embodiment, the wire W is bent by the bending portion 71 such that one end WS of the wire W wound around the reinforcing bar S is located closer to the reinforcing bar S than the first bent portion WS1 which is a bent portion of the wire W, and the other end WE of the wire W wound around the reinforcing bar S is located closer to the reinforcing bar S than the second bent portion WE1 which is a bent portion of the wire W. In the reinforcing bar binding machine 1A of the present embodiment, the wire W is bent by the bending portion 71 such that one of the bent portion bent by the preliminary bending portion 72 in the operation of gripping the wire W by the first movable gripping member 70L and the fixed gripping member 70C and the bent portion bent by the fixed gripping member 70C and the second movable gripping member 70R in the operation of binding the wire W around the reinforcing bar S becomes the top portion which is most protruding portion in the direction away from the reinforcing bar S of the wire W.

As a result, as illustrated in FIG. 22A, the wire W bound to the reinforcing bar S in the reinforcing bar binding machine 1A according to the present embodiment has the first bent portion WS1 between the twisted portion WT and one end WS, and one end WS side of the wire W is bent toward the reinforcing bar S side so that one end WS of the wire W is located closer to the reinforcing bar S than the first bent portion WS1. The second bent portion WE1 is formed between the twisted portion WT and the other end WE of the wire W. The other end WE side of the wire W is bent toward the reinforcing bar S side so that the other end WE of the wire W is located closer to the reinforcing bar S side than the second bent portion WE1.

In the example illustrated in FIG. 22A, two bent portions, in this example, the first bent portion WS1 and the second bent portion WE1, are formed on the wire W. Of the two, in the wire W bound to the reinforcing bar S, the first bent portion WS1 protruding most in the direction away from the reinforcing bar S (the direction opposite to the reinforcing bar S) is the top portion Wp. Both of the one end WS and the other end WE of the wire W are bent so as not to protrude beyond the top portion Wp in the direction opposite to the reinforcing bar S.

In this manner, by setting one end WS and the other end WE of the wire W so as not to protrude beyond the top portion Wp constituted by the bent portion of the wire W in the direction opposite to the reinforcing bar S, it is possible to suppress a decrease in workability due to the protrusion of the end of the wire W. Since one end WS side of the wire W is bent toward the reinforcing bar S and the other end WE side of the wire W is bent toward the reinforcing bar S side, the amount of protrusion on the distal end side from the twisted portion WT of the wire W is less than the conventional case. Therefore, the thickness S2 from the laying position of the reinforcing bar S to the surface 201 of the concrete 200 can be made thinner than the conventional one. Therefore, it is possible to reduce the amount of concrete to be used.

In the reinforcing bar binding machine 1A of the present embodiment, the wire W is wound around the reinforcing bar S by feeding in the forward direction, and one end WS side of the wire W wound around the reinforcing bar S by feeding the wire W in the opposite direction is bent toward the reinforcing bar S side by the bending portion 71 in a state of being gripped by the fixed gripping member 70C and the first movable gripping member 70L. Further, the other end WE side of the wire W cut by the cutting unit 6A is bent toward the reinforcing bar S side by the bending portion 71 in a state of being gripped by the fixed gripping member 70C and the second movable gripping member 70R.

As a result, as illustrated in FIG. 20B, the gripping position by the fixed gripping member 70C and the first movable gripping member 70L is taken as a fulcrum 71*c*1, and as illustrated in FIG. 20C, the gripping position by the fixed gripping member 70C and the second movable gripping member 70R is taken as a fulcrum 71*c*2, the wire W can be bent. In addition, the bending portion 71 can apply a force that presses the wire W in the direction of the reinforcing bar S by displacement in a direction approaching the reinforcing bar S.

As described above, in the reinforcing bar binding machine 1A of the present embodiment, since the wire W is gripped securely at the gripping position and the wire W is bent with the fulcrums 71*c*1 and 71*c*2, it is possible that the force pressing the wire W is reliably applied to a desired direction (the reinforcing bar S side) without being dispersed to the other direction, thereby reliably bending the ends WS and WE sides of the wire W the desired direction (the reinforcing bar S side).

On the other hand, for example, in the conventional binding machine that applies a force in a direction in which the wire W is twisted in a state where the wire W is not gripped, the end of the wire W can be bent in a direction that twists the wire W, but a force to bend the wire W is applied in the state where the wire W is not gripped, so that the direction of bending the wire W is not fixed and the end of the wire W may face outward opposite to the reinforcing bar S in some cases.

However, in the present embodiment, as described above, since the wire W is firmly gripped at the gripping position and the wire W is bent with the fulcrums 71*c*1 and 71*c*2, the ends WS and WE sides of the wire W can reliably be directed to the reinforcing bar S side.

Further, if the end of the wire W is to be bent toward the reinforcing bar S side after twisting the wire W to bind the reinforcing bar S, there is a possibility that the binding position where the wire W is twisted is loosened and the binding strength decreases. Furthermore, when twisting the wire W to bind the reinforcing bar S and then trying to bend the wire end by applying a force in a direction in which the wire W is twisted further, there is a possibility that the binding place where the wire W is twisted is damaged.

On the other hand, in the present embodiment, one end WS side and the other end WE side of the wire W are bent toward the reinforcing bar S side before twisting the wire W to bind the reinforcing bar S, so that the binding place where the wire W is twisted does not become loosened and the binding strength does not decrease. Also, after twisting the wire W to bind the reinforcing bar S, no force is applied in the direction of twisting the wire W, so that the binding place where the wire W is twisted is not damaged.

Figure 23A:
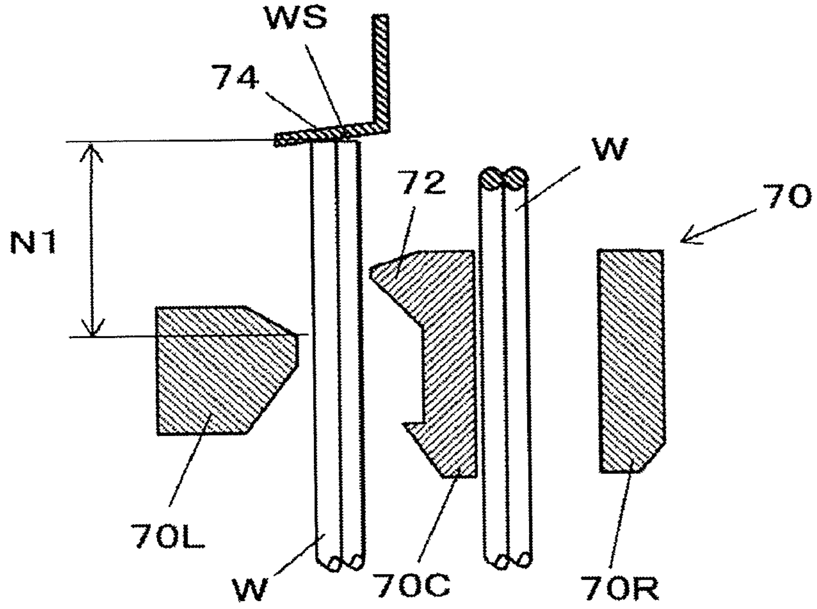
FIG. 23A is an operational effect example of the reinforcing bar binding machine of the present embodiment.
Figure 23B:
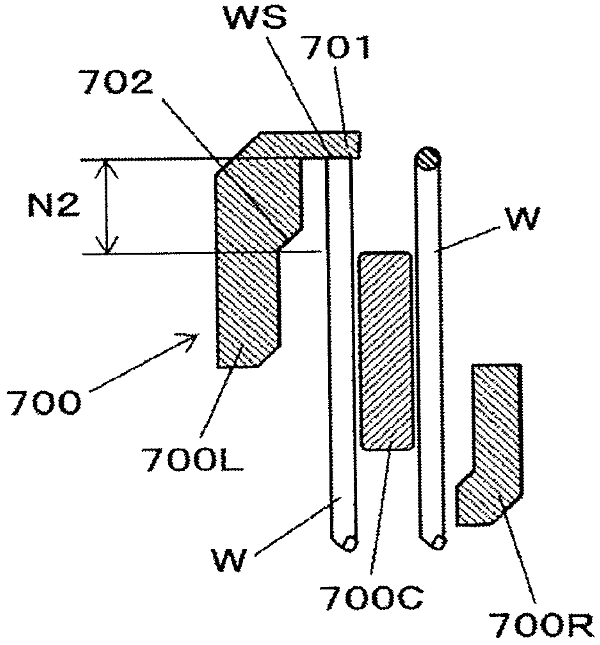
FIG. 23B is an example of operation and problem of the reinforcing bar binding machine according to the related art.
Figure 24A:
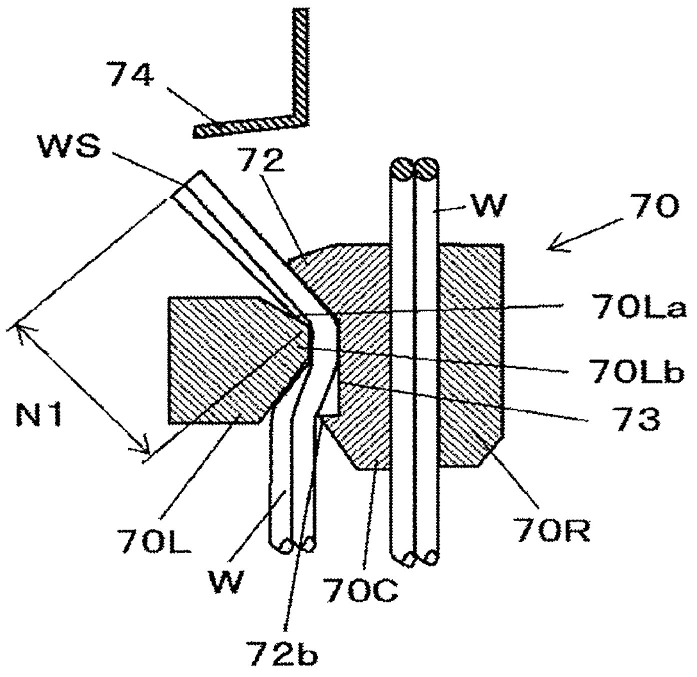
FIG. 24A is an operational effect example of the reinforcing bar binding machine of the present embodiment.
Figure 24B:
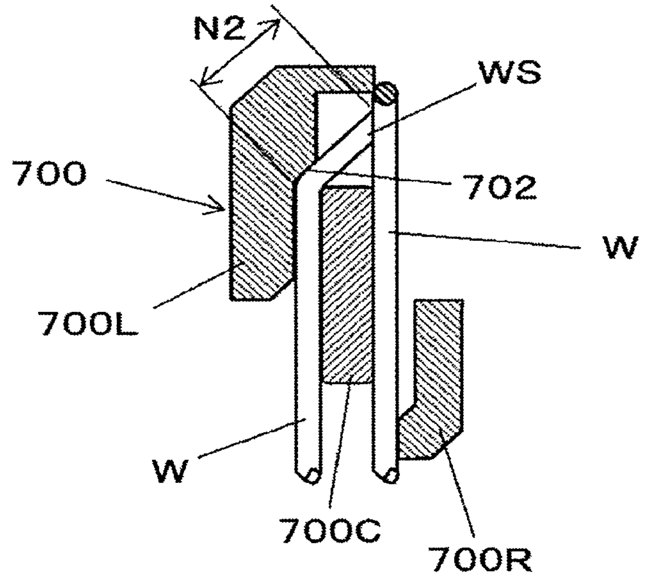
FIG. 24B is an example of operation and problem of the reinforcing bar binding machine according to the related art.

FIGS. 23A and 24A show examples of operational effects of the reinforcing bar binding machine according to the present embodiment, and FIGS. 23B and 24B show examples of the operations and problems of the conventional reinforcing bar binding machine. Hereinbelow, an example of the operational effect of the reinforcing bar binding machine according to the present embodiment as compared with the conventional one will be described in terms of prevention of the wire W coming out from the gripping unit in the operation of winding the wire W around the reinforcing bar S.

As illustrated in FIG. 23B, the conventional gripping unit 700 of the reinforcing bar binding machine includes a fixed gripping member 700C, a first movable gripping member 700L, and a second movable gripping member 700R, and a length restricting unit 701 against which the wire W wound around the reinforcing bar S abuts is provided in the first movable gripping member 700L.

In the operation of feeding the wire W in the backward direction (pulling back) and winding it around the reinforcing bar S and the operation of twisting the wire W by the gripping unit 700, the wire W gripped by the fixed gripping member 700C and the first movable gripping member 700L is likely to come off when the distance N2 from the gripping position of the wire W by the fixed gripping member 700C and the first movable gripping member 700L to the length restricting unit 701 is short.

In order to make it difficult for the gripped wire W to come off, it is simply necessary to lengthen the distance N2. However, for this purpose, it is necessary to lengthen the distance from the gripping position of the wire W in the first movable gripping member 700L to the length restricting unit 701.

However, if the distance from the gripping position of the wire W in the first movable gripping member 700L to the length restricting unit 701 is increased, the size of the first movable gripping member 700L is increased. Therefore, in the conventional configuration, it is not possible to lengthen the distance N2 from the gripping position of the wire W by the fixed gripping member 700C and the first movable gripping member 700L to one end WS of the wire W.

On the other hand, as illustrated in FIG. 23A, in the gripping unit 70 of the present embodiment, the length restricting unit 74 where the wire W abuts is set to be a separate component independent from the first movable gripping member 70L.

This makes it possible to lengthen the distance N1 from the gripping position of the wire W in the first movable gripping member 70L to the length restricting unit 74 without increasing the size of the first movable gripping member 70L.

Therefore, even if the first movable gripping member 70L is not enlarged, it is possible to prevent the wire W gripped by the fixed gripping member 70C and the first movable gripping member 70L from coming off during the operation of feeding the wire W in the backward direction to wind around the reinforcing bar S and the operation of twisting the wire W by the gripping unit 70.

As illustrated in FIG. 24B, the conventional gripping unit 700 of the reinforcing bar binding machine is provided with, on the surface of the first movable gripping member 700L facing the fixed gripping member 700C, a protrusion protruding toward the fixed gripping member 700C and a recess into which the fixed gripping member 700C is inserted, thereby forming a preliminary bending portion 702.

As a result, in the operation of gripping the wire W by the first movable gripping member 700L and the fixed gripping member 700C, one end WS side of the wire W protruding from the gripping position by the first movable gripping member 700L and the fixed gripping member 700C is bent, and in the operation of feeding the wire W in the backward direction to wind around the reinforcing bar S and the operation of twisting the wire W by the gripping unit 700, the effect of preventing the wire W from coming off can be obtained.

However, since one end WS side of the wire W is bent inward toward the wire W passing between the fixed gripping member 700C and the second movable gripping member 700R, the bent one end WS side of the wire W may be caught in contact with the wire W to be fed in the backward direction for winding around the reinforcing bar S.

When the bent one end WS side of the wire W is caught by the wire W that is fed in the backward direction for winding around the reinforcing bar S, there is a possibility that the winding of the wire W becomes insufficient or the twisting of the wire W is insufficient.

On the other hand, in the gripping unit 70 of the present embodiment, as illustrated in FIG. 24A, on the surface facing the first movable gripping member 70L of the fixed gripping member 70C, a protrusion protruding toward the first movable gripping member 70L and a recess into which the first movable gripping member 70L is inserted are provided to form the preliminary bending portion 72.

Therefore, in the operation of gripping the wire W by the first movable gripping member 70L and the fixed gripping member 70C, one end WS side of the wire W protruding from the gripping position by the first movable gripping member 70L and the fixed gripping member 70C is bent, and in the operation of feeding the wire W in the backward direction to wind around the reinforcing bar S, and the operation of twisting the wire W by the gripping unit 70, the effect of preventing the wire W from coming off can be obtained.

One end WS side of the wire W is bent to the outside opposite to the wire W passing between the fixed gripping member 70C and the second movable gripping member 70R, so that it is suppressed that the bent one end WS side of the wire W is in contact with the wire W fed in the backward direction to wind around the reinforcing bar S.

Thus, in the operation of feeding the wire W in the backward direction to wind around the reinforcing bar S, it is prevented that the wire W comes off from the gripping unit 70, thereby surely winding the wire W, and in the operation of twisting the wire W, it is possible to reliably perform the binding of the wire W.

Figure 25A:
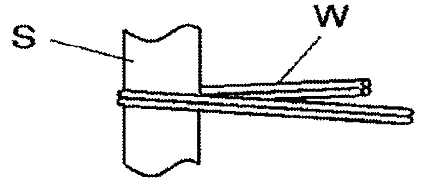
FIG. 25A is an operational effect example of the reinforcing bar binding machine of the present embodiment.
Figure 25B:
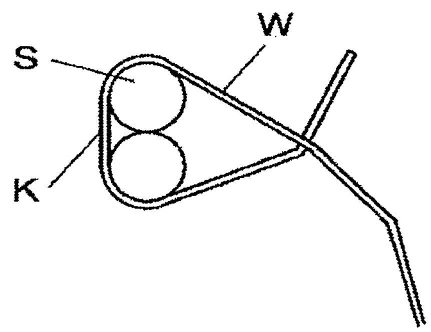
FIG. 25B is an operational effect example of the reinforcing bar binding machine of the present embodiment.
Figure 25C:
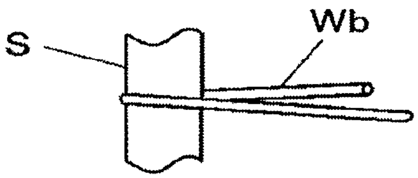
FIG. 25C is an example of operation and problem of the reinforcing bar binding machine according to the related art.
Figure 25D:
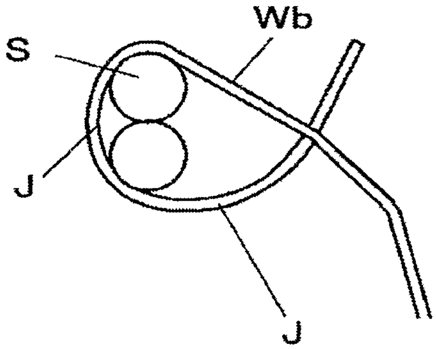
FIG. 25D is an example of operation and problem of the reinforcing bar binding machine according to the related art.
Figure 26A:
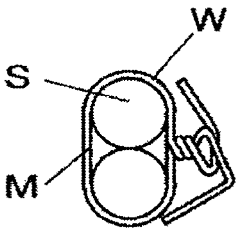
FIG. 26A is an operational effect example of the reinforcing bar binding machine of the present embodiment.
Figure 26B:
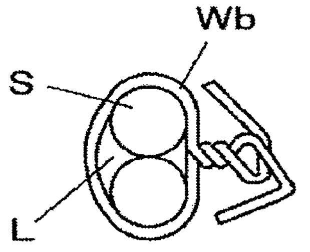
FIG. 26B is an example of operation and problem of the reinforcing bar binding machine according to the related art.

FIGS. 25A, 25B, and 26A show examples of operational effects of the reinforcing bar binding machine of the present embodiment, and FIGS. 25C, 25D, and 26B are examples of the operation and problems of the conventional reinforcing bar binding machine. Hereinbelow, an example of the operational effects of the reinforcing bar binding machine according to the present embodiment as compared with the related art will be described with respect to the operation of binding the reinforcing bar S with the wire W.

As illustrated in FIG. 25C, in the conventional configuration in which one wire Wb having a predetermined diameter (for example, about 1.6 mm to 2.5 mm) is wound around the reinforcing bar S, as illustrated in FIG. 25D, since the rigidity of the wire Wb is high, unless the wire Wb is wound around the reinforcing bar S with a sufficiently large force, slack J occurs during the operation of winding the wire Wb, and a gap is generated between the wire and the reinforcing bar S.

On the other hand, as illustrated in FIG. 25A, in the present embodiment in which two wires W having a small diameter (for example, about 0.5 mm to 1.5 mm) are wound around the reinforcing bar S as compared with the conventional case, as illustrated in FIG. 25B, since the rigidity of the wire W is lower than that of the conventional wire, even if the wire W is wound around the reinforcing bar S with a lower force than the conventional case, slack in the wire W occurring during the operation of winding the wire W is suppressed, and the wire is surely wound around the reinforcing bar S at the linear portion K. Considering the function of binding the reinforcing bar S with the wire W, the rigidity of the wire W varies not only by the diameter of the wire W but also by the material thereof etc. For example, in the present embodiment, the wire W having a diameter of about 0.5 mm to 1.5 mm is described as an example. However, if the material of the wire W is also taken into consideration, between the lower limit value and the upper limit value of the diameter of the wire W, at least a difference of about tolerance may occur.

Further, as illustrated in FIG. 26B, in the conventional configuration in which one wire Wb having a predetermined diameter is wound around the reinforcing bar S and twisted, since the rigidity of the wire Wb is high, even in the operation of twisting the wire Wb, the slack of the wire Wb is not eliminated, and a gap L is generated between the wire and the reinforcing bar S.

On the other hand, as illustrated in FIG. 26A, in the present embodiment in which two wires W having a smaller diameter are wound around the reinforcing bar S and twisted as compared with the related art, the rigidity of the wire W is lower as compared with the conventional one, by the operation of twisting the wire W, the gap M between the reinforcing bar S and the wire can be suppressed small as compared with the conventional case, whereby the binding strength of the wire W is improved.

By using the two wires W, it is possible to equalize the reinforcing bar holding force as compared with the conventional case, and to suppress the deviation between the reinforcing bars S after the binding. In the present embodiment, two wires W are simultaneously (together) fed, and the reinforcing bars S are bound using the two wires W fed simultaneously (together). Feeding the two wires W at the same time means that when one wire W and the other wire W are fed at substantially the same speed, that is, when the relative speed of the other wire W to one wire W is substantially 0. In this example, the meaning is not necessarily limited to this meaning. For example, even when one wire W and the other wire W are fed at different speeds (timings), the two wires W are arranged in parallel with each other and advance in parallel in the feed path of the wire W, so, as long as the wire W is set to be wound around the reinforcing bar S in the parallel state, it means that two wires are fed at the same time. In other words, the total area of the cross-sectional area of each of the two wires W is a factor determining the reinforcing bar holding force, so even if the timings of feeding the two wires W are deviated, in terms of securing the reinforcing bar holding force, the same result can be obtained. However, compared to the operation of shifting the timing of feeding the two wires W, since it is possible to shorten the time required for feeding for the operation of simultaneously (together) feeding the two wires W, it is preferable to feed the two wires W simultaneously (together), resulting in improvement of the binding speed.

Modified Example of Reinforcing Bar Binding Machine in this Embodiment

Figure 27A:
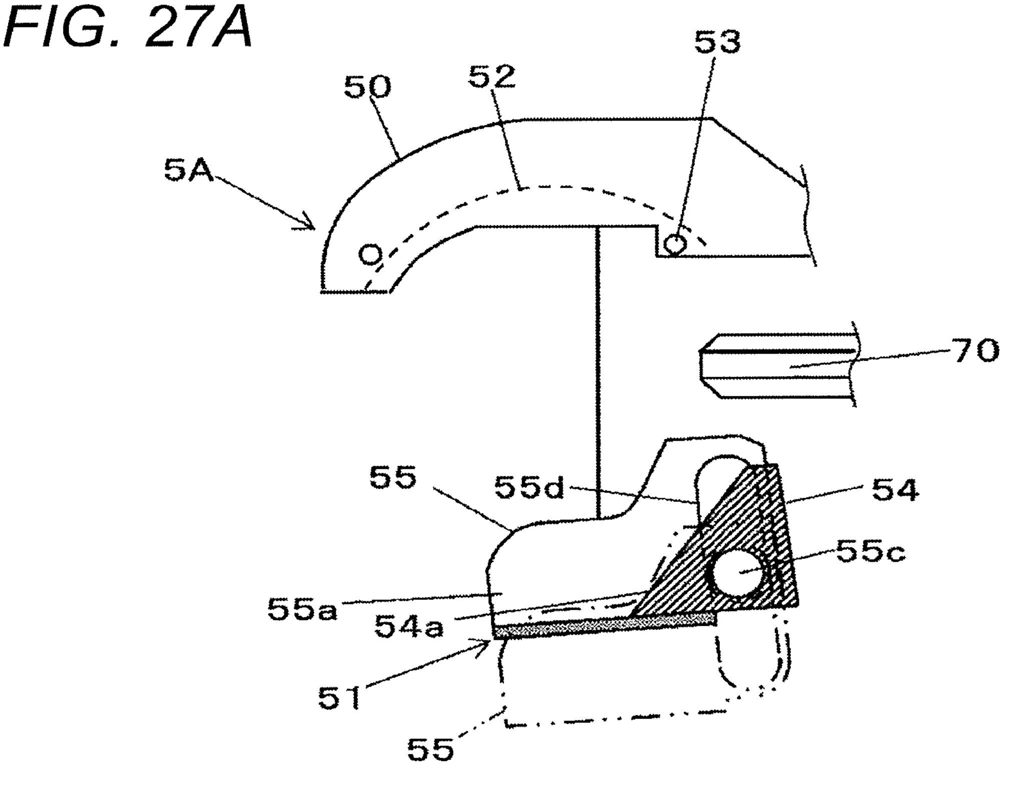
FIG. 27A is a view illustrating a modified example of the second guide unit of the present embodiment.
Figure 27B:
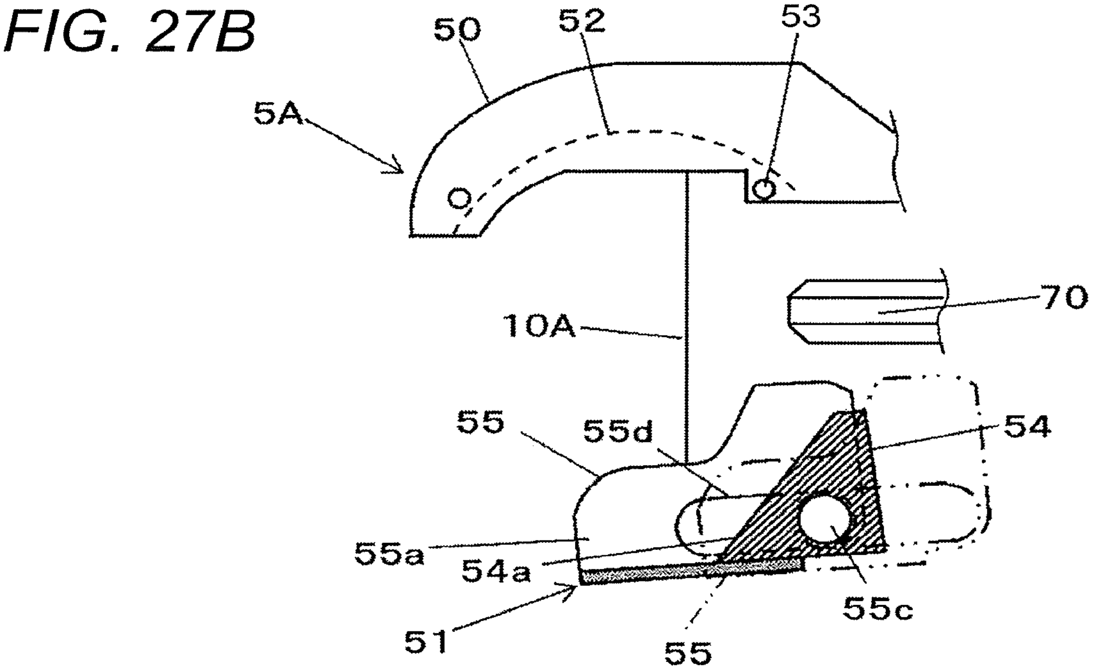
FIG. 27B is a view illustrating a modified example of the second guide unit of the present embodiment.

FIGS. 27A and 27B are configuration diagrams illustrating modified examples of the second guide unit of the present embodiment. The displacement direction of the movable guide unit 55 of the second guide unit 51 is restricted by the guide shaft 55*c* and the guide groove 55*d* along the displacement direction of the movable guide unit 55. For example, as illustrated in FIG. 27A, the movable guide unit 55 includes the guide groove 55*d* extending along the direction in which the movable guide unit 55 moves with respect to the first guide unit 50, that is, the direction in which the movable guide unit 55 moves closer to and away from the first guide unit 50. The fixed guide unit 54 includes the guide shaft 55*c* which is inserted into the guide groove 55*d* and is movable in the guide groove 55*d*. Consequently, the movable guide unit 55 is displaced from the guide position to the retreat position by the parallel movement in the direction in which the movable guide unit 55 comes into contact with and separates from the first guide unit 50 (up and down direction in FIG. 27A).

Further, as illustrated in FIG. 27B, a guide groove 55*d* extending in the forward and backward direction may be provided in the movable guide unit 55. As a result, the movable guide unit 55 is displaced from the guide position to the retreat position by movement in the forward and backward direction in which protruding from the front end, which is one end of the main body 10A, and retracting to the inside of the main body 10A are performed. The guide position in this case is a position where the movable guide unit 55 protrudes from the front end of the main body 10A so that the wall surface 55*a* of the movable guide unit 55 exists at a position where the wire W forming the loop Ru passes. The retreat position is a state in which all or a part of the movable guide unit 55 has entered the inside of the main body 10A. Further, a configuration may be adopted in which the movable guide unit 55 is provided with a guide groove 55*d* extending in an oblique direction along the direction of contacting and separating from the first guide unit 50 and in the forward and backward direction. The guide groove 55*d* may be a straight line shape or a curved line shape such as a circular arc.

As another modified example of the reinforcing bar binding machine 1A of the present embodiment, the configuration is described in which two wires W are used, but the reinforcing bar S may be bound with one wire W or two or more wires W. In the reinforcing bar binding machine 1A according to the present embodiment, the length restricting portion 74 is provided in the first guide unit 50 of the curl guide unit 5A, but may be provided in the first movable gripping member 70L or the like, or another location, as long as it is a component independent of the gripping unit 70, for example, a structure that supports the gripping unit 70.

Further, before the operation of bending the one end WS side and the other end WE side of the wire W toward the reinforcing bar S side by the bending portion 71 is completed, the rotation operation of the gripping unit 70 is started, and thus the operation of twisting the wire W may be started. Further, after starting the operation of twisting the wire W by starting the rotation operation of the gripping unit 70, before the operation of twisting the wire W is completed, the operation of bending the one end WS side and the other end WE side toward the reinforcing bar S side by the bending portion 71 may be started and ended.

In addition, although the bending portion 71 is formed integrally with the movable member 83 as a bending unit, the gripping unit 70 and the bending portion 71 may be driven by an independent driving unit such as a motor. Further, instead of the bending portion 71, as a bending unit, a bending portion formed in a concave-convex shape, or the like may be provided in any of the fixed gripping member 70C, the first movable gripping member 70L, and the second movable gripping member 70R to apply a bending force by which the wire W is bent toward the reinforcing bar S in the operation of gripping the wire W.

FIGS. 28A, 28B, 28C, 28D, and 28E are configuration diagrams illustrating modified examples of the parallel guide of the present embodiment. In the parallel guide 4B illustrated in FIG. 28A, the cross-sectional shape of the opening 4BW, that is, the cross-sectional shape of the opening 4BW in a direction orthogonal to the feeding direction of the wire W is formed in a rectangular shape, and the longitudinal direction and the lateral direction of the opening 4BW are formed in a straight shape. In the parallel guide 4B, the length L1 in the longitudinal direction of the opening 4BW is slightly longer than the diameter r of a plurality of the wires W in a form in which the wires W are arranged in parallel along the radial direction, and the length L2 in the lateral direction is slightly longer than the diameter r of one wire W. In the parallel guide 413 in this example, the length L1 of the opening 4BW in the longitudinal direction is slightly longer than the diameter r of two wires W.

Figure 28A:
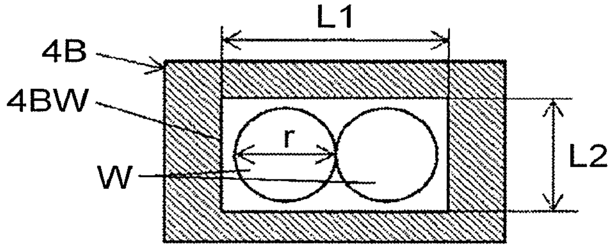
FIG. 28A is a view illustrating a modified example of the parallel guide of the present embodiment.
Figure 28B:
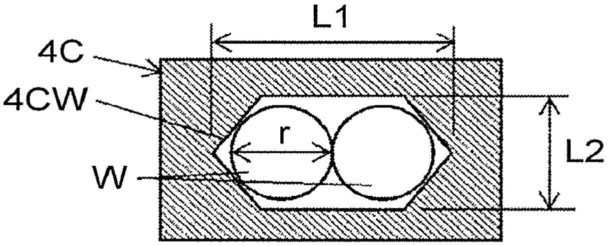
FIG. 28B is a view illustrating a modified example of the parallel guide of the present embodiment.

In the parallel guide 4C illustrated in FIG. 28B, the longitudinal direction of the opening 4CW is formed in a straight shape and the lateral direction is formed in a triangular shape. In the parallel guide 4C, in order that a plurality of wires W are arranged in parallel in the longitudinal direction of the opening 4CW and the wire W can be guided by the inclined plane in the lateral direction, the longitudinal length L1 of the opening 4CW is slightly longer than the diameter r of the plurality of the wires W in the form in which the wires W are arranged along the radial direction, and the lateral length L2 is slightly longer than the diameter r of one wire W.

Figure 28C:
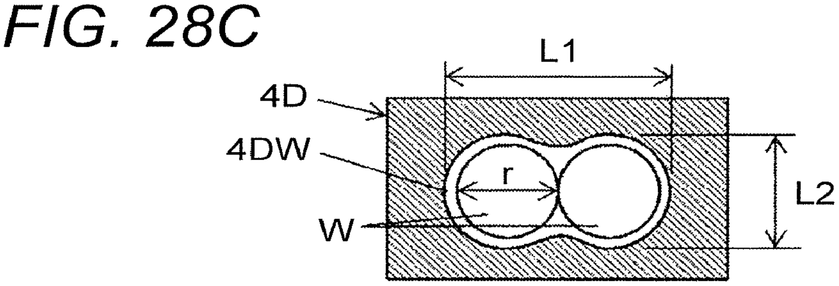
FIG. 28C is a view illustrating a modified example of the parallel guide of the present embodiment.

In the parallel guide 4D illustrated in FIG. 28C, the longitudinal direction of the opening 4DW is formed in a curved shape which is curved inward in a convex shape and the lateral direction is formed in a circular arc shape. That is, the opening shape of the opening 4DW is formed in a shape that conforms to the outer shape of the parallel wires W. In the parallel guide 4D, the length L1 in the longitudinal direction of the opening 4DW is slightly longer than the diameter r of the plurality of the wires W in the form in which the wires W are arranged along the radial direction, the length L2 in the lateral direction is slightly longer than the diameter r of one wire W. In the parallel guide 4D, in the present example, the length L1 in the longitudinal direction has a length slightly longer than the diameter r of two wires W.

Figure 28D:
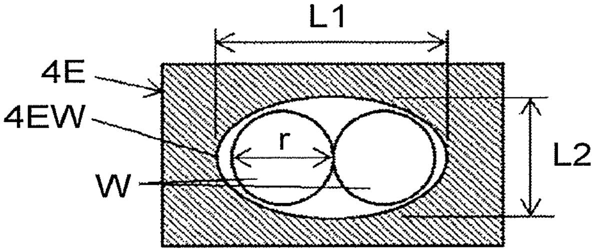
FIG. 28D is a view illustrating a modified example of the parallel guide of the present embodiment.

In the parallel guide 4E illustrated in FIG. 28D, the longitudinal direction of the opening 4EW is formed in a curved shape curved outward in a convex shape, and the lateral side direction is formed in a circular arc shape. That is, the opening shape of the opening 4EW is formed in an elliptical shape. The parallel guide 4E has a length L1 in the longitudinal direction of the opening 4EW which is slightly longer than the diameter r of the plurality of wires W in a form in which the wires W are arranged along the radial direction, and a length L2 in the lateral direction is slightly longer than the diameter r of one wire W. In this example, the parallel guide 4E has a length L1 in the longitudinal direction slightly longer than the diameter r of two wires W.

Figure 28E:
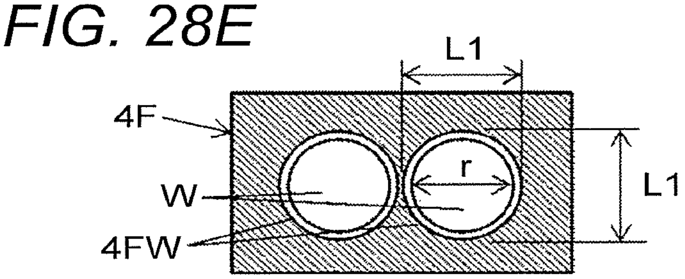
FIG. 28E is a view illustrating a modified example of the parallel guide of the present embodiment.

The parallel guide 4F illustrated in FIG. 28E includes a plurality of openings 4FW matching the number of wires W. Each wire W is passed through another opening 4FW one by one. In the parallel guide 4F, each opening 4FW has a diameter (length) L1 slightly longer than the diameter r of the wire W, and by the direction in which the openings 4FW are arranged, the direction in which a plurality of wires W are arranged in parallel is restricted.

Figure 29:
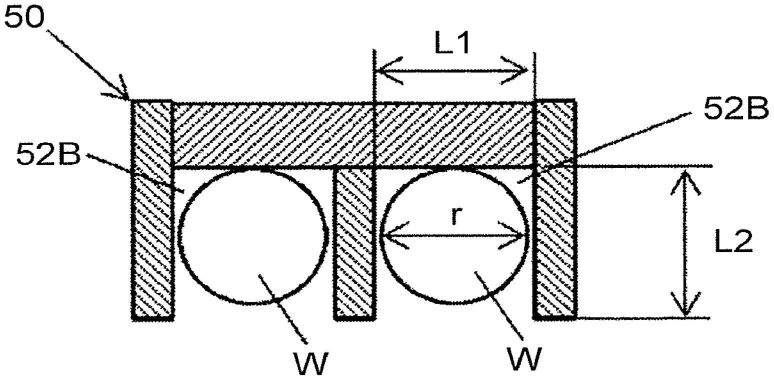
FIG. 29 is a view illustrating a modified example of the guide groove of the present embodiment.

FIG. 29 is a configuration diagram illustrating a modified example of the guide groove of this embodiment. The guide groove 52B has a width (length) L1 and a depth L2 slightly longer than the diameter r of the wire W. Between one guide groove 52B through which one wire W passes and the other guide groove 52B through which the other wire W passes, a section wall portion is formed along the feeding direction of the wire W. The first guide unit 50 restricts the direction in which a plurality of wires are arranged in parallel with each other by the direction in which the plurality of guide grooves 52B are arranged.

Figure 30A:
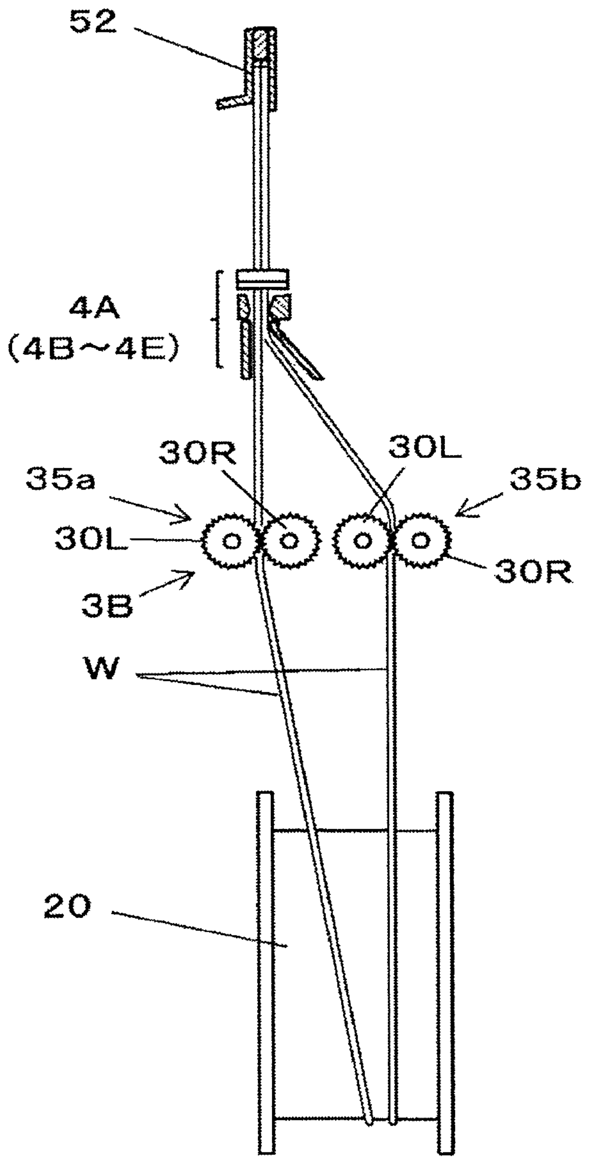
FIG. 30A is a view illustrating a modified example of the wire feeding unit according to the present embodiment.
Figure 30B:
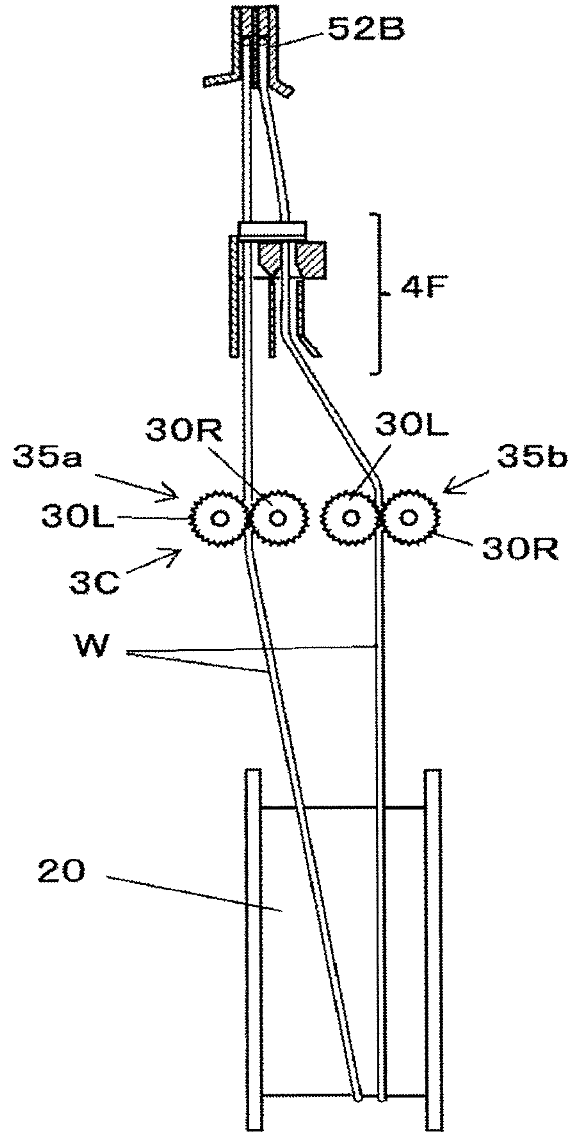
FIG. 30B is a view illustrating a modified example of the wire feeding unit according to the present embodiment.

FIGS. 30A and 30B are configuration diagrams illustrating modified examples of the wire feeding unit according to the present embodiment. The wire feeding unit 3B illustrated in FIG. 32A includes a first wire feeding unit 35*a* and a second wire feeding unit 35*b* that feed the wire W one by one. The first wire feeding unit 35*a* and the second wire feeding unit 35*b* are provided with a first feed gear 30L and a second feed gear 30R, respectively.

Each wire W fed one by one by the first wire feeding unit 35*a* and the second wire feeding unit 35*b* is arranged in parallel in a predetermined direction by the parallel guide 4A illustrated in FIG. 4A, 4B, or 4C, or the parallel guide 4B to 4E illustrated in FIG. 28A, 28B, 28C, or 28D, and the guide groove 52 illustrated in FIG. 5.

The wire feeding unit 3C illustrated in FIG. 30B includes a first wire feeding unit 35*a* and a second wire feeding unit 35*b* that feed the wire W one by one. The first wire feeding unit 35*a* and the second wire feeding unit 35*b* are provided with a first feed gear 30L and a second feed gear 30R, respectively.

Each of the wires W sent one by one by the first wire feeding unit 35*a* and the second wire feeding unit 35*b* is arranged in parallel in a predetermined direction by the parallel guide 4F illustrated in FIG. 28E and the guide groove 52B illustrated in FIG. 29B. In the wire feeding unit 30C, since the two wires W are independently guided, if the first wire feeding unit 35*a* and the second wire feeding unit 35*b* can be independently driven, it is also possible to shift the timing to feed the two wires W. Even if the operation of winding the reinforcing bar S is performed by starting the feeding of the other wire W from the middle of the operation of winding the reinforcing bar S with one of the two wires W, the two wires W are regarded to be fed at the same time. Also, although feeding of two wires W is started at the same time, when the feeding speed of one wire W is different from the feeding speed of the other wire W, the two wires W are regarded to be simultaneously (together), fed as well.

Figure 31:
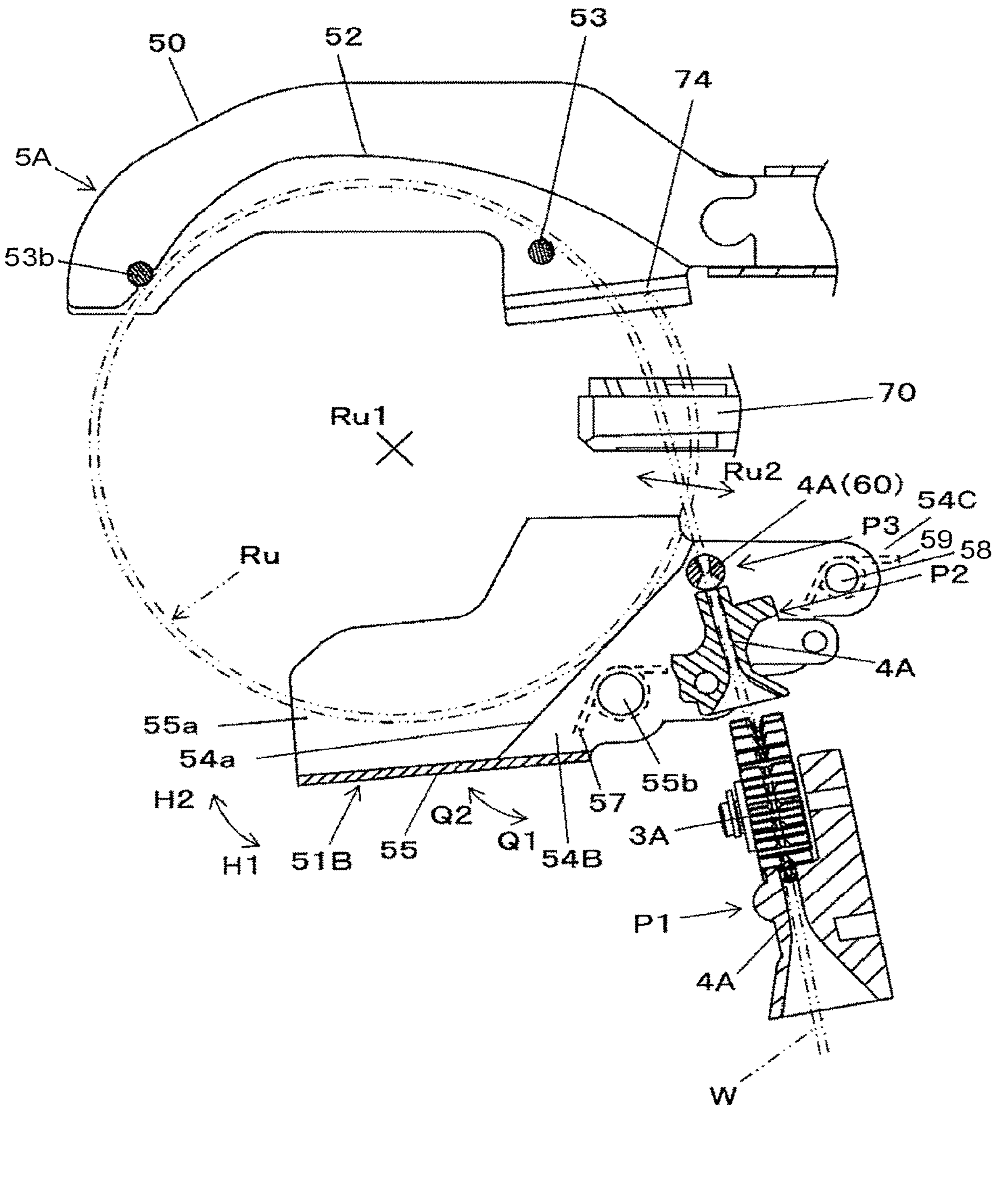
FIG. 31 is a view illustrating an example of a second guide unit according to another embodiment.

FIG. 31 is a view illustrating an example of a second guide unit according to another embodiment. The second guide unit 51B includes a base guide unit 54B a serving as a third guide unit for restricting the radial position of the loop Ru2 formed by the wire W fed from the first guide unit 50 and a movable guide unit 55 serving as a fourth guide unit for restricting the position along the axial direction Ru1 of the loop Ru.

The base guide unit 54B restricts the position of radial direction Ru2 of the loop Ru formed by the wire W, by the wall surface Ma provided outside the radial direction Ru2 of the loop Ru formed by the wire W.

The movable guide unit 55 includes a wall surface 55*a* that is provided on the distal end of the second guide unit 51B, and the wall surface 55*a* is formed on both sides along the axial direction Ru1 of the loop Ru formed by the wire W sent from the first guide unit 50. Thus, the position of the axial direction Ru1 of the loop Ru formed by the wire W1 is restricted by the wall surface 55*a* of the movable guide unit 55, and the wire W is guided to the base guide unit 54B by the movable guide unit 55.

The movable guide unit 55 is supported on the base guide unit 54B by a shaft 55*b* rotating along the axial direction Ru1 of the loop Ru formed by the wire W. By a rotation operation of rotating about the shaft 55*b* as a fulcrum as indicated by arrows H1 and H2, the movable guide unit 55 is opened and closed between a guide position at which the wire sent from the first guide unit 50 can be guided to the second guide unit 51B and a retreat position at which the reinforcing bar binding machine 1A is retreated by being pulled out from the reinforcing bar S.

The movable guide unit 55 is urged in a direction indicated by an arrow H2 in which the distance between the distal end side of the first guide unit 50 and the distal end side of the second guide unit 51B approaches by the urging portion such as a torsion coil spring 57, and is held in the guide position illustrated in FIG. 21A by the force of the torsion coil spring 57. In addition, when the movable guide unit 55 is pushed to the reinforcing bar S by the operation of pulling out the reinforcing bar binding machine 1A from the reinforcing bar S, the movable guide unit 55 rotates in a direction indicated by an arrow H1 and is opened from the guide position to the retreat position illustrated in FIG. 21B.

The second guide unit 51B includes a retraction mechanism (rotation mechanism) 54C by which the base guide unit 54B is displaced and retreated in a direction separating from the first guide unit 50. The retraction mechanism MC includes a shaft 58 that supports the base guide unit 54B and a spring 59 that holds the base guide unit 54B at a predetermined guide position.

The base guide unit 54B is supported so as to be displaceable in a direction indicated by arrows Q1 and Q2 by an operation of rotating about the shaft 58 as a fulcrum. The spring 59 is an example of an urging portion (urging portion), and is configured with a torsion coil spring, for example. The spring 59 has a larger spring load than the torsion coil spring 57. The base guide unit 54B is held at the guide position illustrated in FIG. 31, by the spring 59.

FIGS. 32 to 35 are explanatory views illustrating an example of an operation of the second guide unit according to another embodiment. The wire W shaped in a circular arc shape by the first guide unit 50 of the curl guide unit 5A is wound such that position of two outside points and one inside point of the circular arc are restricted at three points of a fixed blade portion 60 constituting the parallel guide 4A at a cutting and discharging position P3 and the guide pins 53 and 53*b* of the first guide unit 50, thereby forming a substantially circular loop Ru.

Figure 32:
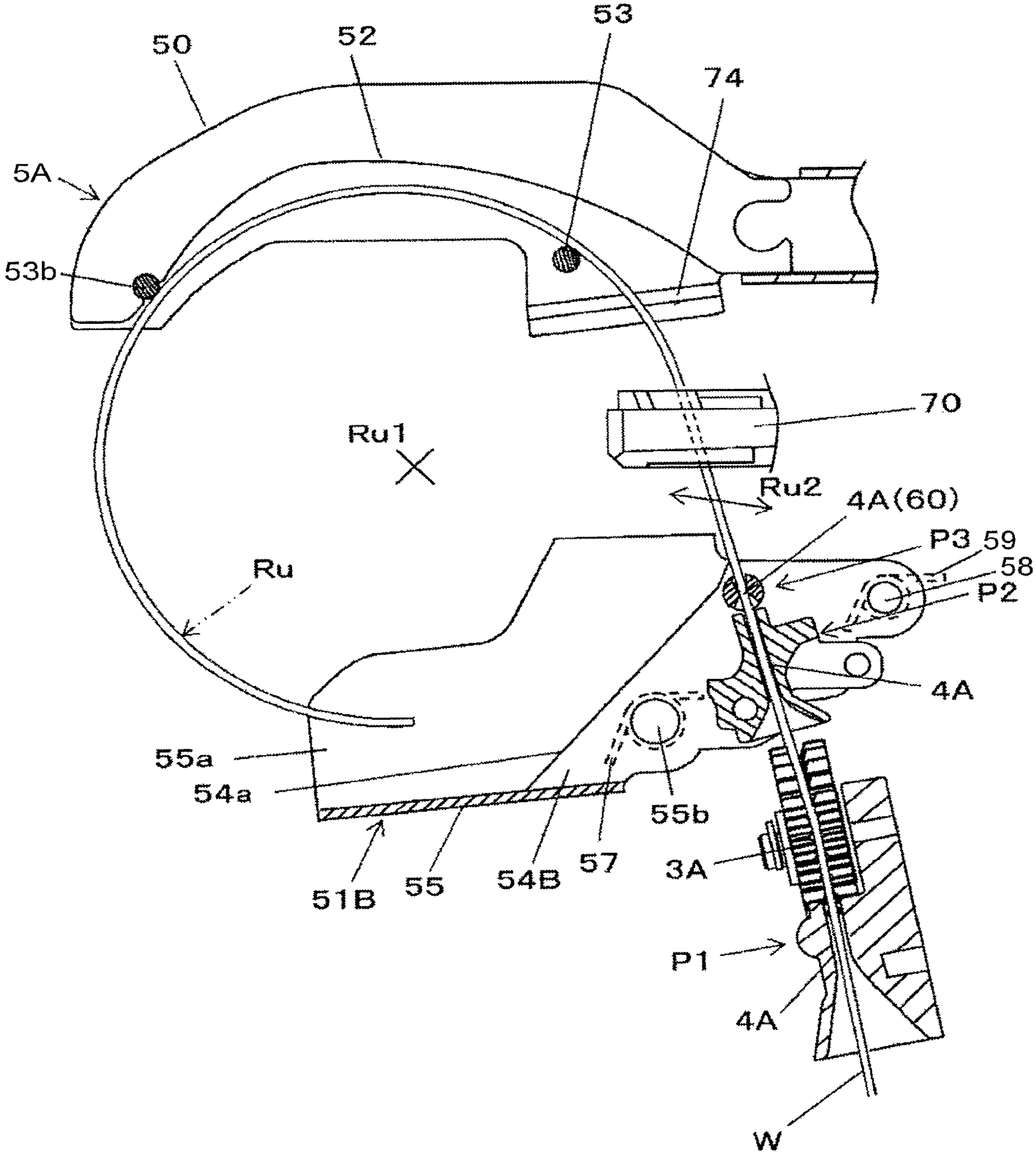
FIG. 32 is an explanatory view illustrating an example of an operation of the second guide unit according to another embodiment.

Thus, as illustrated in FIG. 32, the distal end of the wire W enters the movable guide unit 55, the position in the axial direction Ru1 of the loop Ru formed by the wire W is restricted by the wall surface 55*a* of the movable guide unit 55, and the wire W is guided to the base guide unit 54B by the movable guide unit 55.

Figure 33:
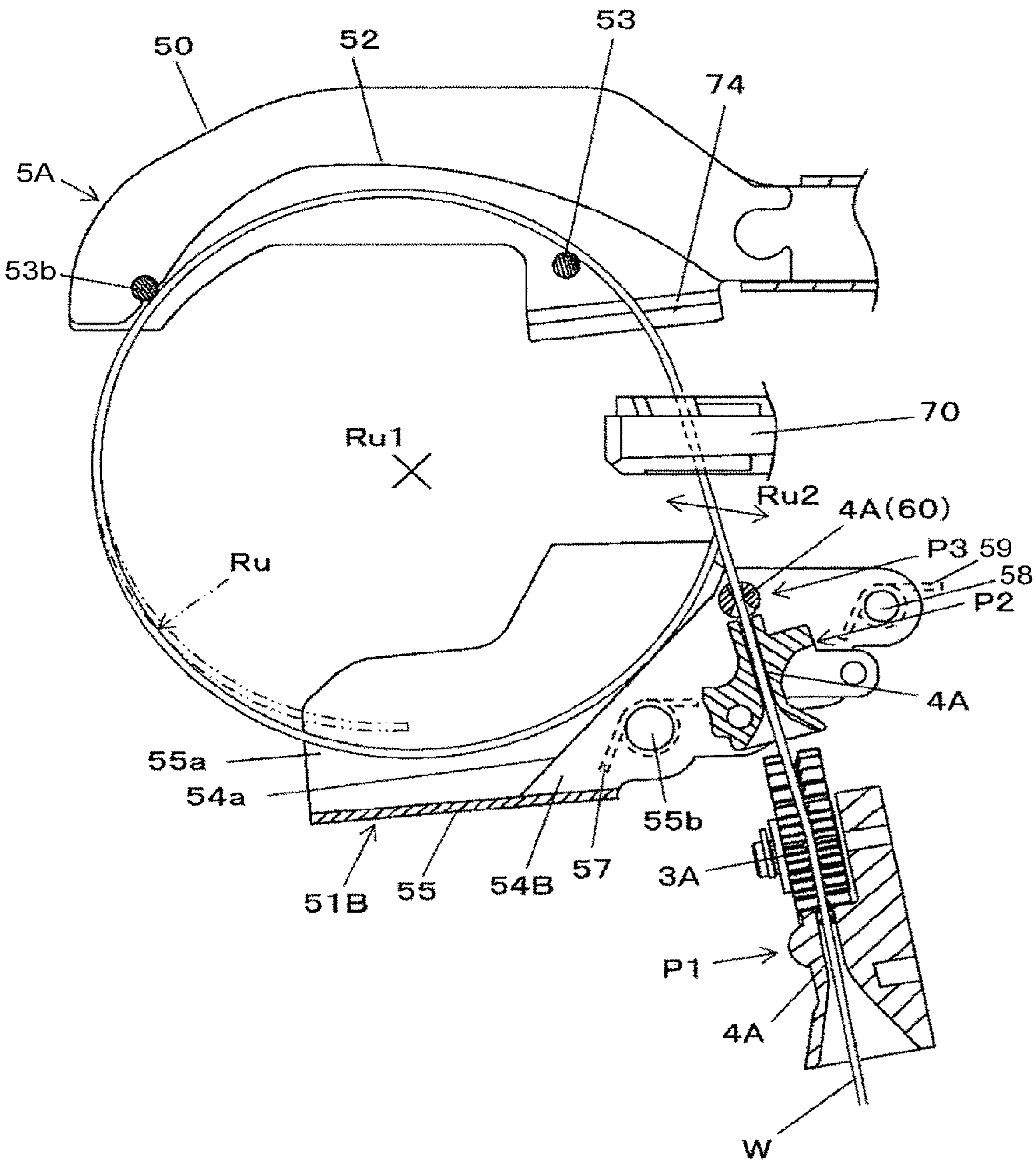
FIG. 33 is an explanatory view illustrating an example of an operation of the second guide unit according to another embodiment.

When the wire W is fed by the wire feeding unit 3A, as illustrated in FIG. 33, the wire W is guided to the base guide unit 54B by the movable guide unit 55. Even when the loop Ru formed by the wire W expands outward in the radial direction Ru2 and the wire W is in contact with the base guide unit 54B, the base guide unit 54B is held in the fixed state by the force of the spring 59 at the guide position.

Figure 34:
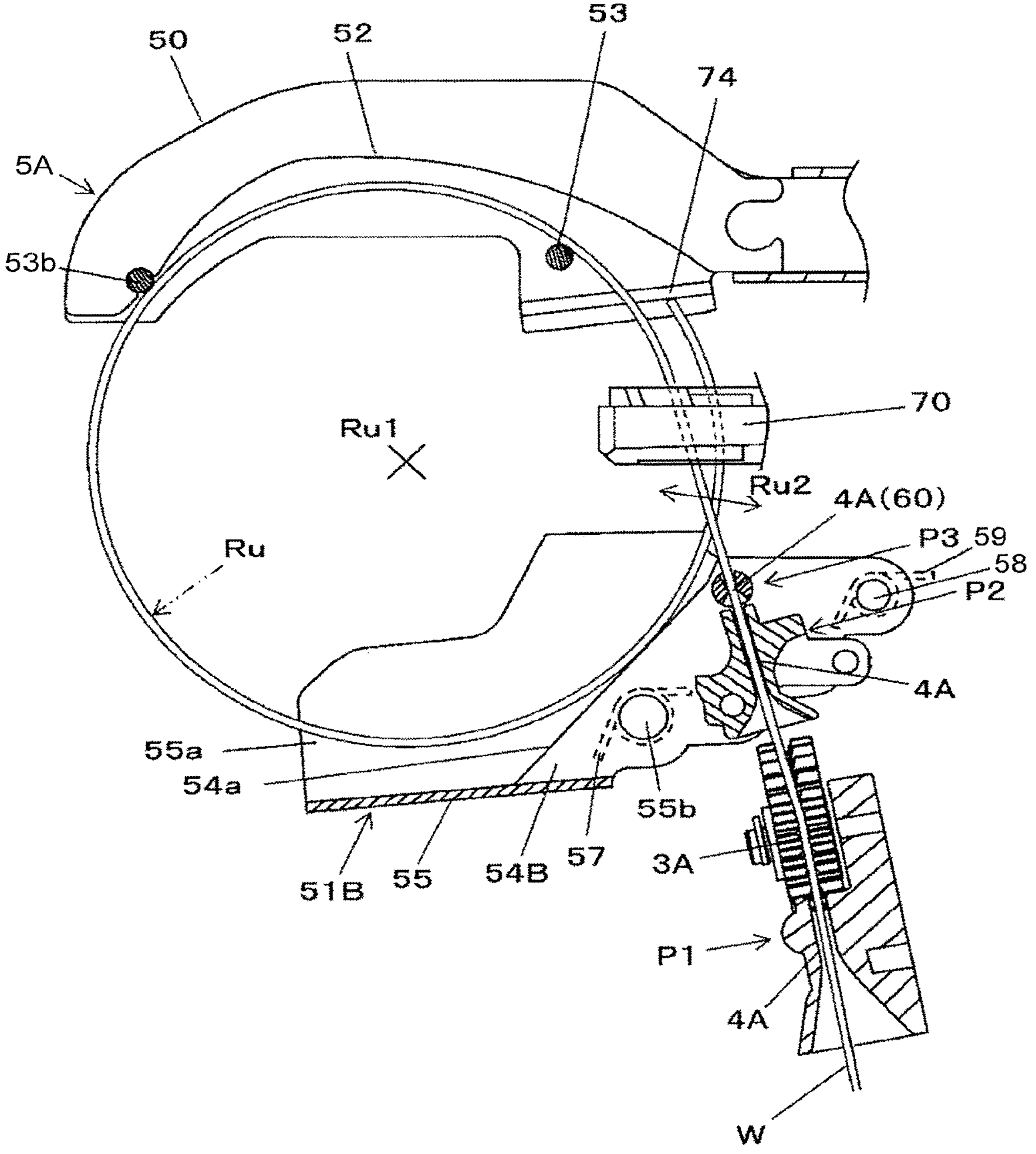
FIG. 34 is an explanatory view illustrating an example of an operation of the second guide unit according to another embodiment.
Figure 35:
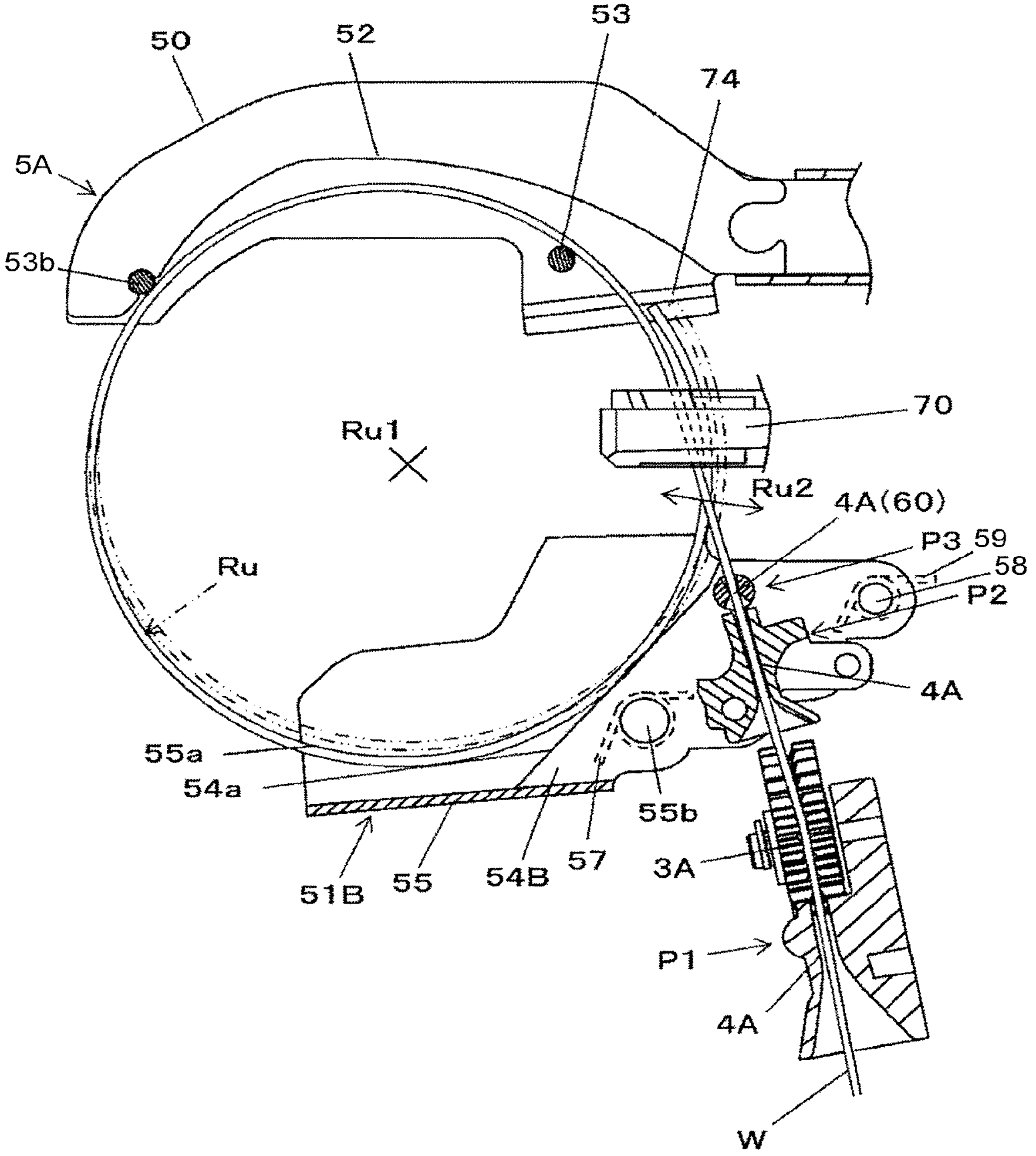
FIG. 35 is an explanatory view illustrating an example of an operation of the second guide unit according to another embodiment.

When the wire W is further fed, as illustrated in FIG. 34, the distal end of the wire W abuts on the length restricting portion 74. When a predetermined amount of wire W is further fed until the feeding of the wire W is stopped, as illustrated in FIG. 35, the position of the distal end of the wire W is restricted by the length restricting portion 74, and thus the loop Ru formed by the wire W expands outward in the radial direction Rut while the distal end of the wire W moves forward along the length restricting portion 74.

However, the base guide unit 54B is held in the fixed state by the force of the spring 59 at the guide position.

As described above, in the operation of forming the loop Ru with the wire W sent from the first guide unit 50, even when the wire W abuts on the base guide unit 54B, the base guide unit 54B is held in the fixed state at the guide position.

Further, even in the case where the movable guide unit 55 is pushed to the reinforcing bar S in the operation of pulling out the reinforcing bar binding machine 1A from the reinforcing bar S and thus the movable guide unit 55 is opened from the guide position to the retreat position, the base guide unit 54B is held in the fixed state at the guide position.

However, when an unexpected external force is applied, the base guide unit 54B rotates in the direction indicated by the arrow Q1 about the shaft 58 as a fulcrum against the urging force of the spring 59, and thus being released from the external force. When being released from the external force, the base guide unit 54B is pressed by the spring 59 to rotate in the direction indicated by the arrow Q2, and returns to the guide position.

Thus, by the retraction mechanism 54C provided in the base guide unit 54B, it is possible to reduce the load without hindering the formation of the loop Ru of the wire W wound around the reinforcing bar S in the case where external force or the like is applied. Particularly, as the shaft 55*b* of the movable guide unit 55 and the shaft 58 of the base guide unit 54B are in parallel with each other, the base guide unit 54B can be retreated by the large external force applied to the movable guide unit 55, for example, the force applied to the movable guide 55.

By the configuration in which the movable guide unit 55 is opened in the direction of the arrow H1 by the force of the hand and the base guide unit 54B can be opened in the direction of the arrow H1, the movable range of the second guide unit 51B can be increased. This facilitates maintenance or removal of wire jams or the like. The base guide unit 54B may be retractable by the linear motion described with reference to FIG. 27.

As another modified example of the present embodiment, instead of the configuration in which a plurality of wires W are simultaneously fed, a configuration may be provided in which wires W are wound around the reinforcing bar S by being fed one by one, a plurality of wires are wound, and then the plurality of wires are wound around the reinforcing bar S by being fed in the reverse direction.

Further, a magazine for holding a short wire W may be provided, and a plurality of wires W may be supplied.

Further, the magazine may not be provided in the main body, but the wire may be supplied from a supply portion of an independent wire.

It is to be noted that the present invention can also be applied to a binding machine that binds pipes or the like as a binding objects with a wire.

Some or all of the above embodiments can be described as follows.

Additional Note 1-1

A binding machine comprising:
- a housing (magazine) that houses a wire to be capable of feeding the wire;
- a wire feeding unit that feeds the wire which is capable to be fed from the housing;
- a curl guide that receives the wire fed from the wire feeding unit and winds around a binding object; and
- a binding unit that grips and twists the wire wound around the binding object by the curl guide, wherein the curl guide includes:
- a first guide unit that receives the wire fed by the wire feeding unit, and
- a second guide unit that receives the wire from the first guide unit, and the second guide unit includes:
- a third guide unit, and
- a fourth guide unit which is movable with respect to the third guide unit.

Additional Note 1-2

The binding machine according to (1-1), wherein the fourth guide unit is rotatably supported by the third guide unit.

Additional Note 1-3

The binding machine according to (1-1) or (1-2), wherein the third guide unit is provided in a main body.

Additional Note 2-1

A binding machine comprising:
- a housing (magazine) that houses a wire to be capable of feeding the wire;
- a wire feeding unit that feeds the wire which is capable to be fed from the housing;
- a curl guide that curls the wire fed by the wire feeding unit and winds the wire around the binding object; and
- a binding unit that grips and twists the wire wound around the binding object by the curl guide wherein the curl guide includes:
- a first guide unit that curls the wire fed by the wire feeding unit; and
- a second guide unit that guides the wire curled by the first guide unit to the binding unit, and the second guide unit includes:
- a third guide unit which restricts movement of the wire in a radial direction of a loop formed by the wire wound around the binding object, and
- a fourth guide unit which restricts movement of the wire in an axial direction of the loop.

Additional Note 2-2

The binding machine according to (2-1), wherein the fourth guide unit is rotatably provided with respect to the third guide unit.

Additional Note 2-3

The binding machine according to (2-2), wherein the fourth guide unit is movable between a guide position at which the movement of the wire is restricted in the axial direction of the loop and a retreat position at which the movement of the wire is not restricted by being retreated from a feed path of the wire by the rotation.

Additional Note 2-4

The binding machine according to (2-2) or (2-3), wherein the fourth guide unit rotates around a shaft provided in the third guide unit.

Additional Note 2-5

The binding machine according to any one of (2-2) to (2-4), wherein the fourth guide unit is provided such that the other end is rotatably supported on the third guide unit so as to allow one end side to be movable toward and away from the first guide unit.

Additional Note 2-6

The binding machine according to any one of (2-1) to (2-5), wherein the third guide unit is rotatably provided in the radial direction of the loop with respect to a binding machine main body the fourth guide unit is rotatably provided in the radial direction of the loop with respect to the third guide unit, and a rotation amount (rotation range) of the fourth guide unit is set to be larger than a rotation amount (rotation range) of the third guide unit.

The third guide is movable in a range of restricting the movement of the wire in the radial direction of the loop formed by the wire.

Alternatively, the third guide is movable beyond the range of restricting the movement of the wire in the radial direction of the loop formed by the wire.

Additional Note 2-7

The binding machine according to any one of (2-1) to (2-6), wherein the third guide unit is rotatably provided in the radial direction of the loop with respect to a binding machine main body, the fourth guide unit is rotatably provided in the radial direction of the loop with respect to the third guide unit, and a pressing force for rotating the fourth guide unit is set to be smaller than a pressing force for rotating the third guide unit.

The pressing force for rotating the third guide unit is larger than a force capable of restricting the movement of the wire in the radial direction of the loop formed by the wire.

Additional Note 2-8

The binding machine according to any one of (2-1) to (2-5), wherein a binding machine main body is provided to support the third guide unit, and the third guide unit is fixed to the binding machine main body.

Additional Note 2-9

The binding machine according to any one of (2-2) to (2-8), wherein the second guide unit includes a rotation mechanism which rotates the fourth guide unit, the rotation mechanism includes a shaft which supports the fourth guide unit and an urging portion which holds the fourth guide unit at a predetermined position, and the fourth guide unit is movable to the retreat position by rotating against an urging force of the urging portion.

Additional Note 2-10

The binding machine according to any one of (2-1) to (2-5), wherein a binding machine main body is provided to support the third guide unit, and the third guide unit is provided to linearly move in the binding machine main body.

The third guide is movable in a range of restricting the movement of the wire in the radial direction of the loop formed by the wire.

Alternatively, the third guide is movable beyond the range of restricting the movement of the wire in the radial direction of the loop formed by the wire.

Additional Note 3-1

A binding machine including:

a binding machine main body;

a housing (magazine) that houses a wire to be capable of feeding the wire;

a wire feeding unit that feeds the wire which is capable to be fed from the housing;

a curl guide that curls the wire fed by the wire feeding unit and winds the wire around the binding object; and a binding unit that grips and twists the wire wound around the binding object by the curl guide, wherein the curl guide includes:

a first guide unit that curls the wire fed by the wire feeding unit, and a second guide unit that guides the wire curled by the first guide unit to the binding unit, and the second guide unit is provided so as to be movable between a position at which the second guide unit protrudes toward a binding machine main body and a position at which the second guide unit enters entirely or partially the binding machine main body.

The invention is applicable to a reel for a wire used in a reinforcement binding machine.

This application is based upon and claims the benefit of priority from Japanese Patent Application No. 2015-145284 filed on Jul. 22, 2015 and Japanese Patent Application No. 2016-136068 filed on Jul. 8, 2016, the entire contents of which are incorporated herein by reference.

REFERENCE SIGNS LIST

1A: reinforcing bar binding machine,
2A: magazine,
20: reel,
3A: wire feeding unit (feeding unit),
4A: parallel guide (feeding unit),
5A: curl guide unit (guide unit (feeding unit)),
6A: cutting unit,
7A: binding portion (binding unit),
8A: binding unit driving mechanism,
30L: first feed gear,
30R: second feed gear,
31L: tooth portion,
31La: tooth bottom circle,
32L: first feed groove,
32La: fast inclined surface,
32Lb: second inclined surface,
31R: tooth portion,
31Ra: tooth bottom circle,
32R: second feed groove,
32Ra: first inclined surface,
32Rb: second inclined surface,
33: driving unit,
33*a*: feed motor,
33*b*: transmission mechanism,
34: displacement portion,
50: first guide unit,

51: second guide unit,
52: guide groove (guide unit),
53: guide pin,
53*a*: retreat mechanism,
54: fixed guide unit (third guide unit),
54*a*: wall surface,
54B: base guide unit (third guide unit),
55: movable guide unit (fourth guide unit),
55*a*: wall surface,
55*b*: shaft,
55*c*: guide shaft,
55*d*: guide groove,
60: fixed blade portion,
61: rotary blade portion,
61*a*: shaft,
62: transmission mechanism,
70: gripping unit,
70C: fixed gripping member,
70L: first movable gripping member,
70R: second movable gripping member,
71: bending portion,
80: motor,
81: reduction gear,
82: rotary shaft,
83: movable member,
W: wire

The invention claimed is:

1. A binding machine comprising:
a housing that houses a wire;
a wire feeding unit that feeds the wire housed in the housing;
a curl guide that receives the wire fed from the wire feeding unit and winds the wire around a binding object in a loop shape; and
a binding unit that grips and twists the wire wound around the binding object by the curl guide,
wherein the curl guide includes:
a first guide unit that includes a base portion connected to a main body of the binding machine and a tip end portion, wherein the wire fed by the wire feeding unit is received by the base portion and then passes through the tip end portion, and
a second guide unit that includes a base portion connected to the main body and a tip end portion, wherein the wire passed through the tip end portion of the first guide unit is received by the tip end portion of the second guide unit and then passes through the base portion of the second guide unit,
the tip end portion of the first guide unit is spaced from the tip end portion of the second guide unit, and the binding object is inserted through a space between the tip end portion of the first guide unit and the tip end portion of the second guide unit, and
the second guide unit includes:
a third guide unit; and
a fourth guide unit which is movable with respect to the third guide unit.

2. The binding machine according to claim 1, wherein the third guide unit restricts movement of the wire in a radial direction of a loop formed by the wire wound around the binding object.

3. The binding machine according to claim 2, wherein the fourth guide unit restricts movement of the wire in an axial direction of a loop formed by the wire wound around binding object.

4. The binding machine according to claim 1, wherein the third guide unit is provided in the main body.

5. The binding machine according to claim 4, wherein the third guide unit is fixed to the main body.

6. The binding machine according to claim 5, wherein the third guide unit is fixed to the main body so as to restrict movement of a loop formed by the wire wound around the binding object in a radial direction.

7. The binding machine according to claim 1, wherein the fourth guide unit is rotatable with respect to the third guide unit.

8. The binding machine according to claim 7, wherein the fourth guide unit is movable between a guide position at which the wire is restricted so as not to be moved in an axial direction of a loop formed by the wire wound around the binding object and a retreat position at which the movement of the wire is not restricted by being retreated from a feed path of the wire by rotation of the fourth guide unit.

9. The binding machine according to claim 8,
wherein the second guide unit includes a rotation mechanism which rotates the fourth guide unit,
the rotation mechanism includes a shaft which supports the fourth guide unit and an urging portion which holds the fourth guide unit at a predetermined position, and
the fourth guide unit is movable to the retreat position by rotating against an urging force of the urging portion.

10. The binding machine according to claim 1, wherein the fourth guide unit is supported on the third guide unit so as to be movable toward and away from the first guide unit.

11. The binding machine according to claim 10, wherein the fourth guide unit is provided such that a base portion thereof is rotatably supported on the third guide unit so as to allow an end portion thereof to be movable toward and away from the first guide unit.

12. The binding machine according to claim 1, wherein the fourth guide unit is supported by the third guide unit so as to be movable between a position at which the fourth guide unit protrudes from one end portion of a main body and a position at which the fourth guide unit enters entirely or partially in the main body.

13. A binding machine comprising:
a housing that houses a wire;
a wire feeding unit that feeds the wire housed in the housing;
a curl guide that receives the wire fed from the wire feeding unit and winds the wire around a binding object in a loop shape; and
a binding unit that grips and twists the wire wound around the binding object by the curl guide,
wherein the curl guide includes:
a first guide unit that receives the wire fed by the wire feeding unit; and
a second guide unit that receives the wire from the first guide unit, and
the second guide unit includes:
a third guide unit that is movably provided in a main body of the binding machine; and
a fourth guide unit which is movable with respect to the third guide unit.

14. The binding machine according to claim 13, wherein the third guide unit is rotatably provided in the main body.

15. The binding machine according to claim 13, wherein the third guide unit is provided to linearly move in the main body.

16. A binding machine comprising:
a housing that houses a wire;
a wire feeding unit that feeds the wire housed in the housing;

a curl guide that receives the wire fed from the wire feeding unit and winds the wire around a binding object in a loop shape; and a binding unit that grips and twists the wire wound around the binding object by the curl guide, wherein the curl guide includes:

a first guide unit that receives the wire fed by the wire feeding unit, and a second guide unit that receives the wire from the first guide unit, the second guide unit includes:

a third guide unit; and a fourth guide unit which is movable with respect to the third guide unit, the third guide unit is rotatably provided in a radial direction of a loop formed by the wire wound around the binding object with respect to a main body, the fourth guide unit is rotatably provided in the radial direction of the loop with respect to the third guide unit, and a rotation amount of the fourth guide unit is set to be larger than a rotation amount of the third guide unit.

17. A binding machine comprising:

a housing that houses a wire;

a wire feeding unit that feeds the wire housed in the housing;

a curl guide that receives the wire fed from the wire feeding unit and winds the wire around a binding object in a loop shape; and a binding unit that grips and twists the wire wound around the binding object by the curl guide, wherein the curl guide includes:

a first guide unit that receives the wire fed by the wire feeding unit, and a second guide unit that receives the wire from the first guide unit, and the second guide unit includes:

a third guide unit; and a fourth guide unit which is movable with respect to the third guide unit, the third guide unit is rotatably provided in a radial direction of a loop formed by the wire wound around the binding object with respect to a main body, the fourth guide unit is rotatably provided in the radial direction of the loop with respect to the third guide unit, and a pressing force for rotating the fourth guide unit is set to be smaller than a pressing force for rotating the third guide unit.

18. A binding machine comprising:

a housing that houses a wire;

a wire feeding unit that feeds the wire housed in the housing;

a curl guide that receives the wire fed from the wire feeding unit and winds the wire around a binding object in a loop shape; and a binding unit that grips and twists the wire wound around the binding object by the curl guide, wherein the curl guide includes:

a first guide unit that receives the wire fed by the wire feeding unit, and a second guide unit that receives the wire from the first guide unit, wherein the binding unit includes a gripping unit that grips the wire fed by the wire feeding unit, wherein the wire feeding unit pulls back the wire after the gripping unit grips the wire, wherein the second guide unit includes:

a third guide unit that guides the wire from the first guide unit toward the gripping unit of the binding unit and that restricts movement of the wire guided toward the gripping unit in a radial direction of a loop formed by the wire wound around the binding object; and a fourth guide unit which is movable with respect to the third guide unit toward and away from the first guide unit, and wherein the fourth guide unit restricts movement of the wire in an axial direction of a loop formed by the wire wound around the binding object.

19. The binding machine according to claim 18, wherein the binding unit further includes a length restricting unit against which a leading end of the wire passing through the gripping unit abuts to restrict a position of the leading end of the wire.

20. The binding machine according to claim 18, wherein the gripping unit includes a fixed gripping member, and first and second movable gripping members provided on both sides of the fixed gripping member via the fixed gripping member, wherein the wire feeding unit feeds the wire housed in the housing toward the first guide unit through between the fixed gripping member and the second gripping member, and wherein the fixed gripping member and the first gripping member grip therebetween the wire fed by the wire feeding unit and guided by the second guide unit.

* * * * *